(12) United States Patent
Ifill et al.

(10) Patent No.: US 12,434,822 B2
(45) Date of Patent: Oct. 7, 2025

(54) METHOD OF ASSEMBLYING AND OPERATING AN AUTOROTATING PAYLOAD DELIVERY DEVICE

(71) Applicant: AeroVironment, Inc., Arlington, VA (US)

(72) Inventors: Joel Ifill, Los Angeles, CA (US); Zach Taylor, Redondo Beach, CA (US); Jason Litzinger, Canyon Lake, CA (US); Phil Stahlhuth, Pasadena, CA (US); Marc Berte, Leesburg, VA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

(21) Appl. No.: 17/644,657

(22) Filed: Dec. 16, 2021

(65) Prior Publication Data

US 2022/0185478 A1 Jun. 16, 2022

Related U.S. Application Data

(60) Provisional application No. 63/126,345, filed on Dec. 16, 2020.

(51) Int. Cl.
*B64D 19/02* (2006.01)
*B64C 27/02* (2006.01)
*G05D 1/00* (2006.01)

(52) U.S. Cl.
CPC ............ *B64C 27/028* (2013.01); *B64C 27/02* (2013.01); *G05D 1/105* (2013.01); *B64D 19/02* (2013.01)

(58) Field of Classification Search
CPC ... B64D 1/08; B64D 1/12; B64D 1/14; B64D 19/02; B64D 1/02; B64U 2101/60;
(Continued)

(56) References Cited

U.S. PATENT DOCUMENTS 3,915,414 A * 10/1975 Shoulders ............... B64C 27/00
244/180
3,987,987 A 10/1976 Payne
(Continued)

FOREIGN PATENT DOCUMENTS

CN 109263954 A 1/2019
CN 110481769 A 11/2019

OTHER PUBLICATIONS

Piechocki et al., "Numerical simulation of pararotor dynamics: effect of mass displacement from blade plane", Aerospace Science and Technology 55, 2016, 400-408.
(Continued)

*Primary Examiner* — Timothy D Collins
*Assistant Examiner* — Terri L Filosi
(74) *Attorney, Agent, or Firm* — Command IP LLP; Michael Zarrabian; Eric Aagaard

(57) ABSTRACT

A method of assembling a delivery payload assembly configured to be deployed from an aircraft and travel along a flight path to a predetermined landing destination includes attaching a tail-kit assembly to a first end of a payload, the tail-kit assembly including a rotor blade assembly including a plurality of rotor blades having a central axis of rotation, and a flight control and navigation system configured to control a collective pitch angle of each of the plurality of rotor blades of the rotor blade assembly, configured to control an axial thrust force of the rotor blade assembly, the axial thrust force being at an angle with respect to the central axis of rotation of the rotor blade assembly, and configured to navigate the delivery payload assembly along the flight path to the predetermined landing destination. The method further includes removing the tail-kit assembly from the payload after the payload is delivered to the predetermined landing destination.

6 Claims, 32 Drawing Sheets

(58) Field of Classification Search
CPC ....... B64U 10/11; B64U 30/296; F42B 10/58; B64C 27/006
See application file for complete search history.

(56) References Cited

U.S. PATENT DOCUMENTS

| | | | |
|---|---|---|---|
| 3,995,793 | A | 12/1976 | Wing |
| 4,195,800 | A | 4/1980 | Wallace |
| 4,295,290 | A | 10/1981 | Boswell |
| 4,653,705 | A | 3/1987 | Bensen |
| 4,765,567 | A | 8/1988 | Gutman |
| 4,803,938 | A | 2/1989 | Sergeant |
| 4,824,326 | A | 4/1989 | Watts |
| 4,913,376 | A | 4/1990 | Black |
| 4,979,698 | A | 12/1990 | Lederman |
| 5,030,157 | A | 7/1991 | Silverglate |
| 5,301,900 | A | 4/1994 | Groen |
| 5,304,036 | A | 4/1994 | Groen |
| 5,544,844 | A | 8/1996 | Groen |
| 5,996,934 | A | 12/1999 | Murph |
| 6,244,537 | B1 | 6/2001 | Rutherford |
| 6,435,453 | B1 | 8/2002 | Carter, Jr. |
| 6,471,158 | B1 | 10/2002 | Davis |
| 7,137,591 | B2 | 11/2006 | Carter |
| 7,178,757 | B1 | 2/2007 | Breese |
| 7,262,395 | B2 | 8/2007 | Bilyk |
| 7,789,341 | B2 | 9/2010 | Arlton |
| 7,918,415 | B2 | 4/2011 | De La Cierva Hoces |
| 7,985,048 | B2 | 7/2011 | Jones |
| 8,079,546 | B2 * | 12/2011 | Barrows ................ B64D 19/02 102/388 |
| 8,172,173 | B2 | 5/2012 | Carlson |
| 8,366,037 | B2 | 2/2013 | Morris |
| 8,540,183 | B2 | 9/2013 | Morris |
| 8,646,719 | B2 | 2/2014 | Morris |
| 8,727,271 | B2 | 5/2014 | Salyer |
| 9,038,941 | B2 | 5/2015 | Morris |
| 9,187,173 | B2 | 11/2015 | Morris |
| 9,193,451 | B2 | 11/2015 | Salyer |
| 9,493,245 | B2 | 11/2016 | Salyer |
| 10,457,387 | B2 | 10/2019 | Fraundorfer |
| 10,526,084 | B2 | 1/2020 | Birkner |
| 11,091,265 | B1 | 8/2021 | Newsted |
| 12,202,612 | B2 * | 1/2025 | Win ........................ F42B 10/56 |
| 2005/0096800 | A1 | 5/2005 | Tanielian |
| 2005/0258310 | A1 | 11/2005 | Bilyk |
| 2006/0011777 | A1 | 1/2006 | Arlton |
| 2007/0029439 | A1 | 2/2007 | Merems |
| 2009/0269199 | A1 | 10/2009 | Rudley |
| 2016/0236778 | A1 * | 8/2016 | Takayama ................ B64D 1/12 |
| 2018/0101169 | A1 | 4/2018 | Applewhite |
| 2018/0281953 | A1 | 10/2018 | Groen |
| 2019/0193855 | A1 | 6/2019 | Prager |
| 2019/0318296 | A1 | 10/2019 | Ifill |
| 2021/0300553 | A1 | 9/2021 | Exner |

OTHER PUBLICATIONS

International Preliminary Report on Patentability issued in App. No. PCT/US21/63886, mailing date Jun. 29, 2023, 12 pages.
International Preliminary Report on Patentability issued in App. No. PCT/US21/63888, mailing date Jun. 29, 2023, 12 bages.
International Search Report and Written Opinion issued in App. No. PCT/US21/63888, malling date Jul. 5, 2022, 16 pages.
International Search Report and Written Opinion issued in App. No. PCT/US21/63886, mailing date Sep. 6, 2022, 15 pages.

* cited by examiner

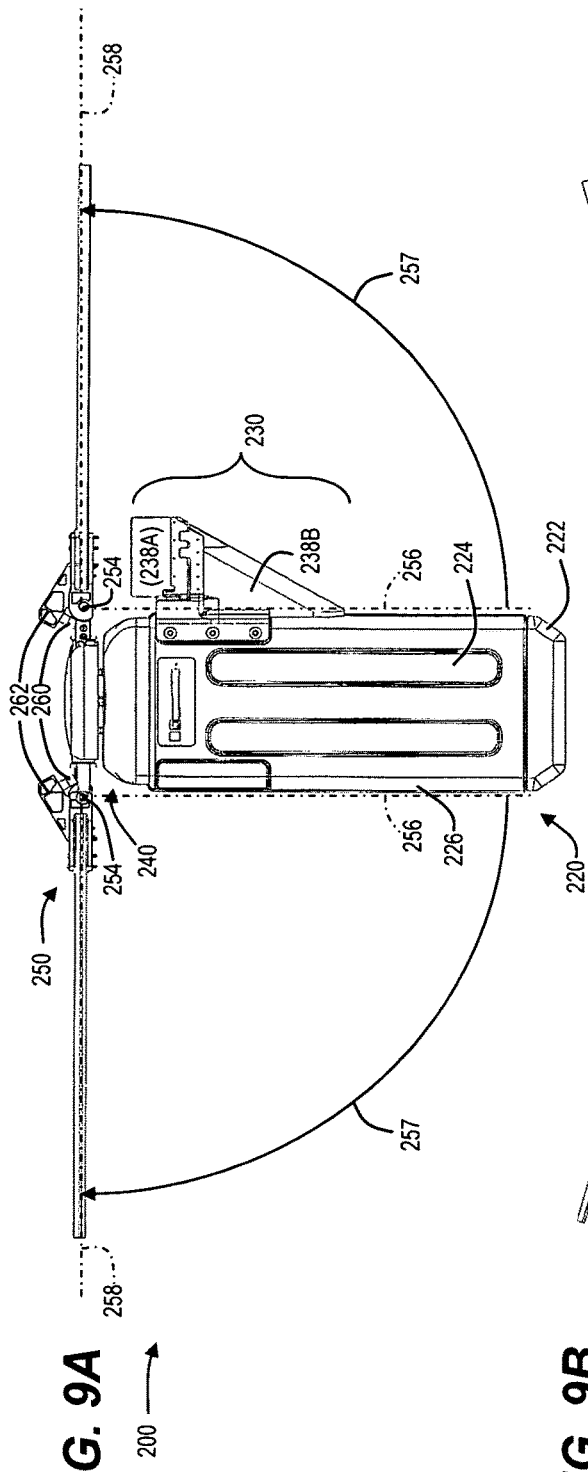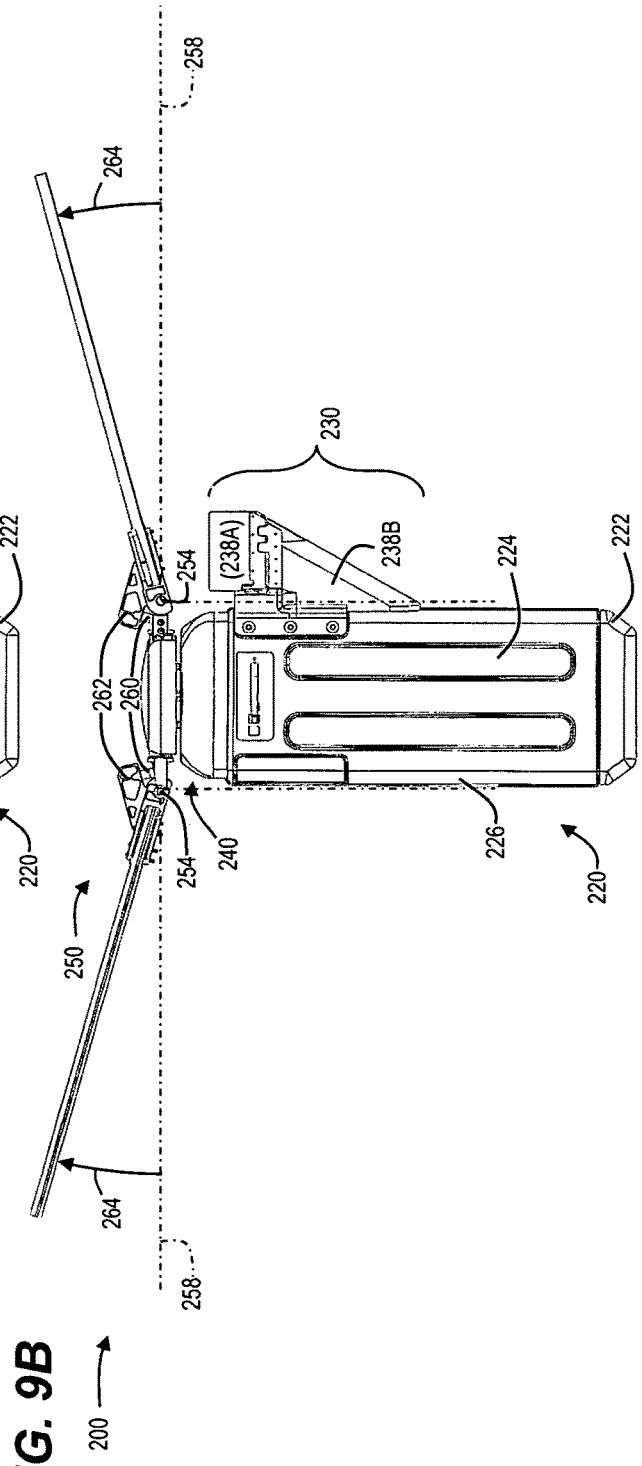

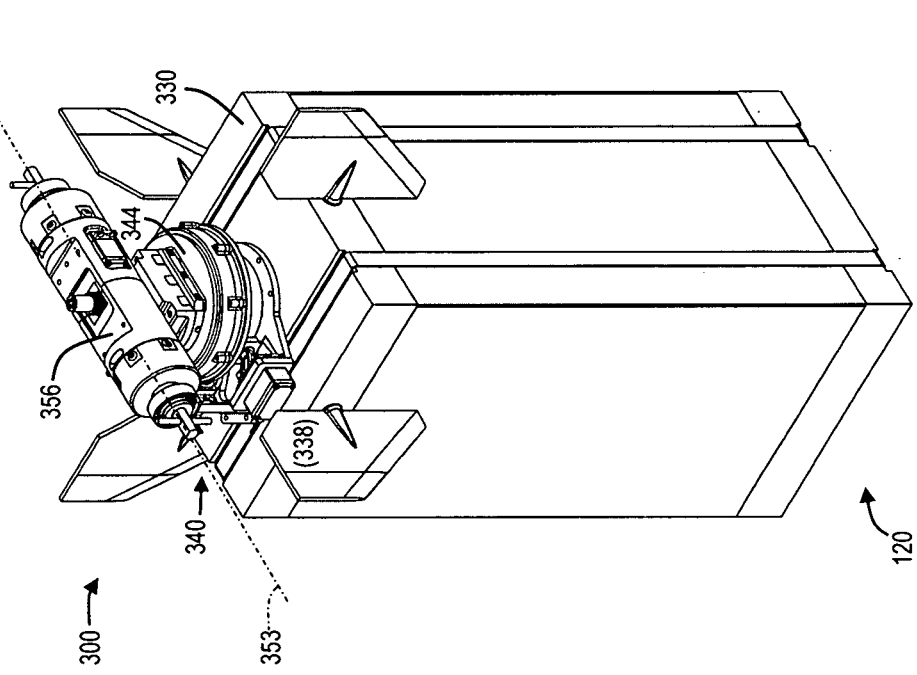
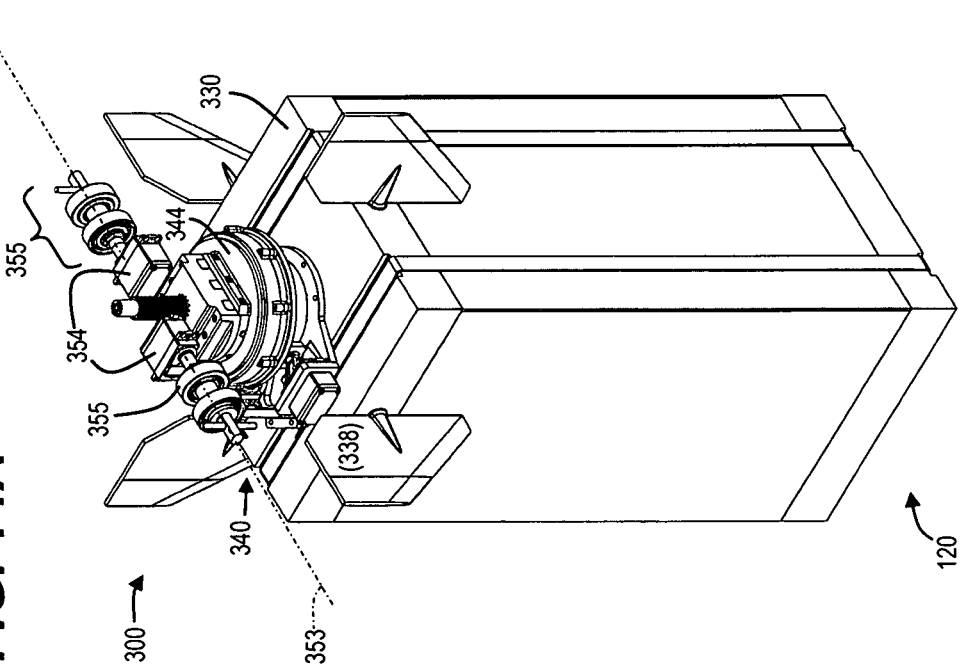

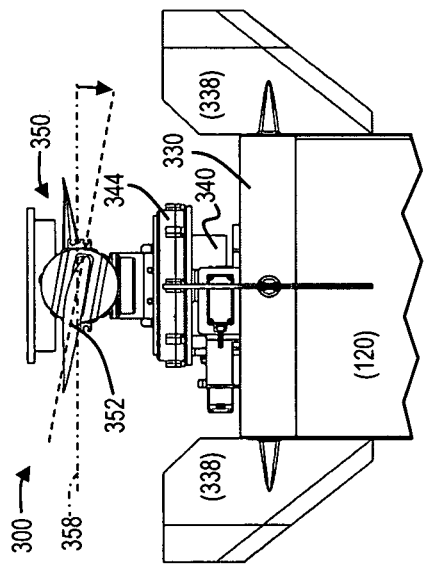
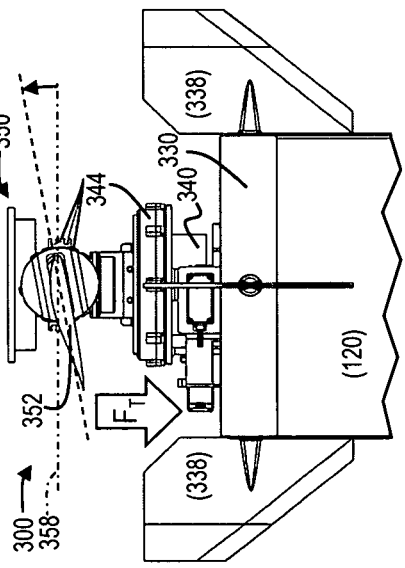
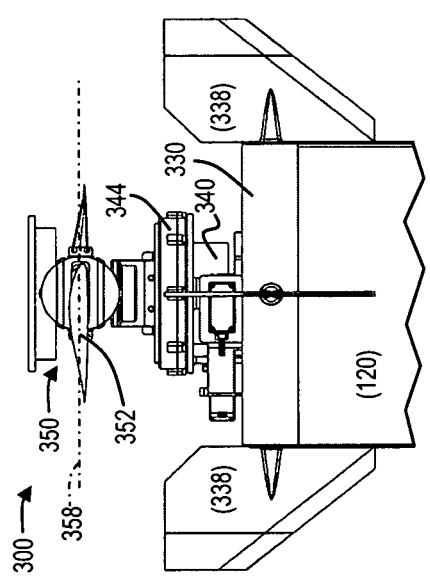
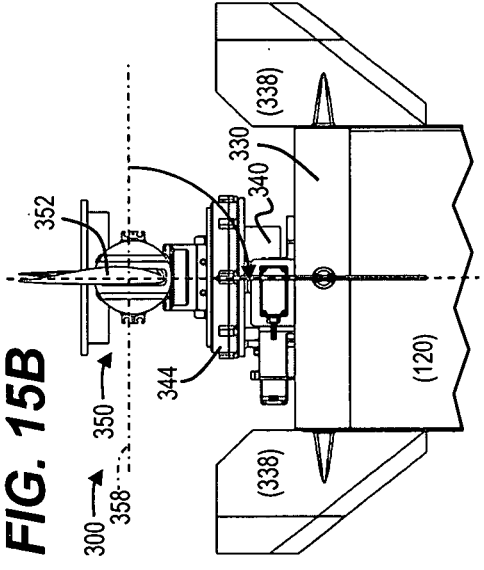

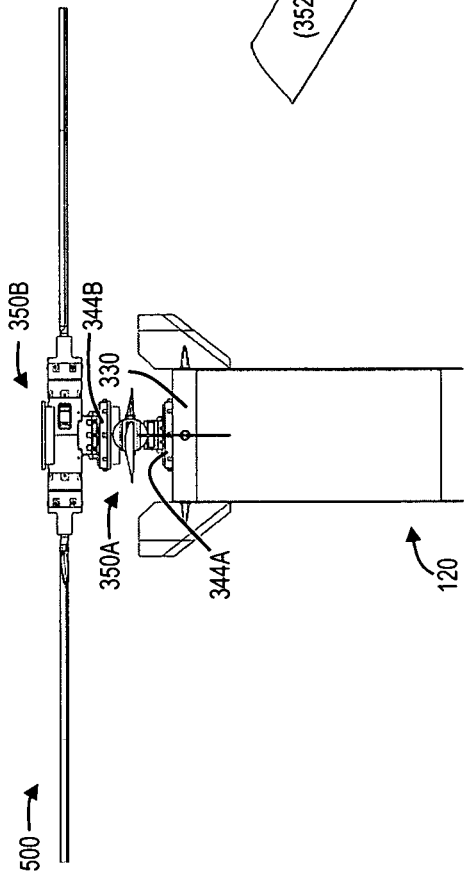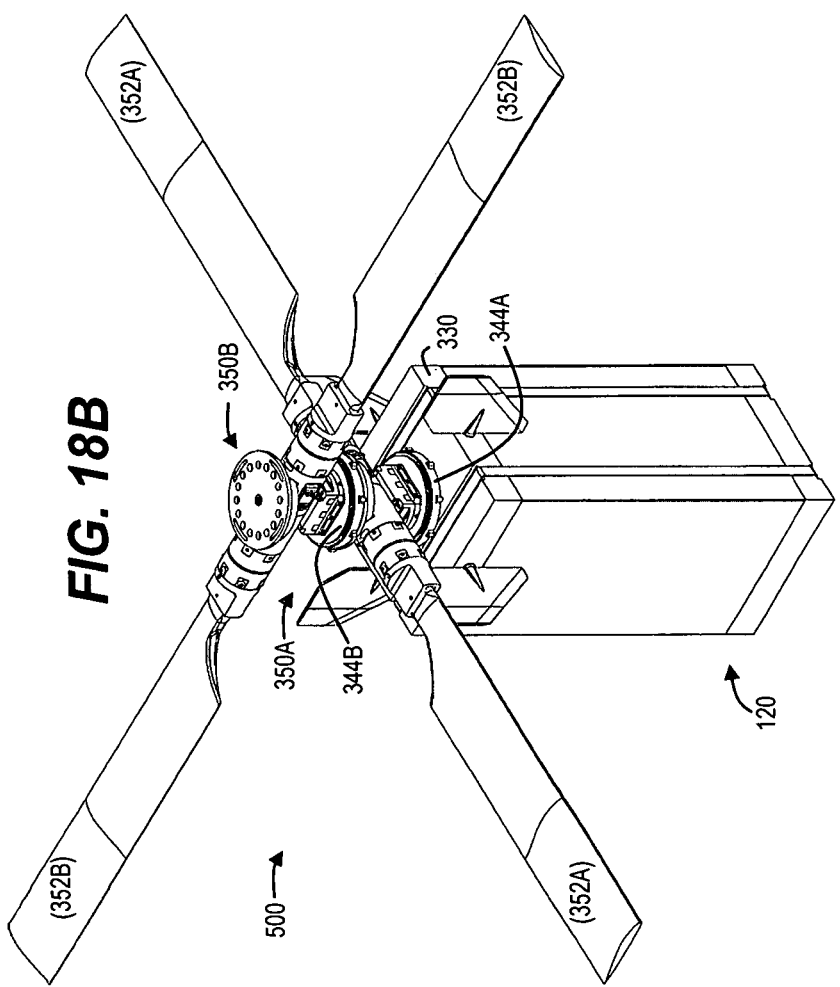

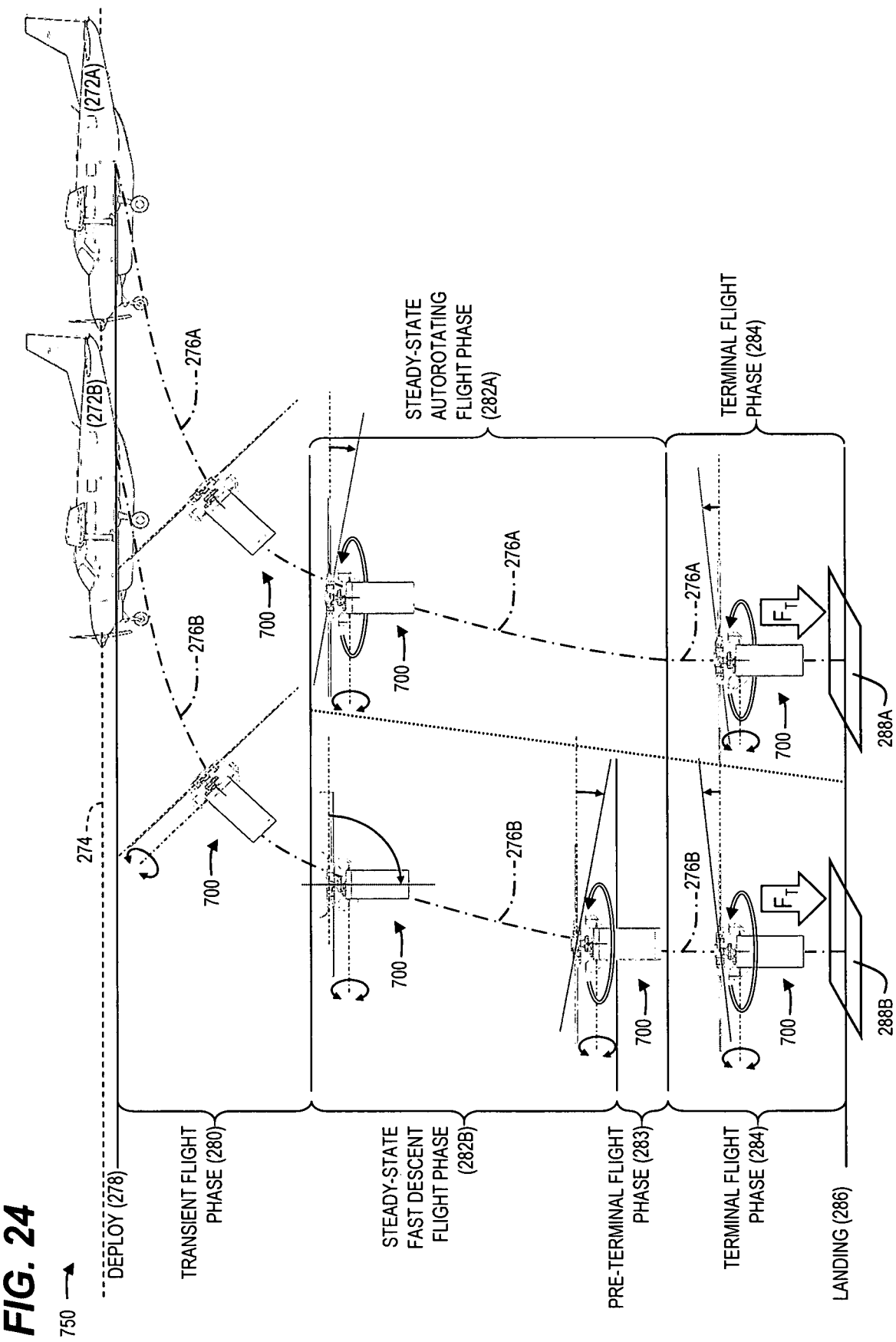

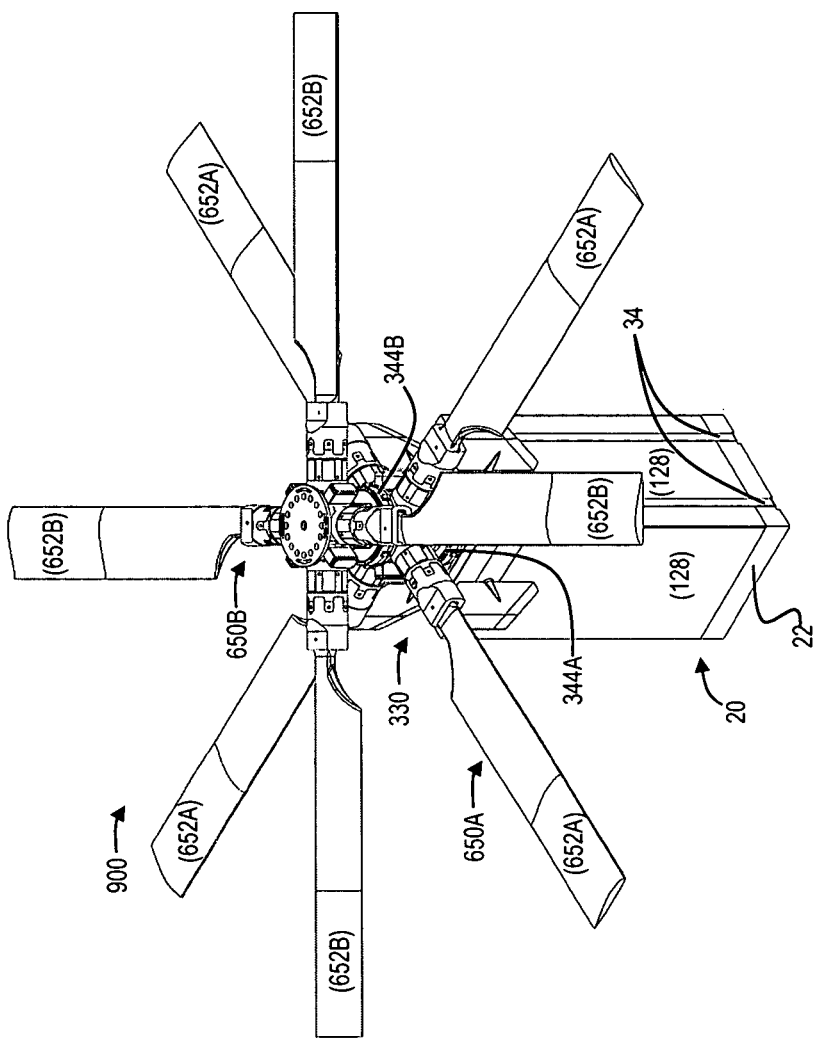
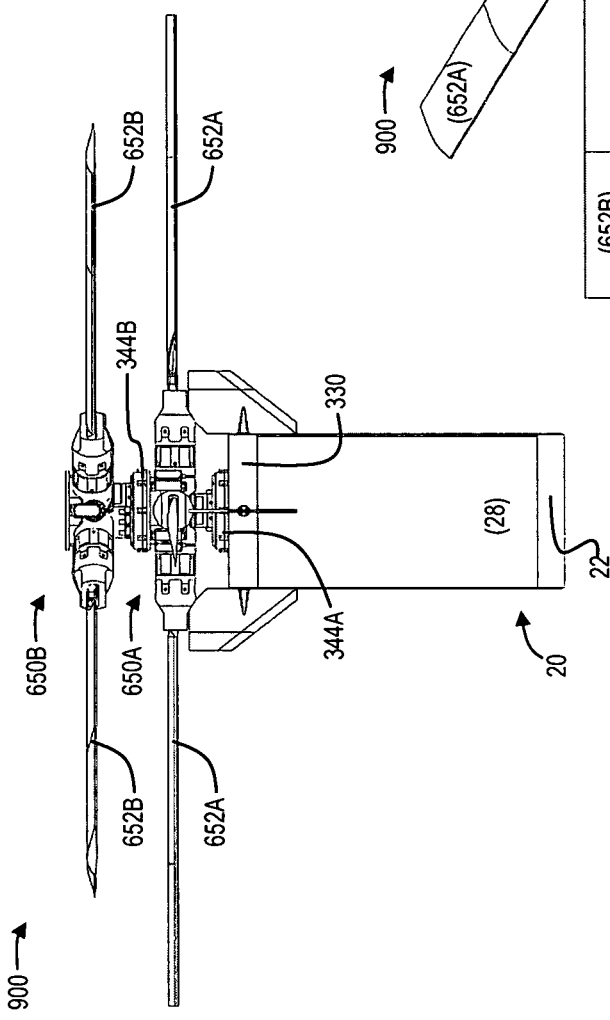

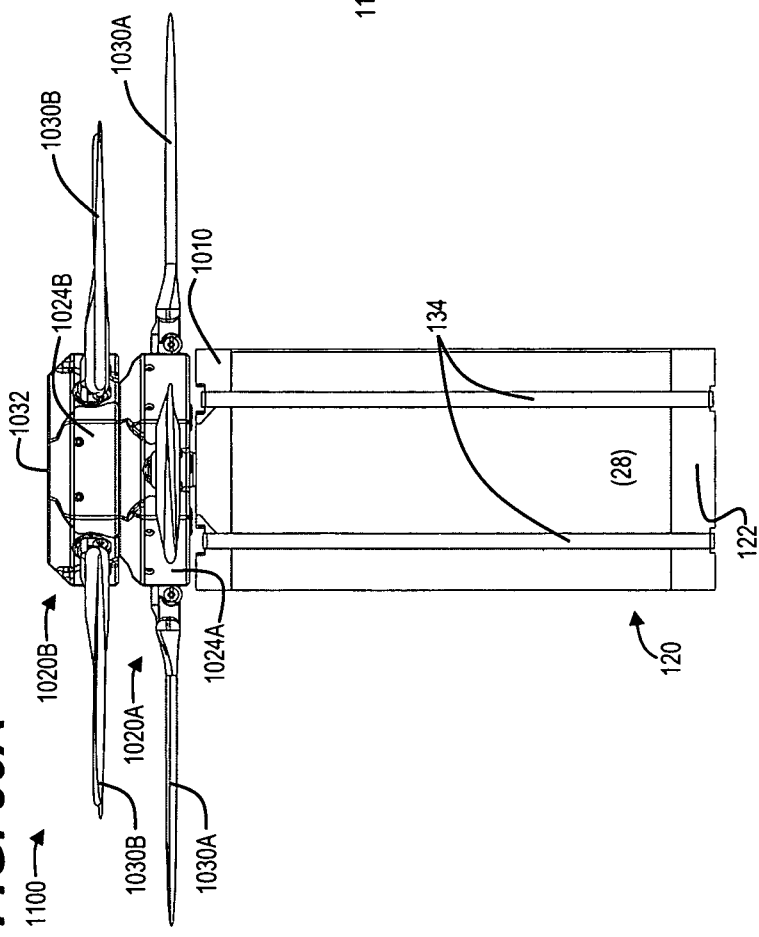
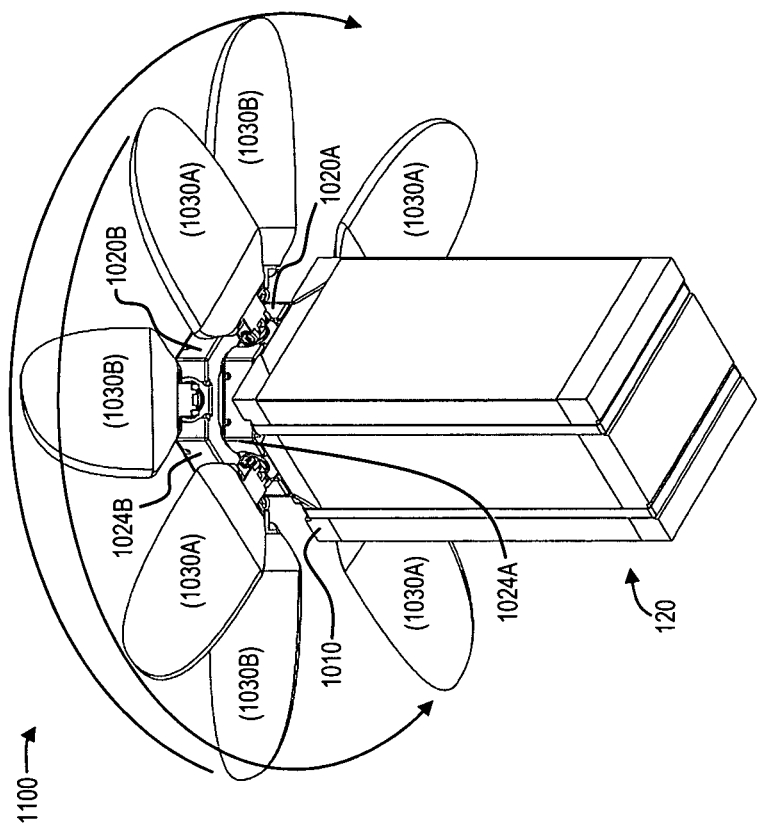
FIG. 30A
FIG. 30B

3200

METHOD OF ASSEMBLYING AND OPERATING AN AUTOROTATING PAYLOAD DELIVERY DEVICE

CROSS-REFERENCE TO RELATED APPLICATIONS

This application claims the benefit of U.S. Provisional Patent Application Ser. No. 63/126,345 filed on Dec. 16, 2020, wherein the disclosure of the application listed above is incorporated herein by reference in its entirety.

BACKGROUND

The embodiments disclosed herein are directed toward air drop devices configured to be deployed from an aircraft with the purpose of safely delivering an attached payload to a predetermined target destination either on land, water or a structure on either land or water.

An unpowered pararotor assembly mounted on top of an air drop device is provided in at least two configurations disclosed herein. First, a pitch-link type rotor assembly may include a swashplate for collective pitch control of the rotor blades and cyclic pitch control of the rotors. A second type of a "swashplate-less" configuration may include greater control of collective and cyclic pitch of the rotor blades of a rotor assembly by directly controlling the rotor blades by servomotor actuators.

The pararotor is a biology-inspired decelerator device based on the autorotation of a rotary wing, whose main purpose is to guide a load descent into a certain planetary atmosphere. The pararotor is a device like an unpowered helicopter rotor that spins in an autorotation configuration when the attached payload is descending through an airstream impinging upon the pararotor. A drag force in the direction of the incident airstream flow is generated over the autorotating rotor, where the drag exerted over the rotor is greater if the rotor is spinning in an autorotating configuration. Thus, the rotational motion of the pararotor assembly is effective to slow down or exert a downwardly directed thrust vector relative to a falling body or payload in the airstream and also stabilize the payload's trajectory.

BRIEF SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a payload delivery device is configured to deliver an aircraft deployed payload along a payload flight path to a predetermined landing destination and include a support member configured to be removably attached to the payload, a flight control and navigation system module connected to the support member, a control surface assembly module including a plurality of control surfaces, the control surface assembly module connected to the support member and in communication with the flight control and navigation module to receive commands to control orientation of the plurality of control surfaces while the payload is travelling along the payload flight path to the predetermined landing destination, a rotor assembly including a plurality of rotor blades having a central axis of rotation, and a collective control assembly module including at least one collective servomotor, the collective control assembly module connected between the support member and the rotor assembly and in communication with the flight control and navigation module configured to control a plurality of control linkages connected to the plurality of rotor blades.

In another embodiment disclosed herein, a payload delivery device is configured to deliver an aircraft deployed payload along a payload flight path to a predetermined landing destination and include a support member configured to be removably attached to the payload, a flight control and navigation system module connected to the support member, a control surface assembly module including a plurality of control surfaces, the control surface assembly module connected to the support member and in communication with the flight control and navigation module to receive commands to control orientation of the plurality of control surfaces while the payload is travelling along the payload flight path to the predetermined landing destination, a gimbal assembly module including a plurality of gimbal servomotors, the gimbal assembly module connected to and configured to move relative to the support member and in communication with the flight control and navigation module to receive commands to control axial rotation of the gimbal assembly module with respect to the support member, a rotor assembly including a plurality of rotor blades having a central axis of rotation, and a collective control assembly module including at least one collective servomotor, the collective control assembly module connected between the gimbal assembly module and the rotor assembly and in communication with the flight control and navigation module configured to control a plurality of control linkages connected to the plurality of rotor blades.

In another embodiment disclosed herein, a payload delivery device configured to deliver an aircraft deployed payload along a payload flight path to a predetermined landing destination and include a support member configured to be removably attached to the payload, a flight control and navigation system module, a control surface assembly module including a plurality of control surfaces, the control surface assembly module connected to the support member and in communication with the flight control and navigation module to receive control surface commands to control orientation of the plurality of control surfaces, a rotation bearing assembly connected to the support member, and a rotor assembly including a plurality of rotor blades having a central axis of rotation and a plurality of rotor servomotors, the rotor assembly connected to the rotation bearing assembly and in communication with the flight control and navigation module to receive rotor rotation commands to control angular rotation of each of the plurality of rotor blades via co-planar aligned blade rotation shafts of each of the plurality of rotor blades, the co-planar aligned drive shafts coincident with a plane of rotation of the rotor assembly about the central axis of rotation.

In another embodiment disclosed herein, a method of assembling a delivery payload assembly configured to be deployed from an aircraft and travel along a payload flight path to a predetermined landing destination includes providing a payload configured to be delivered from the aircraft to the predetermined landing destination, attaching a tail-kit assembly to a first end of the payload thereby defining the delivery payload assembly, the tail-kit assembly including a rotor blade assembly including a plurality of rotor blades having a central axis of rotation proximate the first end of the payload, and a flight control and navigation system configured to control a collective pitch angle of each of the plurality of rotor blades of the rotor blade assembly, control an axial thrust force of the rotor blade assembly, the axial thrust force being at an angle with respect to the central axis of rotation of the rotor blade assembly, and navigate the delivery payload assembly along the payload flight path to the predetermined landing destination. The method further includes removing the tail-kit assembly from the payload after the payload is delivered to the predetermined landing destination, wherein the flight control and navigation system is further configured to induce and control an autorotation motion of rotor blade assembly during a portion of the payload flight path of the delivery payload assembly from the aircraft to the predetermined landing destination, and produce and control a vertical thrust force by the rotor blade assembly during an end portion of the payload flight path of the delivery payload assembly from the aircraft to the predetermined landing destination.

In another embodiment disclosed herein, a method of delivering a payload to be deployed from an aircraft along a payload flight path to a predetermined landing destination includes attaching a tail-kit assembly to a first end of the payload thereby defining a delivery payload assembly, programming geographic coordinates of the predetermined landing destination into a flight control and navigation system in the tail-kit assembly, ejecting the delivery payload assembly from the aircraft, navigating, via the flight control and navigation system, the delivery payload assembly along a payload flight path configured to terminate at the predetermined landing destination, controlling, via the flight control and navigation system, an autorotation motion of a rotor blade assembly of the tail-kit assembly to enter a steady-state flight phase having a substantially constant first downward velocity, controlling, via the flight control and navigation system, the rotor blade assembly of the tail-kit assembly to enter a terminal flight phase before the predetermined landing destination, wherein the terminal flight phase has a second downward velocity less than the first downward velocity, wherein flight control and navigation system controls rotation of a leading-edge of each of the plurality of rotor blades of the rotor blade assembly in a positive direction to generate a vertical thrust force based on a moment of inertia of the rotor blade assembly in the autorotation motion, and removing the tail-kit assembly from the payload after the delivery payload assembly arrives at the predetermined landing destination, wherein the removed tail-kit assembly is configured to be attached to a second payload for delivery by an air vehicle to another predetermined landing destination.

In another embodiment disclosed herein, a method of delivering a payload to be deployed from an aircraft along a payload flight path to a predetermined landing destination includes attaching a tail-kit assembly to a first end of the payload thereby defining a delivery payload assembly, programming geographic coordinates of the predetermined landing destination into a flight control and navigation system in the tail-kit assembly, ejecting the delivery payload assembly from the aircraft, controlling, via the flight control and navigation system, a leading-edge of each rotor blade of a rotor blade assembly attached to the tail-kit assembly into a substantially downward disposed orientation, navigating, via the flight control and navigation system, the delivery payload assembly along a payload flight path terminating at the predetermined landing destination, inducing, via the flight control and navigation system, an autorotation motion of the rotor blade assembly by rotating the leading-edge of each rotor blade of the rotor blade assembly toward a plane of rotation of the rotor blade assembly, generating, via the flight control and navigation system, a vertical thrust force on the delivery payload assembly by rotating the leading-edge of each rotor blade of the rotor blade assembly above the plane of rotation of the rotor blade assembly, wherein the vertical thrust force is supplied by a moment of inertia of the rotor blade assembly in the autorotation motion before the predetermined landing destination, and removing the tail-kit assembly from the delivery payload assembly after the delivery payload assembly arrives at the predetermined landing destination, wherein the removed tail-kit assembly is configured to be attached to a second payload for delivery by an air vehicle to a second predetermined landing destination.

BRIEF DESCRIPTION OF THE SEVERAL VIEWS OF THE DRAWINGS

The embodiments presented herein will be better understood from the following detailed description with reference to the drawings, which are not necessarily drawing to scale and in which:

FIG. 9A illustrates a front view of the second alternative embodiment the pitch link type air drop device of FIG. 8 in an undampened state;

FIG. 9B illustrates a front view of the second alternative embodiment the pitch link type air drop device of FIG. 8 in a dampening state;

FIG. 14A illustrates a top perspective view of a rotor pitch control actuator sub-assembly mounted on the gimbal rotor connector of FIG. 13C of the co-planar rotor control type air drop device of FIG. 12;

FIG. 14B illustrates a top perspective view of a rotor sub-assembly covering and supporting the rotor pitch control actuator sub-assembly of FIG. 14A of the co-planar rotor control type air drop device of FIG. 12;

FIG. 15A illustrates a front view of a rotor having a neutral/null angle mounted on the rotor sub-assembly of FIG. 14B of the co-planar rotor control type air drop device of FIG. 12;

FIG. 15B illustrates a front view of the rotor of FIG. 15A having a 90-degree negative angle mounted on the rotor sub-assembly of FIG. 14B of the co-planar rotor control type air drop device of FIG. 12;

FIG. 15C illustrates a front view of the rotor of FIG. 15A having a slight negative angle mounted on the rotor sub-assembly of FIG. 14B of the co-planar rotor control type air drop device of FIG. 12;

FIG. 15D illustrates a front view of the rotor of FIG. 15A having a slight positive angle mounted on the rotor sub-assembly of FIG. 14B of the co-planar rotor control type air drop device of FIG. 12;

FIG. 18A illustrates a front view of the third alternative embodiment co-planar rotor control type air drop device of FIG. 17;

FIG. 18B illustrates a top perspective view of the third alternative embodiment co-planar rotor control type air drop device of FIG. 17;

FIG. 24 illustrates two air drop methods of deploying the co-planar rotor control type air drop device of FIGS. 12-23;

FIG. 26A illustrates a front view of a seventh alternative embodiment having dual counter-rotating four-blade rotor assemblies with no gimbal assembly being similar to the co-planar rotor control type air drop device of FIGS. 18A-18B;

FIG. 26B illustrates a top perspective view of the dual counter-rotating four-blade rotor assemblies of FIG. 25A of the co-planar rotor control type air drop device of FIG. 19;

FIG. 30A illustrates a front view of a ninth alternative embodiment having dual counter-rotating four-blade rotor assemblies similar to the co-planar rotor control type air drop device of FIGS. 27B-28D;

FIG. 30B illustrates a top perspective view of the ninth alternative embodiment having dual counter-rotating four-blade rotor assemblies similar to the co-planar rotor control type air drop device of FIGS. 27B-28D;

DETAILED DESCRIPTION

FIGS. 1-7D illustrate a first embodiment of a pitch link type air drop device 100.

Figure 1:
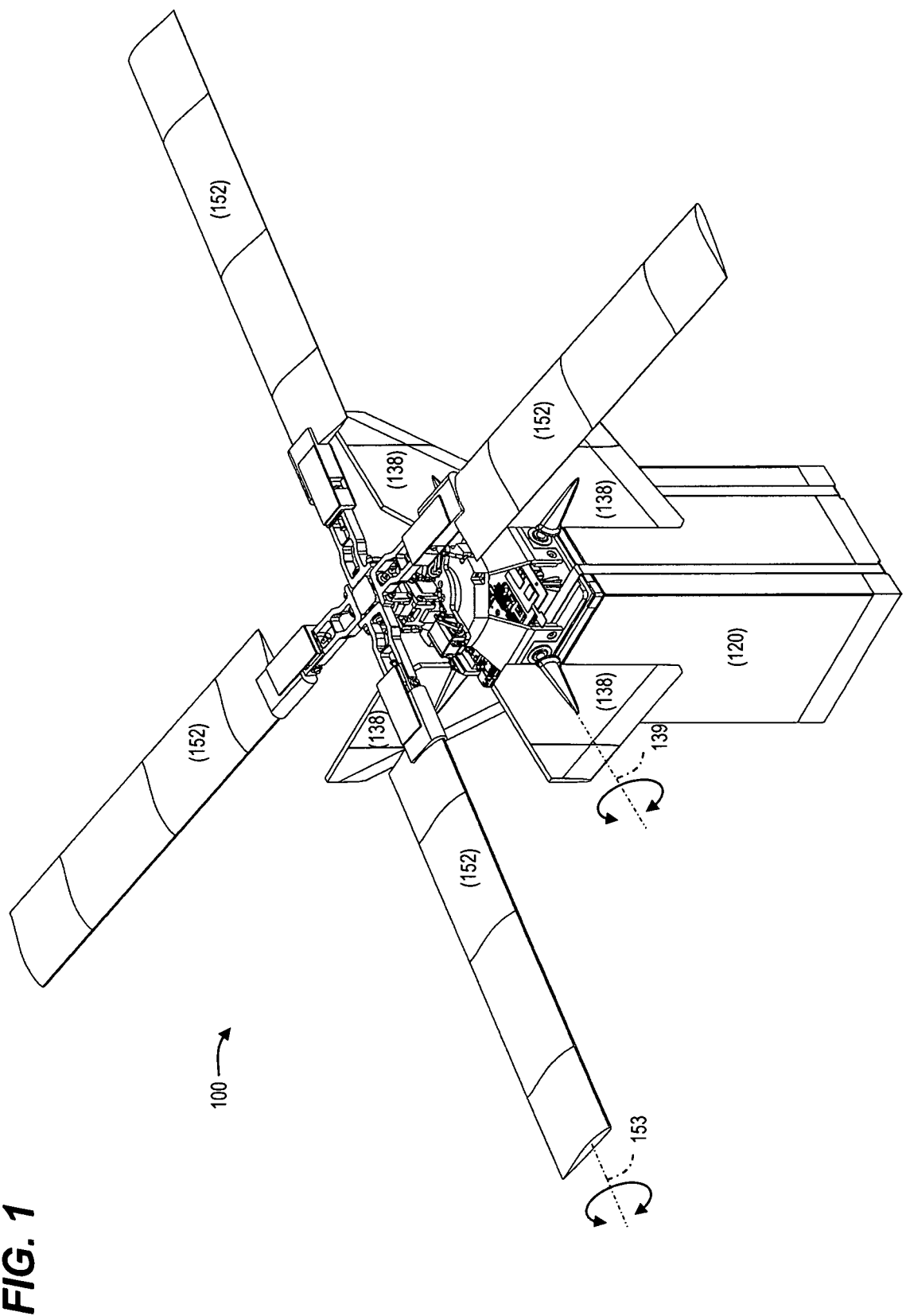
FIG. 1 illustrates a top perspective view of a first embodiment of a pitch link type air drop device.

FIG. 1 illustrates a top perspective view of the first embodiment of a pitch link type air drop device 100, and FIGS. 2A-5B illustrate a series of assembly views of the first embodiment of the pitch link type air drop device 100.

Figure 2B:
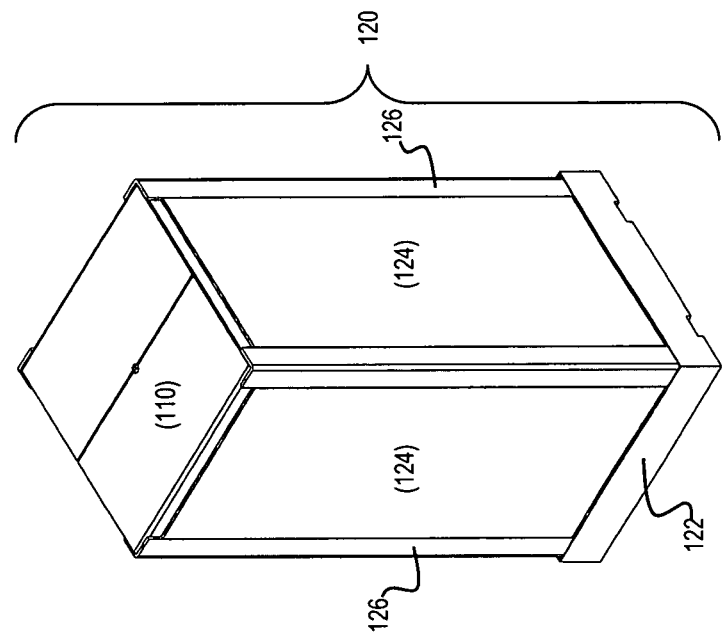
FIG. 2B illustrates a top perspective view of an enclosure surrounding the payload of FIG. 2A retained within the pitch link type air drop device of FIG. 1.
Figure 2A:
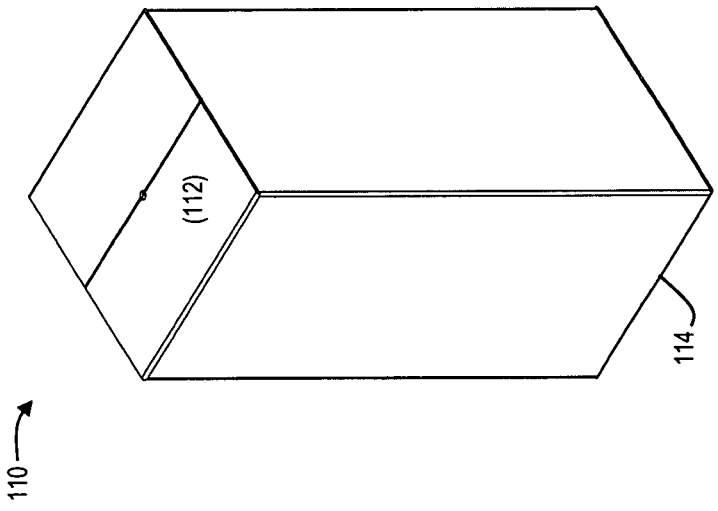
FIG. 2A illustrates a top perspective view of a payload retained within the pitch link type air drop device of FIG. 1.

FIG. 2A illustrates a top perspective view of a payload retained within the pitch link type air drop device 100 of FIG. 1 illustrating a package or payload 110 having a length, width and depth where the shape of the payload 110 may be a rectangular cube shape having a central longitudinal axis therethrough defining a top portion 112 and a bottom portion 114. The payload 110 may comprise any other shape that may be aerodynamically stable during a downward trajectory in an atmosphere after being deployed from an aircraft.

FIG. 2B illustrates a top perspective view of an enclosure defining a containerized payload assembly 120 surrounding the payload 110 of FIG. 2A retained within the pitch link type air drop device 100 of FIG. 1. The containerized payload assembly 120 may include a reinforced base 122 proximate the bottom portion 114 of the payload 110, a plurality of intermediate side panels 124 that surround the exterior sides of the payload 110, and reinforced corner members 126 projecting from reinforced base 122 to the top portion 112 of the payload 110.

Figure 3B:
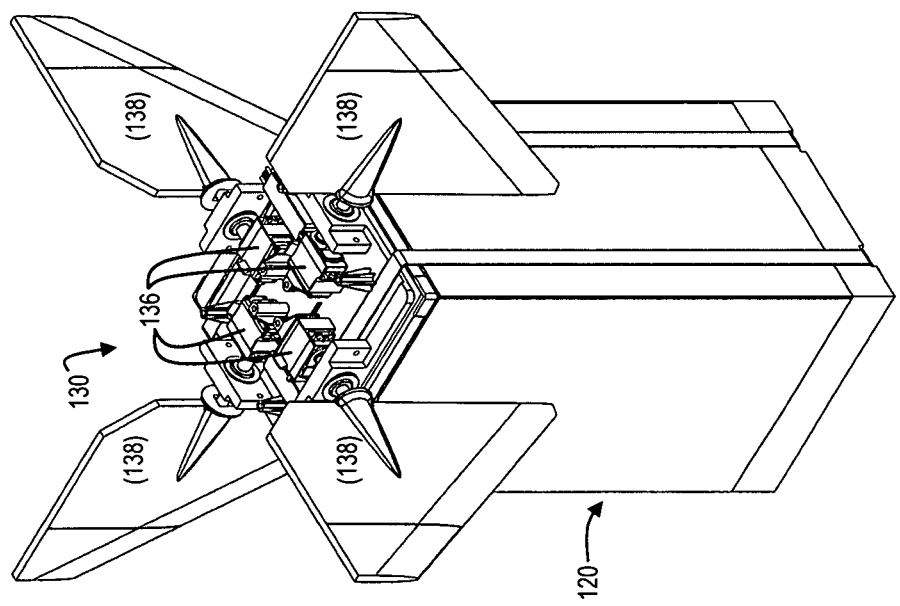
FIG. 3B illustrates a top perspective view of a stabilizer assembly mounted on top of the enclosure of FIG. 2B of the pitch link type air drop device of FIG. 1.
Figure 3A:
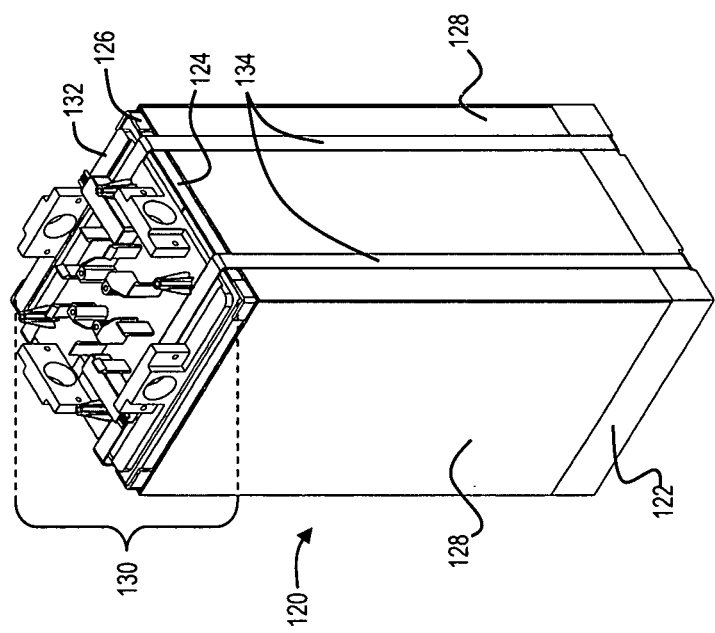
FIG. 3A illustrates a top perspective view of a stabilizer sub-assembly mounted on top of the enclosure of FIG. 2B of the pitch link type air drop device of FIG. 1.

FIG. 3A illustrates a top perspective view of the containerized payload assembly 120 and a flight stabilizer assembly 130 mounted on top of the payload 110 of FIG. 2B of the pitch link type air drop device 100 of FIG. 1. The containerized payload assembly 120 further includes a plurality of exterior panels 128 that overlap each side of the payload 110 and cover the plurality of intermediate side panels 124 surrounding the exterior sides of the payload 110 and the reinforced corner members 126.

A flight stabilizer assembly 130 is mounted on the top portion 112 of the payload 110 and may include a stabilizer base 132 held in place on the top portion 112 of the payload 110 by an attachment mechanism 134, here illustrated as a set of removeable straps or ties surrounding the stabilizer base 132, two opposite sides of the payload 110 and the reinforced base 122.

FIG. 3B illustrates a top perspective view of a flight stabilizer assembly 130 mounted on top of the containerized payload assembly 120 of FIG. 2B of the pitch link type air drop device 100 of FIG. 1. The flight stabilizer assembly 130 may further include and fixedly retain a plurality of stabilizer control surface servomotors 136 connected to respective rotational drive shafts to control surfaces 138 projecting outwardly from stabilizer base 132.

Figure 4A:
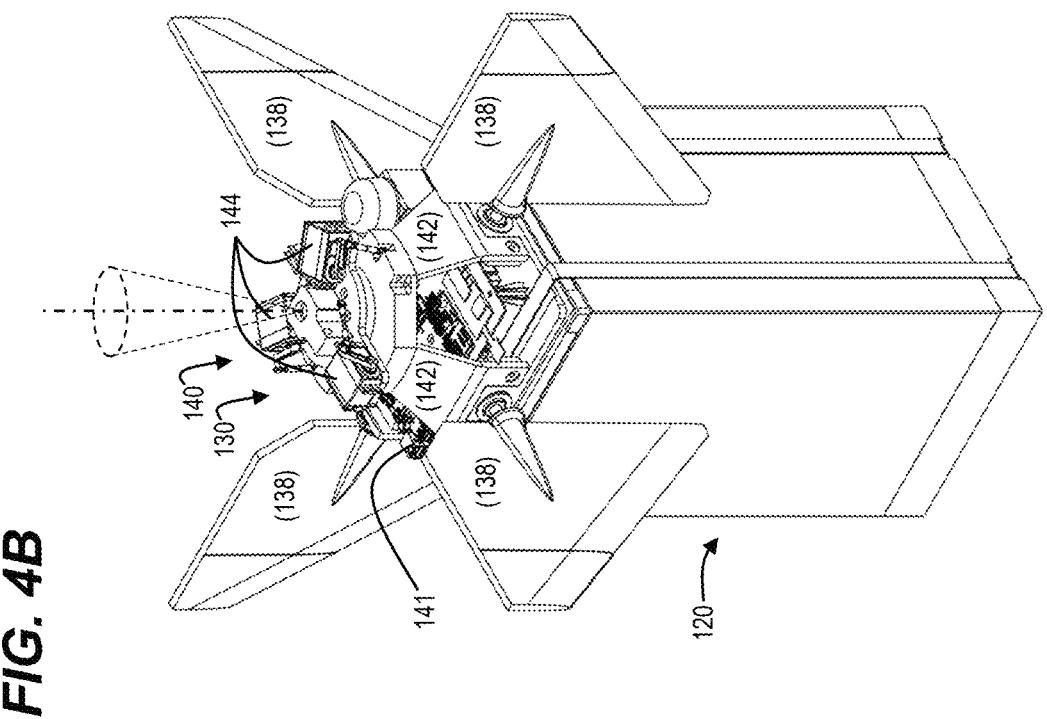
FIG. 4A illustrates a top perspective view of a control system mounting plate mounted on top of the stabilizer assembly of FIG. 3B of the pitch link type air drop device of FIG. 1.

FIG. 4A illustrates a top perspective view of a pitch link control base 142 of a pitch link control assembly 140 mounted on top of the flight stabilizer assembly 130 of FIG. 3B of the pitch link type air drop device 100 of FIG. 1. The pitch link control assembly 140 includes the pitch link control base 142 designed to support the electronic flight controls 141 of the pitch link control assembly 140, the flight stabilizer assembly 130 and a later discussed rotor assembly 150.

Figure 4B:
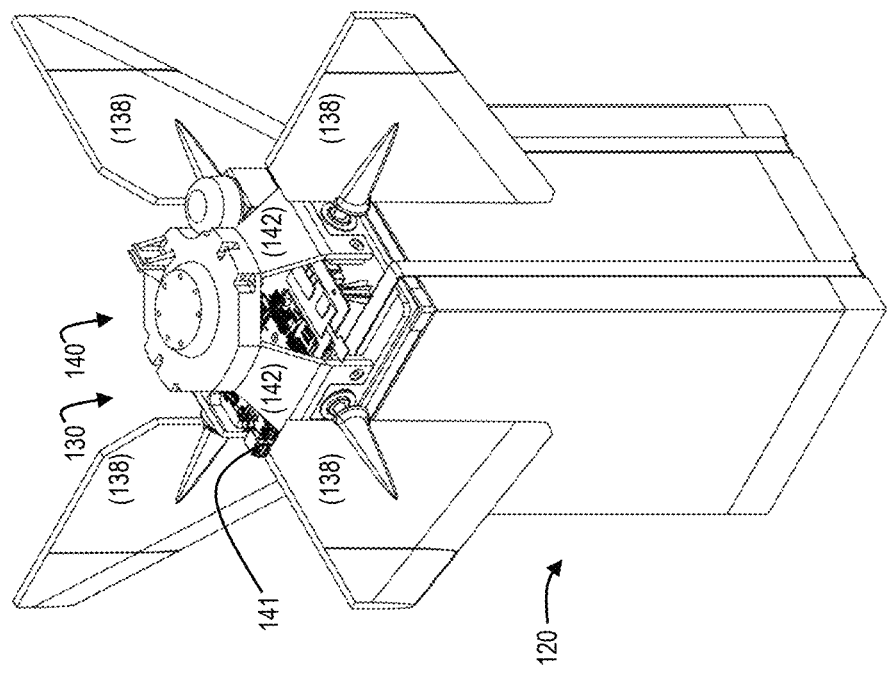
FIG. 4B illustrates a top perspective view of a pitch link actuator sub-assembly mounted on top of the control system mounting plate of FIG. 4A of the pitch link type air drop device of FIG. 1.

FIG. 4B illustrates a top perspective view of a pitch link control assembly 140 mounted on top of the pitch link control base 142 of FIG. 4A of the pitch link type air drop device 100 of FIG. 1, where the pitch link control base 142 supports a plurality of pitch link control servomotors 144 configured to input a collective pitch control and a cyclic pitch control to a rotor assembly 150, (later discussed).

Figure 5B:
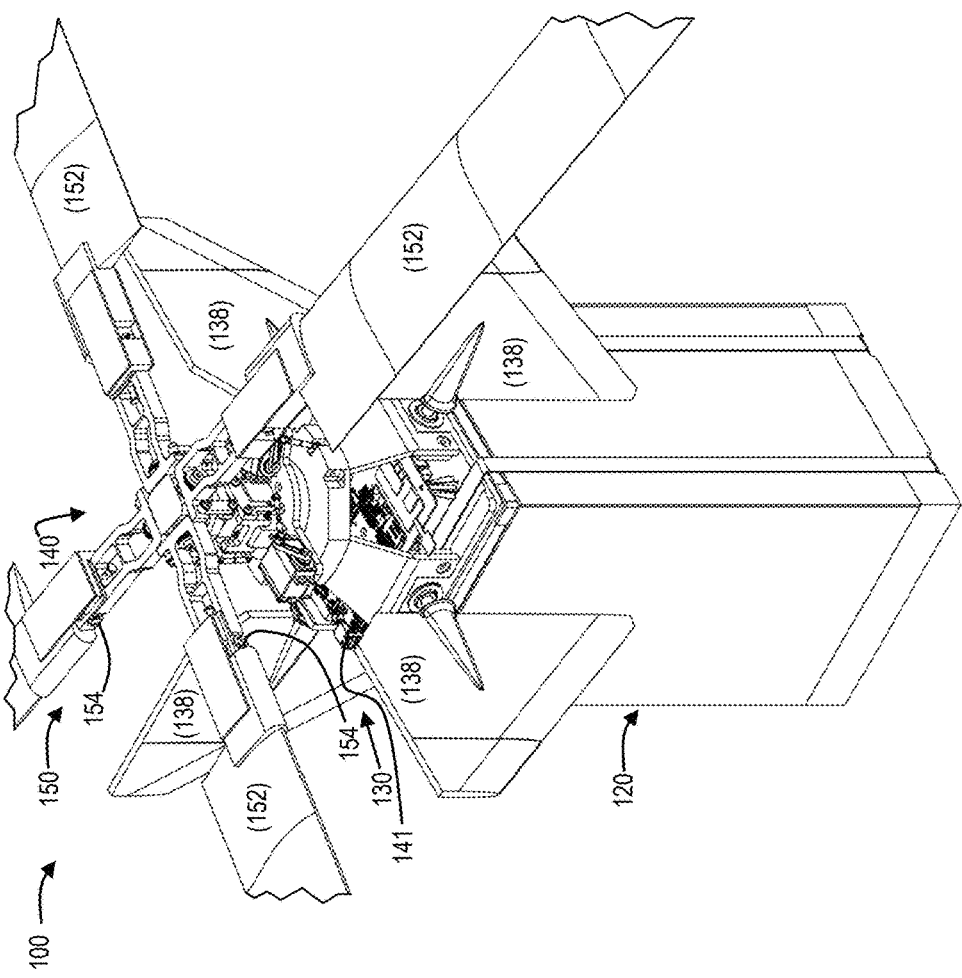
FIG. 5B illustrates a top perspective view of a pitch link-controlled rotor assembly connected to the pitch link assembly of FIG. 5A of the pitch link type air drop device of FIG. 1.
Figure 5A:
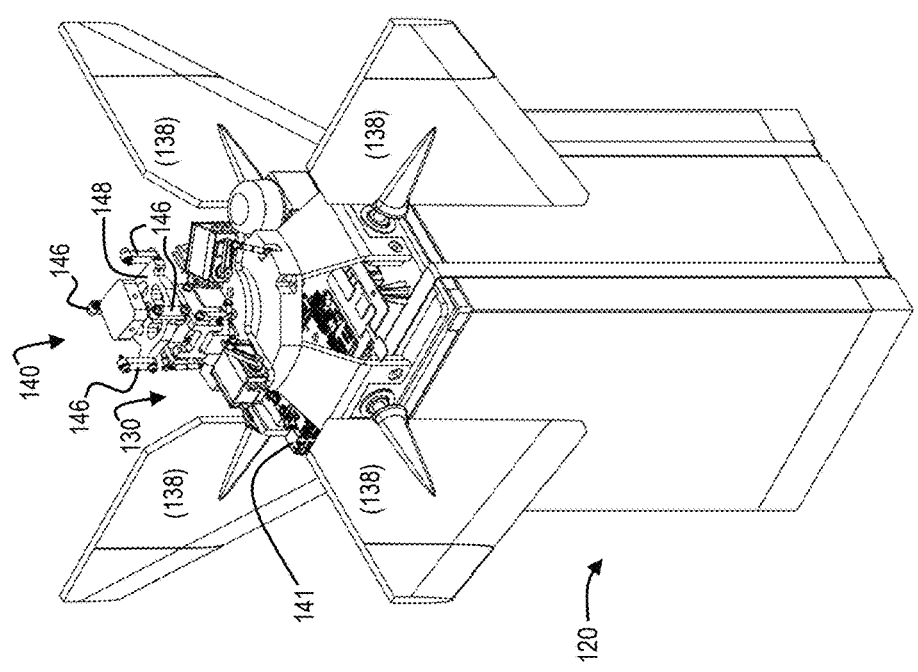
FIG. 5A illustrates a top perspective view of a pitch link assembly connected to the pitch link actuator sub-assembly of FIG. 4B of the pitch link type air drop device of FIG. 1.

FIG. 5A illustrates a top perspective view of a pitch link control assembly 140 connected to the pitch link control base 142 of FIG. 4B of the pitch link type air drop device 100 of FIG. 1 where pitch link control linkages 146 corresponding to each of the plurality of pitch link control servomotors 144, respectively connect to a swashplate 148 for controlling the collective pitch control and cyclic pitch control for a rotor assembly 150.

FIG. 5B illustrates a top perspective view of a pitch link-controlled rotor assembly 150 connected to the pitch link assembly 140 of FIG. 5A of the pitch link type air drop device 100 of FIG. 1. The rotor assembly 150 includes a plurality of rotor blades 152 connected to the swashplate 148 by corresponding pitch link control linkages 146 to control the collective pitch and cyclic pitch for each of the rotor blades 152 of the rotor assembly 150. FIG. 1 illustrates a rotor blade rotational axis 153 of a representative rotor blade 152 of the rotor assembly 150 denoting the axis of rotation about which the rotor blade 152 rotates under control of the swashplate 148 of the pitch link assembly 140.

Figure 6A:
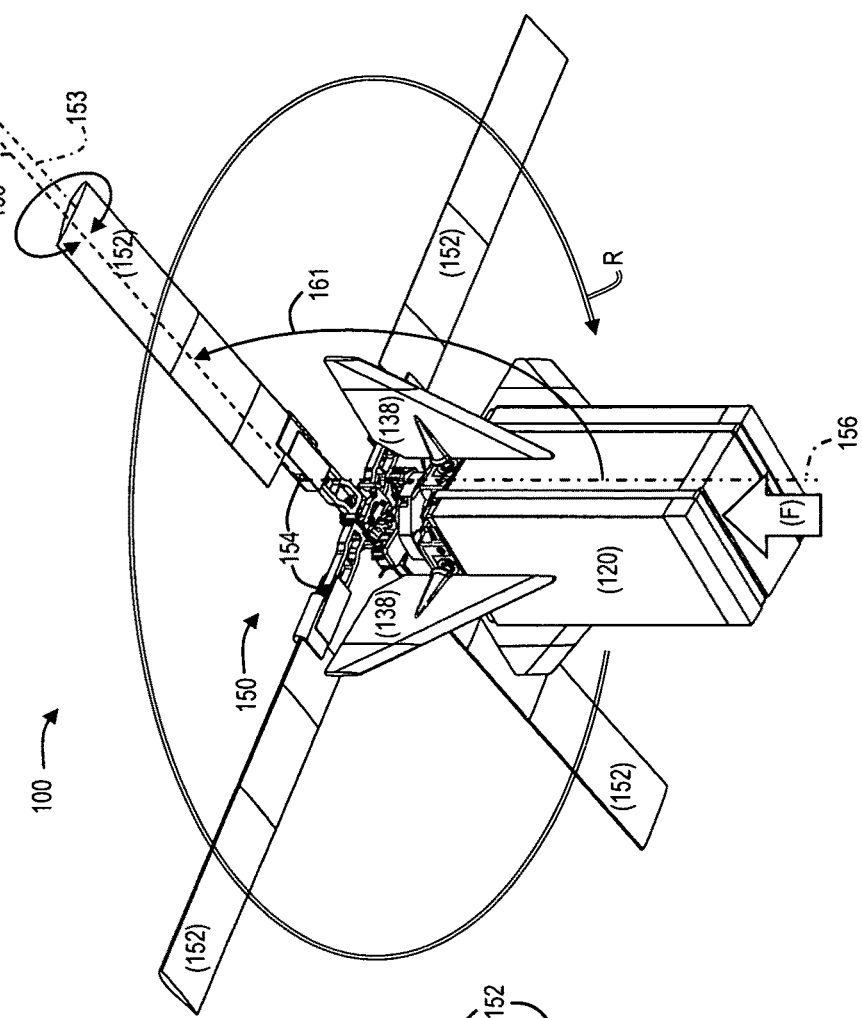
FIG. 6A illustrates a bottom perspective view of a stored and an initial deployment configuration of the pitch link type air drop device of FIG. 1.
Figure 6B:
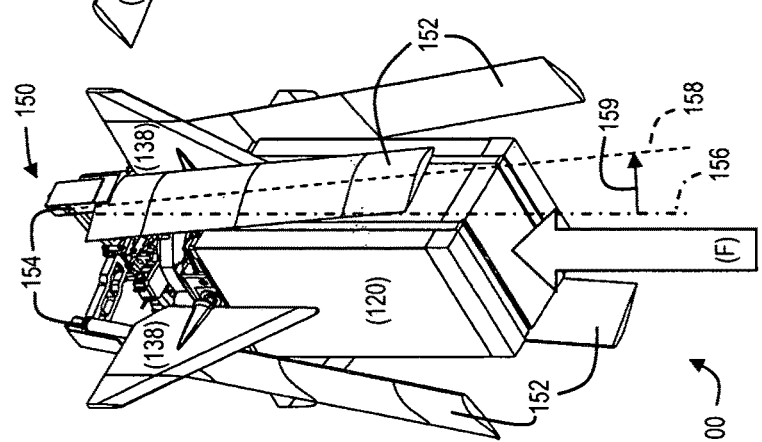
FIG. 6B illustrates a bottom perspective view of a rotor deployment configuration of the pitch link type air drop device of FIG. 1.
Figure 6C:
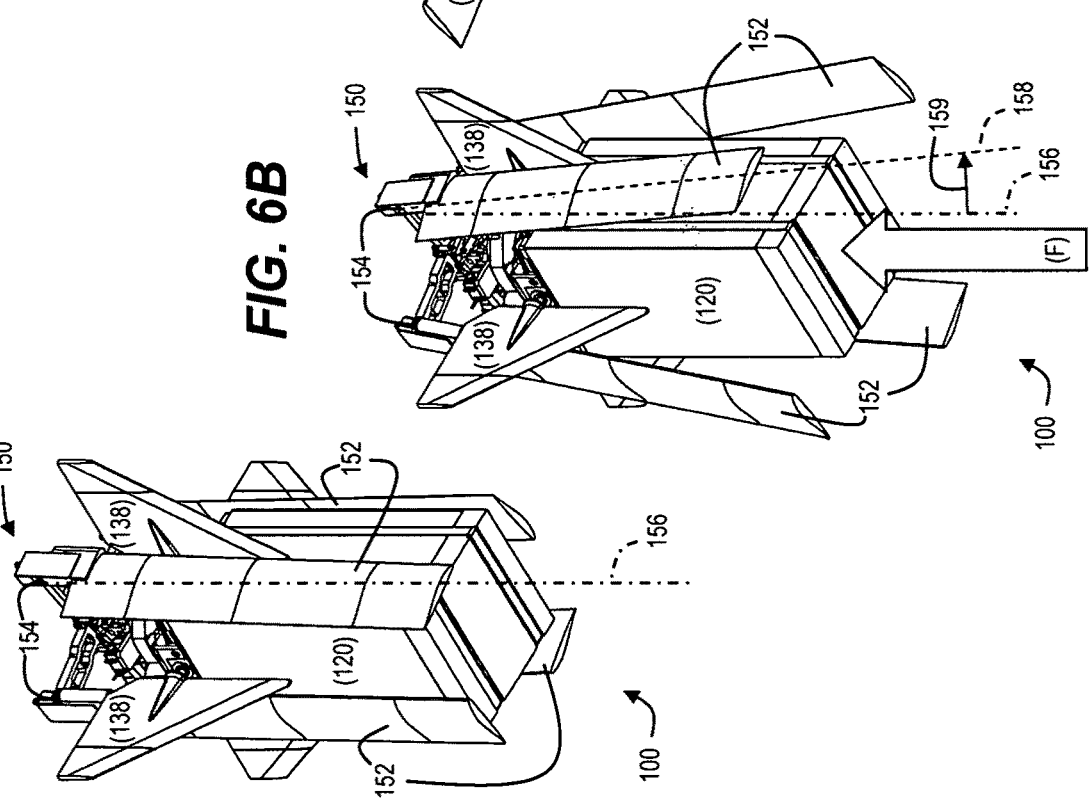
FIG. 6C illustrates a bottom perspective view of a fully rotor deployed configuration of the pitch link type air drop device of FIG. 1.

FIGS. 6A-6C illustrate a rotor deployment sequence from an initial stowed rotor configuration to a fully deployed rotor configuration. FIG. 6A illustrates a bottom perspective view of a stowed and an initial deployment configuration of the pitch link type air drop device 100 of FIG. 1. In this stowed configuration, the pitch link air drop device 100 has each rotor blade 152 folded about a rotor blade folding joint 154 configured to bring the folded rotor blade 152 proximate to the outer edges of the containerized payload assembly 120 surrounding the payload 110. In this stowed configuration, the pitch link air drop device 100 may be moved into an aircraft and stored with other similarly configured air drop devices thus minimizing the volumetric space taken by the air drop devices particularly when a number of the air drop devices need to be stored in and transported for deployment from an aircraft. FIG. 6A further illustrates a folded rotor blade axis 156 denoting the configuration of the rotor blade 152 proximate to the containerized payload assembly 120.

FIG. 6B illustrates a bottom perspective view of a rotor deployment configuration of the pitch link type air drop device 100 of FIG. 1 in a subsequence sequence to FIG. 6A where the rotor blades 152 are disposed in an intermediate configuration along an intermediate rotor blade axis 158 rotated an intermediate angle of rotation 159 from the stowed folded rotor blade axis 156. In this intermediate configuration, the pitch link air drop device 100 may have been deployed from the aircraft and oriented in a downward disposition of an air drop payload flight path to a predetermined target destination and a force (F) of airflow upon the pitch link type air drop device 100 may begin acting upon each of the rotor blades 152 to rotate them into a fully deployed configuration. An alternative configuration may include a timing or trigger device that allows the rotor blades 152 to begin opening after a particular time from the initial aircraft deployment or a trigger condition, for example, a detected altitude or GPS coordinate location, while on the flightpath to the predetermined destination.

FIG. 6C illustrates a bottom perspective view of a fully rotor deployed configuration of the pitch link type air drop device 100 of FIG. 1 where the rotor blades 152 are rotated into a fully deployed configuration about a fully deployed rotor blade axis 160 about a fully deployed angle of rotation 161. The rotation may take place due to a force of wind F while the pitch link type air drop device 100 is traveling along a flightpath to the predetermined target destination. After deployment of the rotor blades 152 to the fully deployed configuration, the pitch link control assembly 140 may control the rotation of the rotor blades 152 for collective pitch control and/or cyclic pitch control purposes to cause the rotor blades to begin and maintain autorotation in a rotational direction R for the purposes of navigation and descent speed control of the pitch link type air drop device 100.

While the rotor blades 152 may be efficiently packed and safely stowed alongside the containerized payload assembly 120 before deployment from an aircraft, a secondary system such as a tether or independent servomotor may release the rotor blades 152 from the initial stowed rotor blade condition as illustrated in FIG. 6A. Once the rotor blades 152 are freed from their initial stowed position, the force (F) of airflow moving over the rotor blades 152 may rotate them into to an operational plane of rotation coincident with the fully deployed rotor blade axis 160 of FIG. 6C. In the alternative, springs, linkages, servomotors, centripetal force or similar actuators may aid rotating the blades into the operational plane of rotation.

Once the rotor blades 152 are rotated into an operational plane of rotation, as in FIG. 6C, a one-way locking mechanism, may lock the rotor blades 152 to prevent further rotor blade movement during the flightpath. An exemplary locking mechanism may consist of spring-loaded pins where a blade grip of the rotor blade 152 rotates to the operational plane of rotation and the spring-loaded pins line up with a corresponding hole and the springs force engagement of the pins in shear to prevent further rotation. Additionally, ball detents, ratchet and pawl or other mechanisms may be used to engage a mechanical lock from the rotating blade assembly 150 to a static hub.

Furthermore, a damping device, (as disclosed below in FIGS. 8-9B), may be used to slow or modify the rate of initial blade rotation from the stowed to fully deployed configuration to prevent overstress due to cantilever loading of the rotor blades 152. Dampening may consist of elastomer stops, gas shocks, springs, friction brakes or a crushable or compliant mechanism to arrest the movement of the rotor blade rotation into the fully deployed configuration.

Figure 7A:
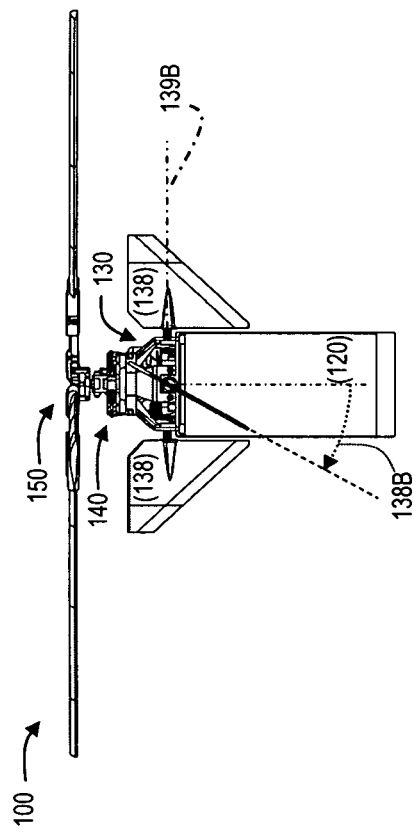
FIG. 7A illustrates a front view of stabilizer control surfaces in a first position of the pitch link type air drop device of FIG. 1.
Figure 7B:
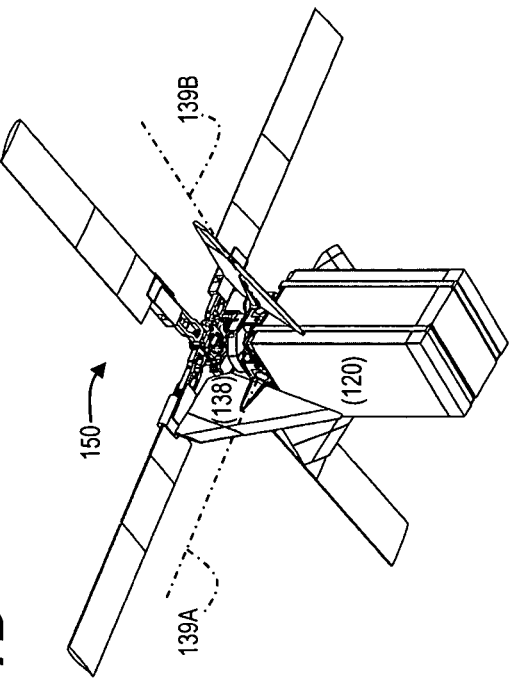
FIG. 7B illustrates a bottom perspective view of the stabilizer control surfaces in the first position of FIG. 7A of the pitch link type air drop device of FIG. 1.

FIGS. 7A-7D illustrate movement of the control surfaces 138 of the flight stabilizer assembly 130 configured to provide directional control of the air drop device 100 while in a payload flight path to maintain the payload flight path to a predetermined landing destination. FIG. 7A illustrates a front view and FIG. 7B illustrates a bottom perspective view of the pitch link air drop device 100 of FIG. 1 with the containerized payload assembly 120, the pitch link control assembly 140, the rotor assembly 150 and the flight stabilizer assembly 130 having stabilizer control surfaces 138 rotated into a first position, for example, represented by reference number 138A in FIG. 7A, about corresponding control surface rotational axes 139A and 139B, as illustrated in FIG. 7B.

Figure 7C:
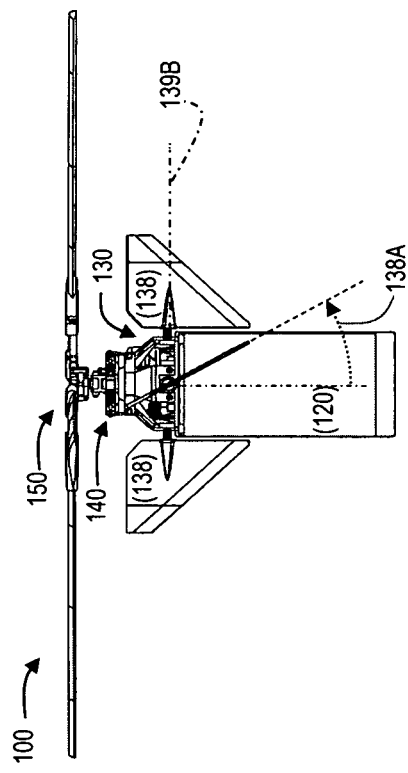
FIG. 7C illustrates a front view of the stabilizer control surfaces in a second opposite position of the pitch link type air drop device of FIG. 1.
Figure 7D:
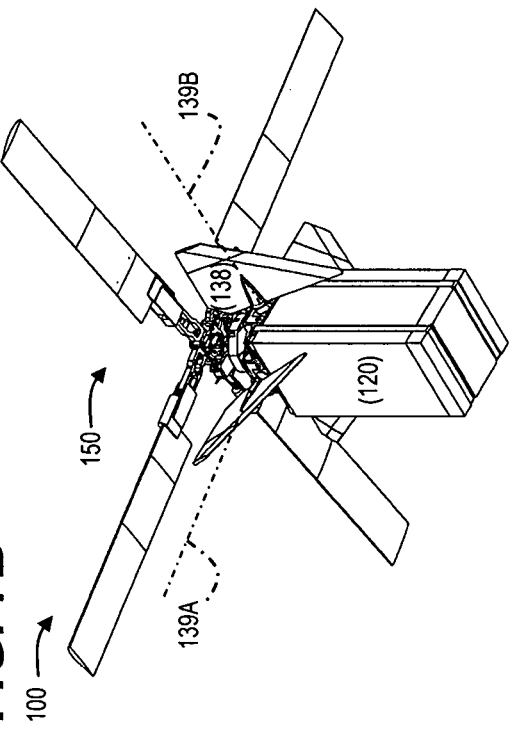
FIG. 7D illustrates a bottom perspective view of the stabilizer control surfaces in the second opposite position of FIG. 7C of the pitch link type air drop device of FIG. 1.

FIG. 7C illustrates a front view and FIG. 7D illustrates a bottom perspective view of the pitch link air drop device 100 of FIG. 1 and FIGS. 7A-7B with the containerized payload assembly 120, the pitch link control assembly 140, the rotor assembly 150 and the flight stabilizer assembly 130 having stabilizer control surfaces 138 rotated into a second position opposite that of the first position of FIGS. 7A-7B, for example, represented by reference number 138B in FIG. 7C, about corresponding control surface rotational axes 139A and 139B, as illustrated in FIG. 7B.

Figure 8:
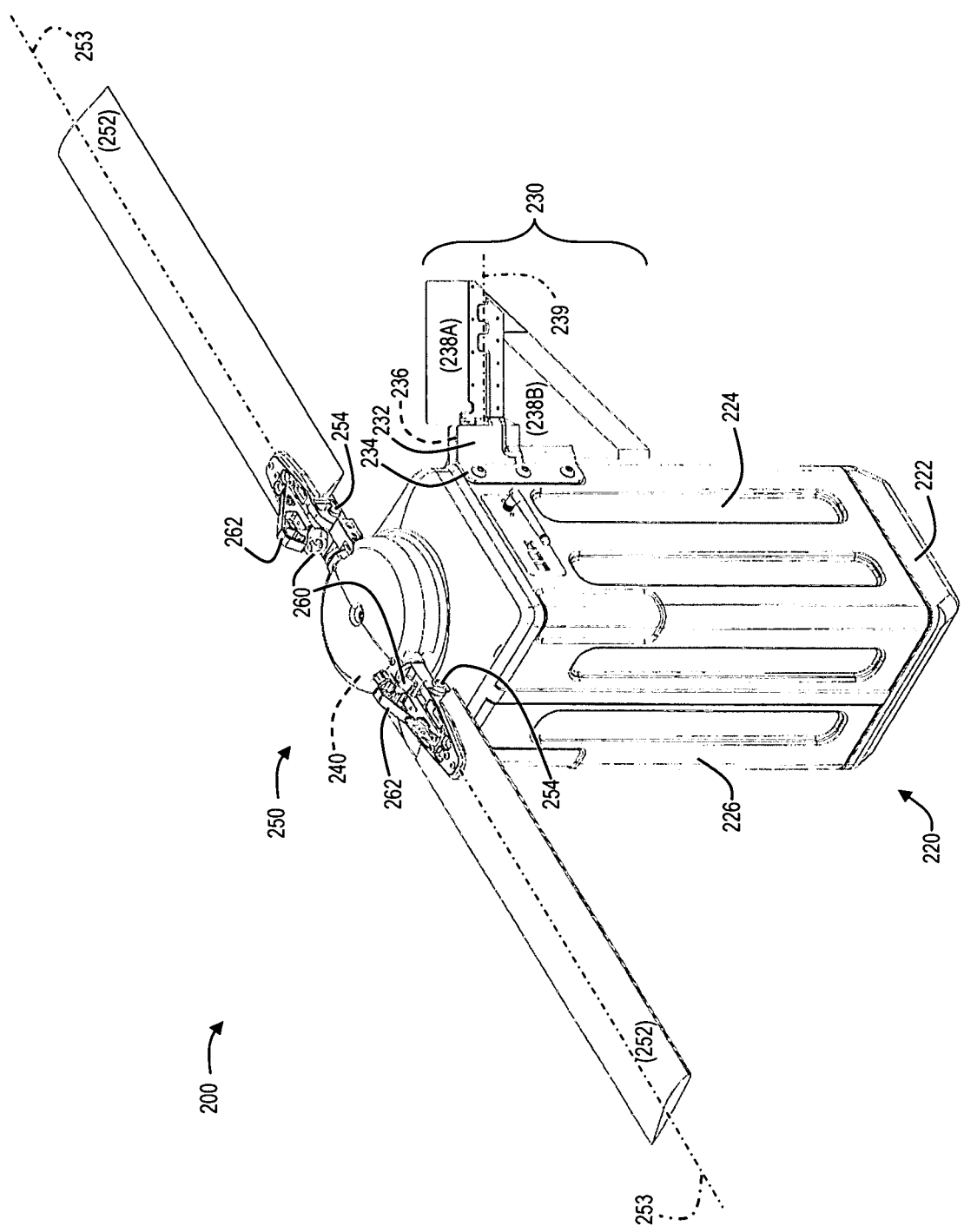
FIG. 8 illustrates a top perspective view of a second alternative embodiment of a pitch link type air drop device of FIGS. 1-7D including a rotor dampening system.

FIGS. 8-9D illustrate a second alternative embodiment of a pitch link type air drop device 200 similar to the pitch link air drop device 100 of FIGS. 1-7D but further including a rotor dampening device 260 and an alternative flight stabilizer assembly 230. FIG. 8 illustrates a top perspective view of the second alternative embodiment of a pitch link type air drop device 200 including a containerized payload assembly 220 having a reinforced base 222, side panels 224, and corner members 226.

FIG. 8 further illustrates an alternative flight stabilizer assembly 230 of a single control surface having a stabilizer base 232 attached to the containerized payload assembly 220 via an attachment mechanism 234, a stabilizer servomotor 236, (not shown), housed in the stabilizer base 232, and a control surface comprising an actuator controlled movable trailing edge control surface 238A and a fixed leading edge control surface 238B. The controlled movable control surface 238A is configured to rotate about a control surface rotation axis 239 to provide rotational thrust about a longitudinal axis of the containerized payload assembly 220 of the pitch link air drop device 200.

FIG. 8 further illustrates a pitch link control assembly 240, (not shown), under a housing similar in configuration to the pitch link control assembly 140 of the pitch link air drop device 100 of FIGS. 1-7D. A rotor assembly 250 includes rotor blades 252 with a rotor blade rotational axis 253 and a rotor blade folding joint 254 similar to the rotor assembly of 150 of FIGS. 1-7D. A rotor dampening device 260 is disposed on each rotor blade 252 opposite the rotor blade folding joint 254 to allow each rotor blade 252 to flex in an upward direction, (as shown in FIG. 9B), when the rotor blades 252 are deploying from a stowed position, (similar to FIG. 6A), into a fully deployed position, (similar to FIG. 6C).

FIG. 9A illustrates a front view of the second alternative embodiment the pitch link type air drop device 200 of FIG. 8 in an undampened state where each rotor blade 252 is positioned in a fully deployed rotor blade rotation plane 258 after the rotor blades 252 fully rotate upwardly along the rotor blade deployment angle 257.

FIG. 9B illustrates a front view of the second alternative embodiment the pitch link type air drop device of FIG. 8 in a dampening state where the rotor dampening device 260 is compressed by a rotor blade dampening extension 262 positioned on the top portion of each respective rotor blade 252 when the rotor blades 252 rotate past about the folding rotor joint 254 the fully deployed rotor blade rotation plane 258 along a rotor blade dampening deflection angle 264 due to rotational inertia of the rotor blades 252 rotating from their stowed position under influence of the force of the upward airflow along the flightpath of the pitch link air drop device 200.

Figure 10:
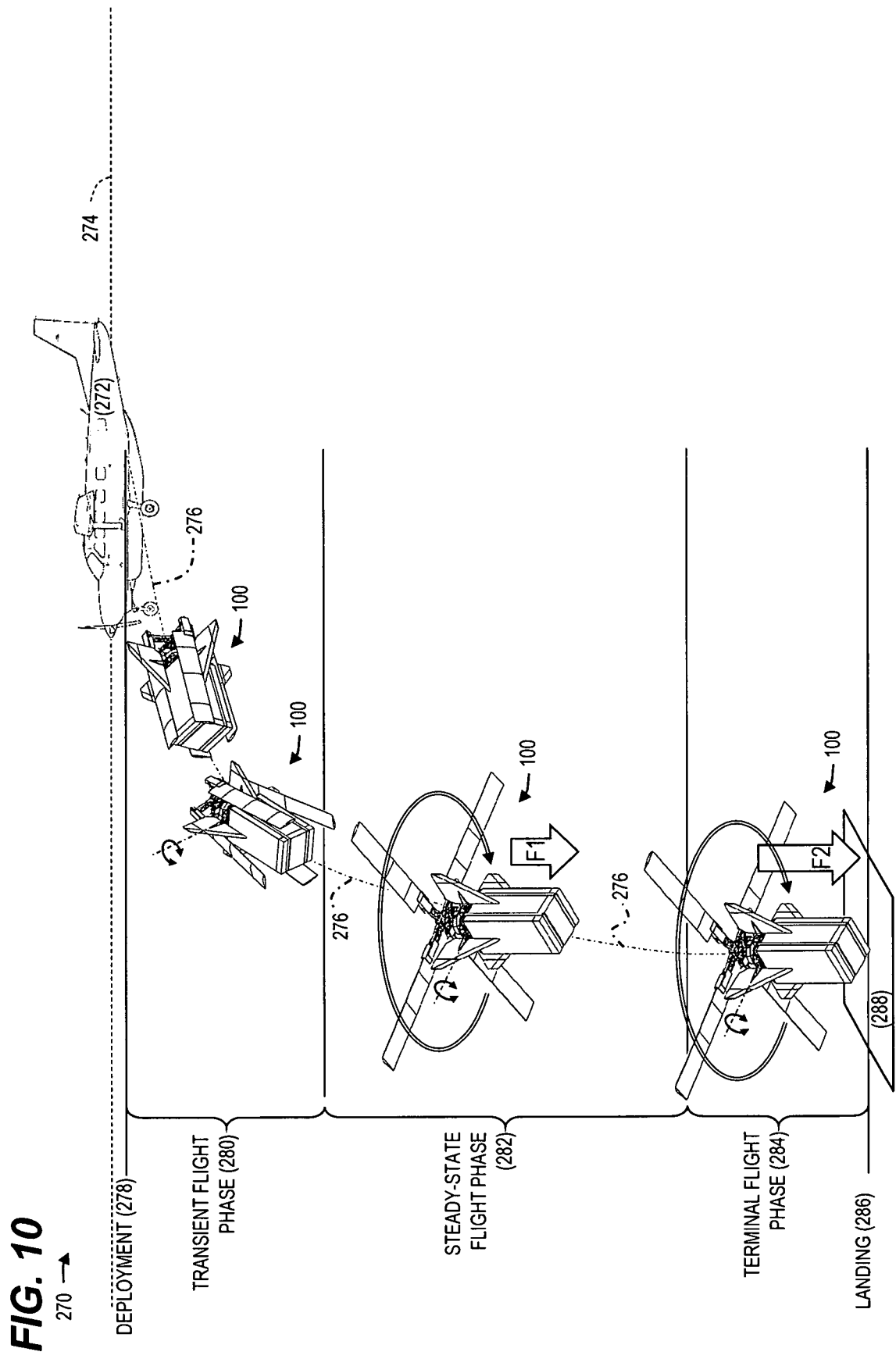
FIG. 10 illustrates an air drop method of deploying the pitch link type air drop device of FIG. 1.

FIG. 10 illustrates an air drop method in a pitch link deployment schematic diagram 270 of deploying the pitch link type air drop device 100 of FIG. 1, or similarly the pitch link type air drop device 200 of FIG. 8, to its predetermined target destination.

The pitch link deployment schematic diagram 270 illustrates an aircraft 272 travelling along an aircraft flight path 274 where upon a predetermined time and/or location of the aircraft 272, an air drop device payload flight path 276 is calculated by a master flight controller of the aircraft and a payload launch controller in the aircraft 272 relative to predetermined target destination 288. A when a launch trigger is executed by the master flight controller and the payload launch controller, the air drop device, e.g., 100, is deployed 278 from the aircraft 272 and enters a transient flight phase 280 where the rotor blades 152, 252 are maintained in a stowed position and the flight stabilizer assembly 130, 230, begins to rotate about their respective axes/axis to orient the air drop device into a downwardly disposed orientation.

A steady-state flight phase 282 is entered when the rotor blades 152, 252 are fully deployed and begin autorotating to provide a thrust force F1 in a downward direction provided by autorotating rotor assembly 150, 250. During the steady-state flight phase, the flight stabilizer assembly 130, 230 and/or the rotor assembly may provide directional control to the pitch link air drop device 100, 200 to maintain the air drop device payload flight path 276.

A terminal flight phase 284 is entered when the rotor blades 152, 252 of the respective rotor assembly 150, 250, rotate the leading-edge of the blades into a positive direction, i.e., flaring the rotor blades, to generate a maximum amount of thrust force F2 in a downward direction based on the rotational inertia of the rotor blades in the autorotation at the end of the steady-state flight phase 282. The force of thrust F2 is greater than the thrust force F1 in the steady-state flight phase 282 and is used immediately before the landing 286 at the predetermined target destination 288 or landing zone. Note that the flight stabilizer assembly 130, 230 and/or the rotor assembly 150, 250 continue to provide directional control to the pitch link air drop device 100, 200 to maintain the air drop device payload flight path 276 during the terminal flight phase 284 immediately above and before the landing 286.

Figure 11:
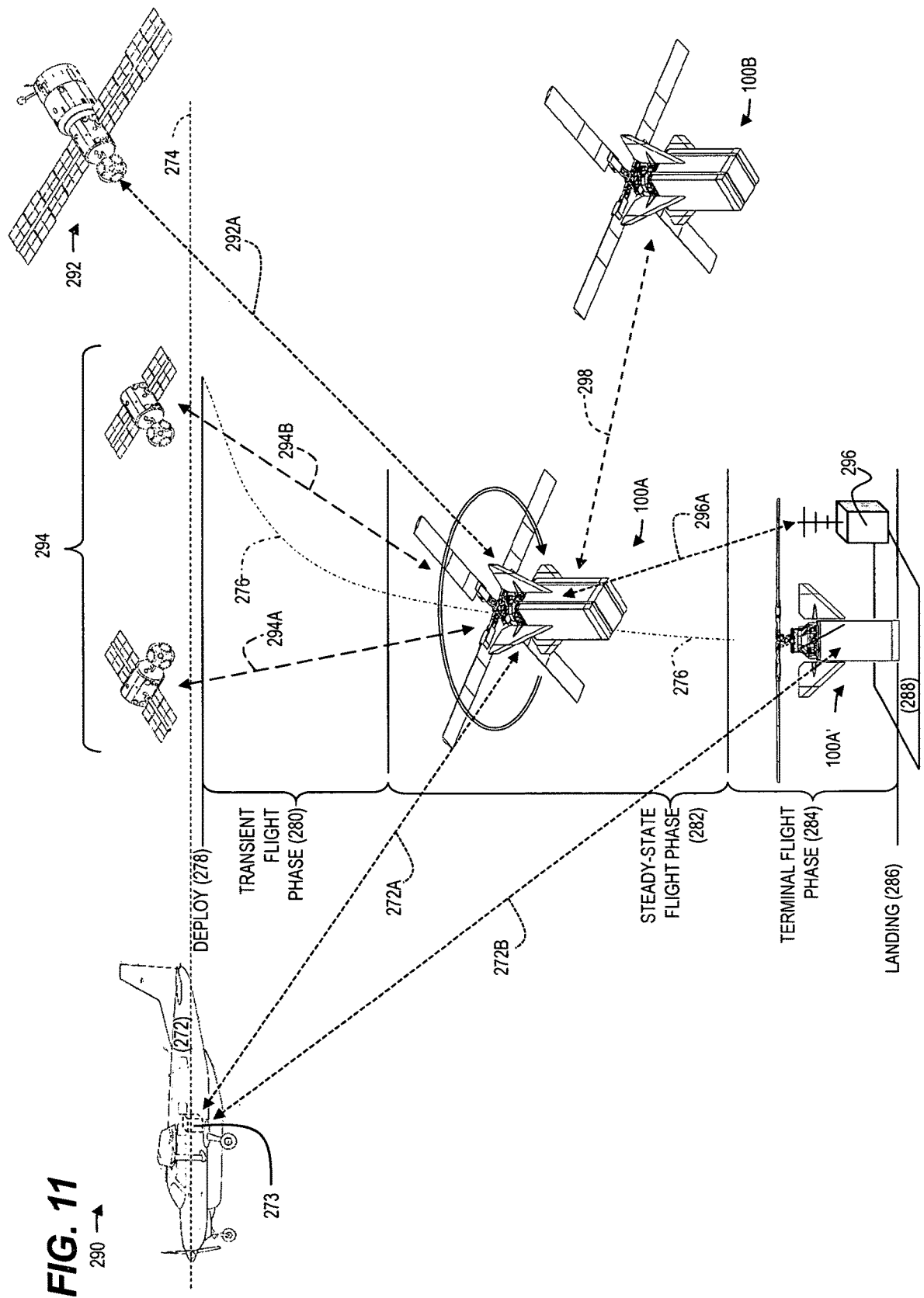
FIG. 11 illustrates a schematic diagram of a system of communication of the pitch link type air drop device of FIG. 1.

FIG. 11 illustrates a schematic diagram 290 of a system of communication of the pitch link type air drop device 100 of FIG. 1 and similarly the air drop device 200 of FIG. 8, however, all the air drop devices disclosed herein may subscribe to all or portions of the system of communication of schematic diagram 290.

FIG. 11 illustrates a representative air drop device 100A traveling along and being maintained in an air drop device payload flight path 276 having bi-directional communication 272A with the aircraft master flight controller and payload launch controller 273 of the aircraft 272 from which it was launched. Bi-directional communication 272A may include course correction information, course deviation information and other in-flight navigation telemetry parameters and controls.

The air drop device 100A in the air drop device payload flight path 276 may alternatively or additionally be in bi-directional communication 292A with a mid-to-high earth orbit satellite 292 which may be a GPS satellite or other non-GPS satellite.

The air drop device 100A in the air drop device payload flight path 276 may alternatively or additionally be in bi-directional communication 294A, 294B with one or a network of low earth orbit satellites 294. The bi-directional communication 294A, 294B may include tracking information and telemetry parameters.

The air drop device 100A in the air drop device payload flight path 276 may alternatively or additionally be in bi-directional communication 296A with a ground station 296 located proximate the predetermined landing destination 288 or landing zone. The bi-directional communication 296A with a ground station 296 may include local wind speed and direction vectors and weather information of the ground station 296. Bi-direction communication 296A between the ground station 296 and air drop device 100A may also be configured to provide flight control and navigation parameters from the ground station 296 to the air drop device 100A when the aircraft 272 is no longer in communication range of the air drop device 100A to provide such communication.

The air drop device 100A in the air drop device payload flight path 276 may alternatively or additionally be in bi-directional communication 298 with a second air drop device 100B that may be been launched before or after the airdrop device 100A. The bi-direction communication between a second air drop device 100B may include weather conditions at various altitudes or other communication parameters.

The representative air drop device 100A' having landed at the predetermined target destination 288 may have bi-directional communication 272B with the aircraft 272 from which is was launched. Bi-directional communication 272B may include landing confirmation information or landing deviation information.

FIGS. 12-15D illustrate a first embodiment of a co-planar rotor control type air drop device. A co-planar rotor control is defined herein to be rotor actuators that control the rotation of the rotor blades being disposed in or proximate to the plane of rotation of the rotor blades. (Similar reference numbers of similar elements from the air drop devices of FIGS. 1-7D will be used in the subsequent air drop device embodiments where appropriate.)

Figure 12:
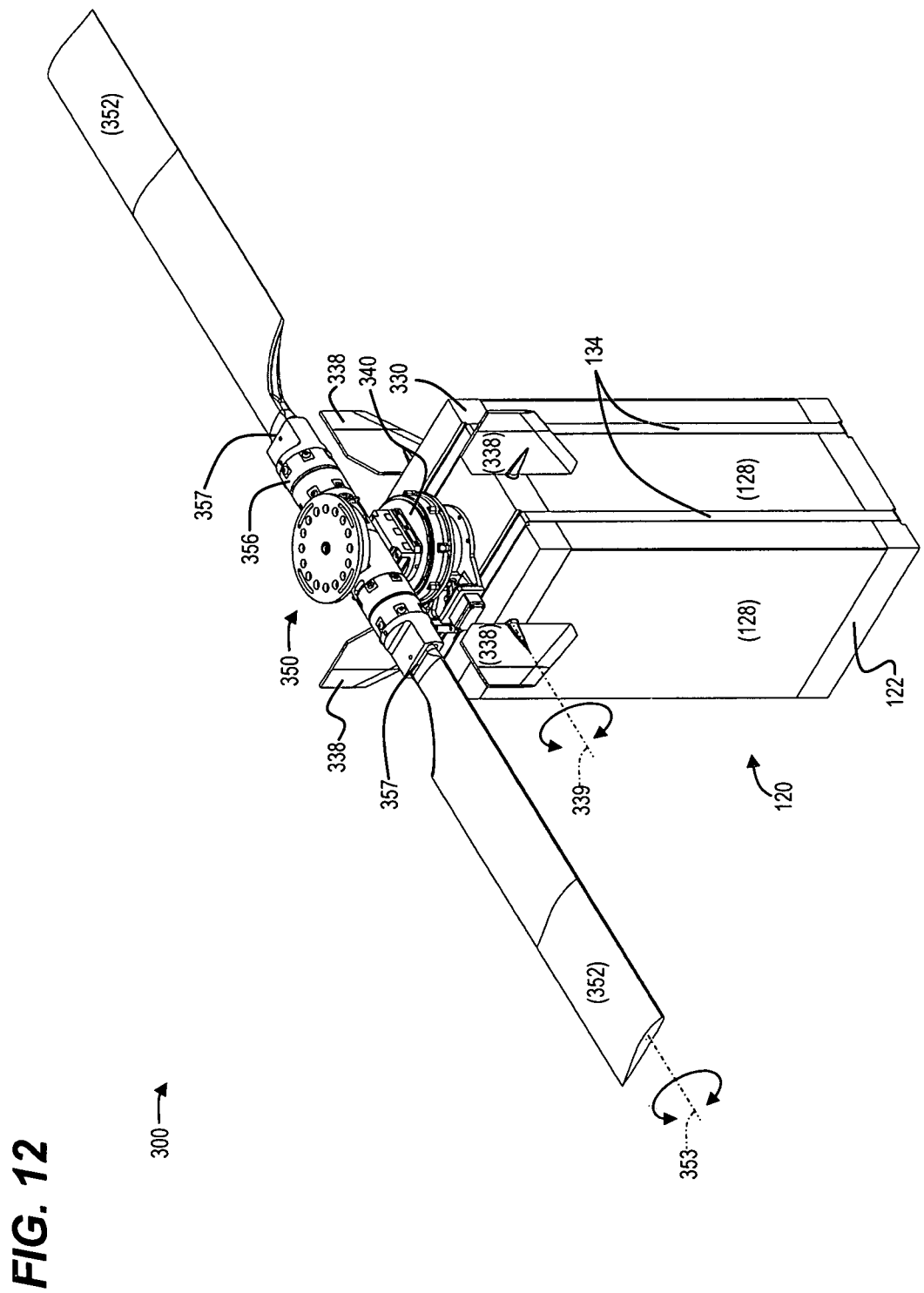
FIG. 12 illustrates a top perspective view of a first embodiment of a co-planar rotor control type air drop device.

FIG. 12 illustrates a top perspective view of the first embodiment of a co-planar rotor control type air drop device 300 used in the transportation of a payload, similar to payload 110 of FIG. 2A, within a containerized payload assembly 120 having a flight stabilizer assembly 330 having flight control surfaces 338 and their respective control surface rotational axis 339.

FIG. 12 further illustrates a rotor assembly 350 having a plurality of rotor blades 352 being co-aligned on a rotor blade rotational axis 353 where each rotor blade 352 includes a rotor blade folding joint 357 for the rotor blades 352 to be stowed in an initial pre-deployment and/or storage configuration similar to FIG. 6A.

Figure 13C:
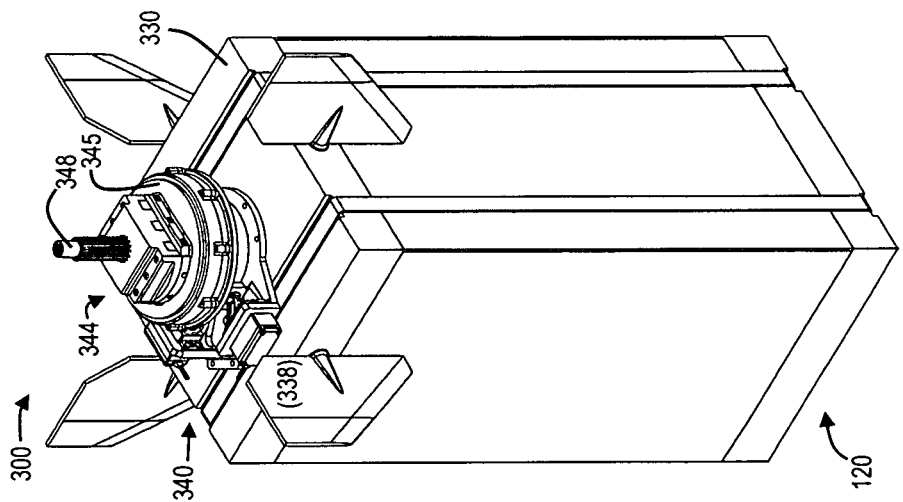
FIG. 13C illustrates a top perspective view of a gimbal rotor connector mounted on the gimbal actuated gimbal controller of FIG. 13B of the co-planar rotor control type air drop device of FIG. 12.
Figure 13B:
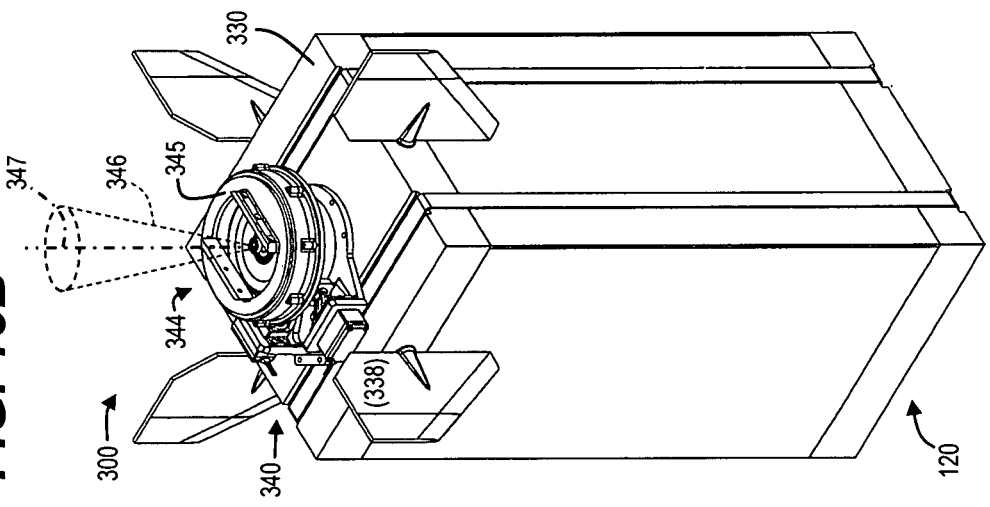
FIG. 13B illustrates a top perspective view of an actuated gimbal controller mounted on the gimbal surface of FIG. 13A of the co-planar rotor control type air drop device of FIG. 12.
Figure 13A:
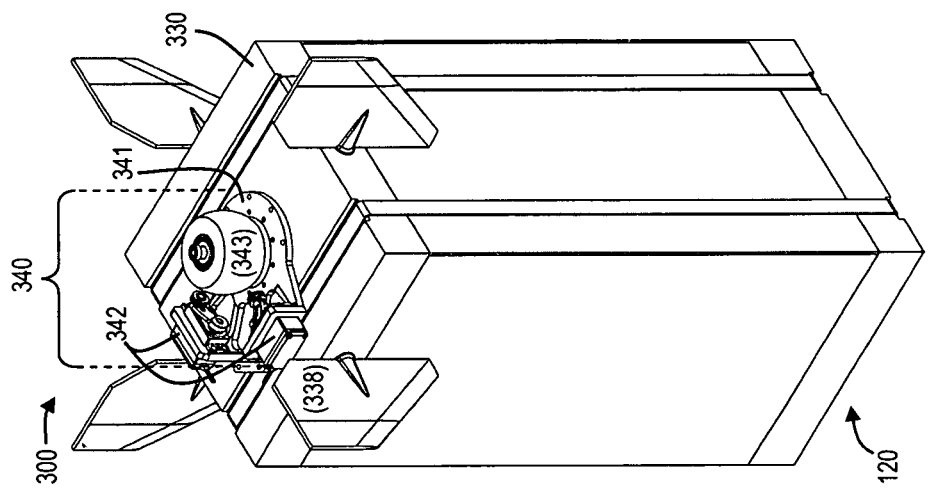
FIG. 13A illustrates a top perspective view of a payload, enclosure, stabilizer assembly, (similar to FIG. 3), and a gimbal surface of the co-planar rotor control type air drop device of FIG. 12.

FIG. 13A illustrates a top perspective view of the co-planar rotor control type air drop device 300 includes a gimbal assembly 340 and rotor assembly 350, (described below in more detail in FIGS. 14A-14B). The gimbal assembly 340 includes a gimbal mounting base 341 attached to the upper surface of the flight stabilizer assembly 330, upon which are two gimbal servomotors 342 proximate a gimbal spherical surface 343.

FIG. 13B illustrates a top perspective view of the gimbal assembly 340 where a rotor base assembly 344 is mounted on and surrounds the gimbal spherical surface 343 and is connected to each of the two gimbal servomotors 342 to control an X and Y direction in a horizontal plane orthogonal to the rotational central axis 347 of the rotor blade assembly 350, (disclosed below). The rotor base assembly 344 further includes a rotor assembly rotational bearing 345 directly mounted on the gimbal spherical surface 343 wherein the rotor base assembly 344 is controlled to move in a gimbal angular range of motion 346 about the rotational central axis 347 by the two gimbal servomotors 342.

FIG. 13C illustrates a top perspective view of a gimbal rotor assembly 340 mounted on the gimbal spherical surface 343 of FIG. 13A further including a gimbal-rotor assembly connection 348 upon which the rotor assembly 350 is connect to.

FIG. 14A illustrates a top perspective view of a rotor blade angular actuators 354 and rotor blade rotational shaft and bearing assembly 355 in alignment with the rotor blade rotational axis 353 being mounted on the gimbal-rotor assembly connection 348 of FIG. 13 C. Note the rotor blade angular actuators 354 may include rotor blade servomotors configured to control the angular direction of the leading edge of the rotor blades 352 with respect to a rotor blade rotation plane 358, (see FIGS. 15A-15D). The rotor blade servo motors 354 are located in a rotary reference frame defined by the rotor blade assembly 350 independent of a stationary or fixed reference frame defined by the stabilizer assembly 330 and the containerized payload assembly 120.

FIG. 14B illustrates a top perspective view of the rotor blade angular actuators 354 and the rotor blade rotational shaft and bearing assembly 355 in alignment with the rotor blade rotational axis 353 of FIG. 14A being covered with a rotor blade actuator housing 356.

FIG. 15A illustrates a front view of a rotor blade 352 having a leading-edge neutral/null angle with respect to a rotor blade rotation plane 358 mounted on the rotor sub-assembly of FIG. 14B of the co-planar rotor control type air drop device 300 of FIG. 12.

FIG. 15B illustrates a front view of a rotor blade 352 having a leading-edge 90-degree negative angle with respect to a rotor blade rotation plane 358 mounted on the rotor sub-assembly of FIG. 14B of the co-planar rotor control type air drop device 300 of FIG. 12. In this leading-edge angular orientation, the air drop device is able to travel at a maximum vertical descent speed with minimal resistance from the rotor blades 352 and, at the same time, use angular rotation of the rotor blades 352 to navigate either alone or in conjunction with the control surfaces 338 of the stabilizer assembly 330.

FIG. 15C illustrates a front view of a rotor blade 352 having a leading-edge slight negative angle with respect to a rotor blade rotation plane 358 mounted on the rotor sub-assembly of FIG. 14B of the co-planar rotor control type air drop device 300 of FIG. 12. In this leading-edge angular orientation, the rotor assembly is configured to achieve an autorotating motion and provide a downward thrust force due to the rotor blades 352 while providing collective and cyclic pitch control of the rotor blades to navigate toward the predetermined target destination.

FIG. 15D illustrates a front view of a rotor blade 352 having a leading-edge slight positive angle with respect to a rotor blade rotation plane 358 mounted on the rotor sub-assembly of FIG. 14B of the co-planar rotor control type air drop device 300 of FIG. 12. In this leading-edge angular orientation, the rotor assembly is configured to achieve an increased downward thrust force, in comparison to the autorotation downward thrust force, due to the energy of rotational inertia of the rotor blades 352 in the previous autorotating state immediately before the air drop device lands at the predetermined target destination. This increased thrust force further slows down the airdrop device in anticipation of impacting the landing zone.

Figure 16:
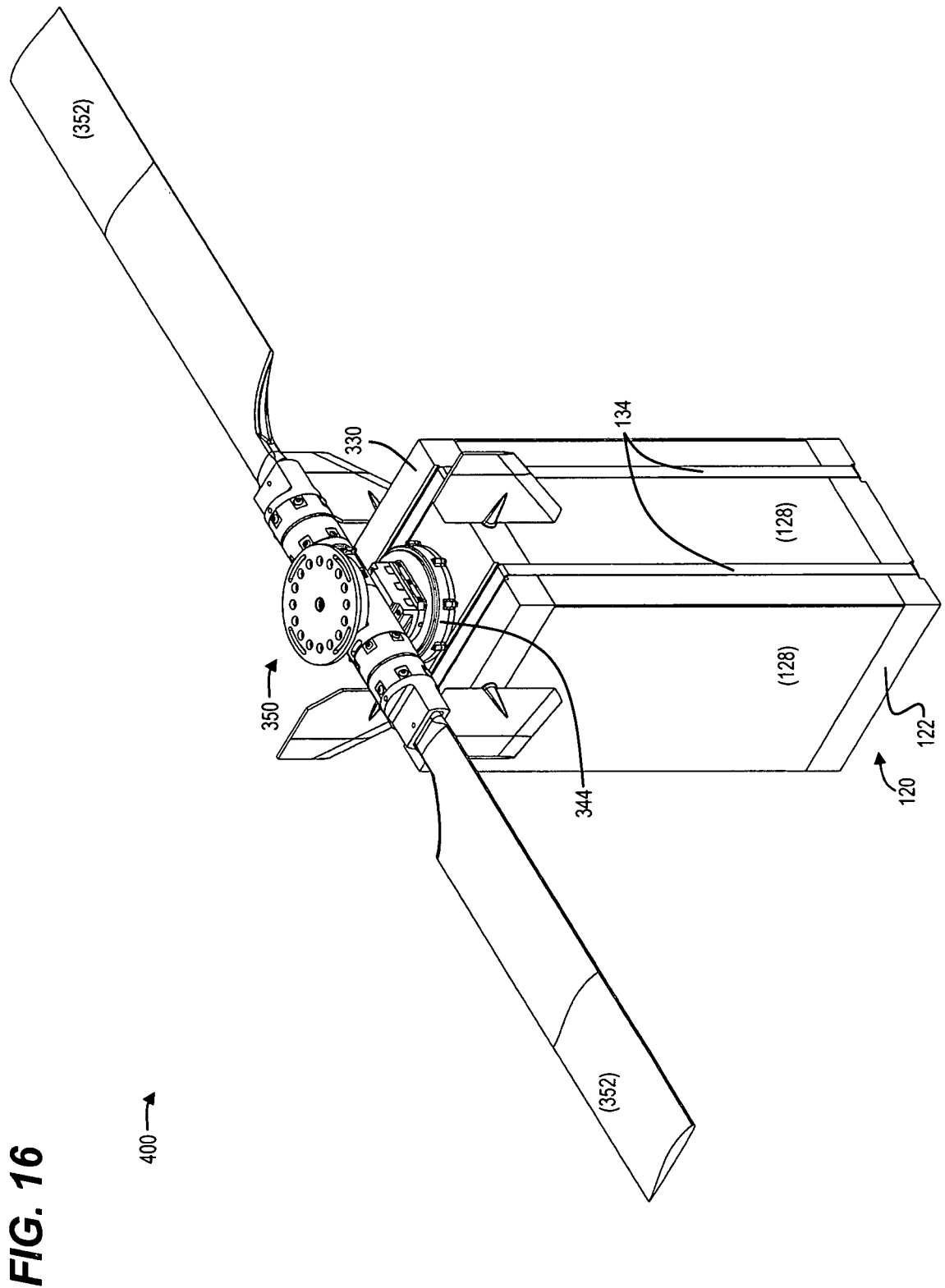
FIG. 16 illustrates a top perspective view of a second alternative embodiment having no gimbal assembly components being similar to the co-planar rotor control type air drop device of FIG. 12.

FIG. 16 illustrates a top perspective view of a second alternative embodiment of a co-planar rotor control air drop device 400, similar to the co-planar rotor control type air drop device 300 of FIG. 12, but without a gimbal assembly 340 as illustrated in FIGS. 12-15D. The second alternative embodiment of a co-planar rotor control air drop device 400 functions identically to the air drop device 300 with the gimbal assembly 340 but may have more powerful servomotors controlling the rotor blade pitch actuation to allow for increase maneuverability without a dedicated gimbal assembly.

Figure 17:
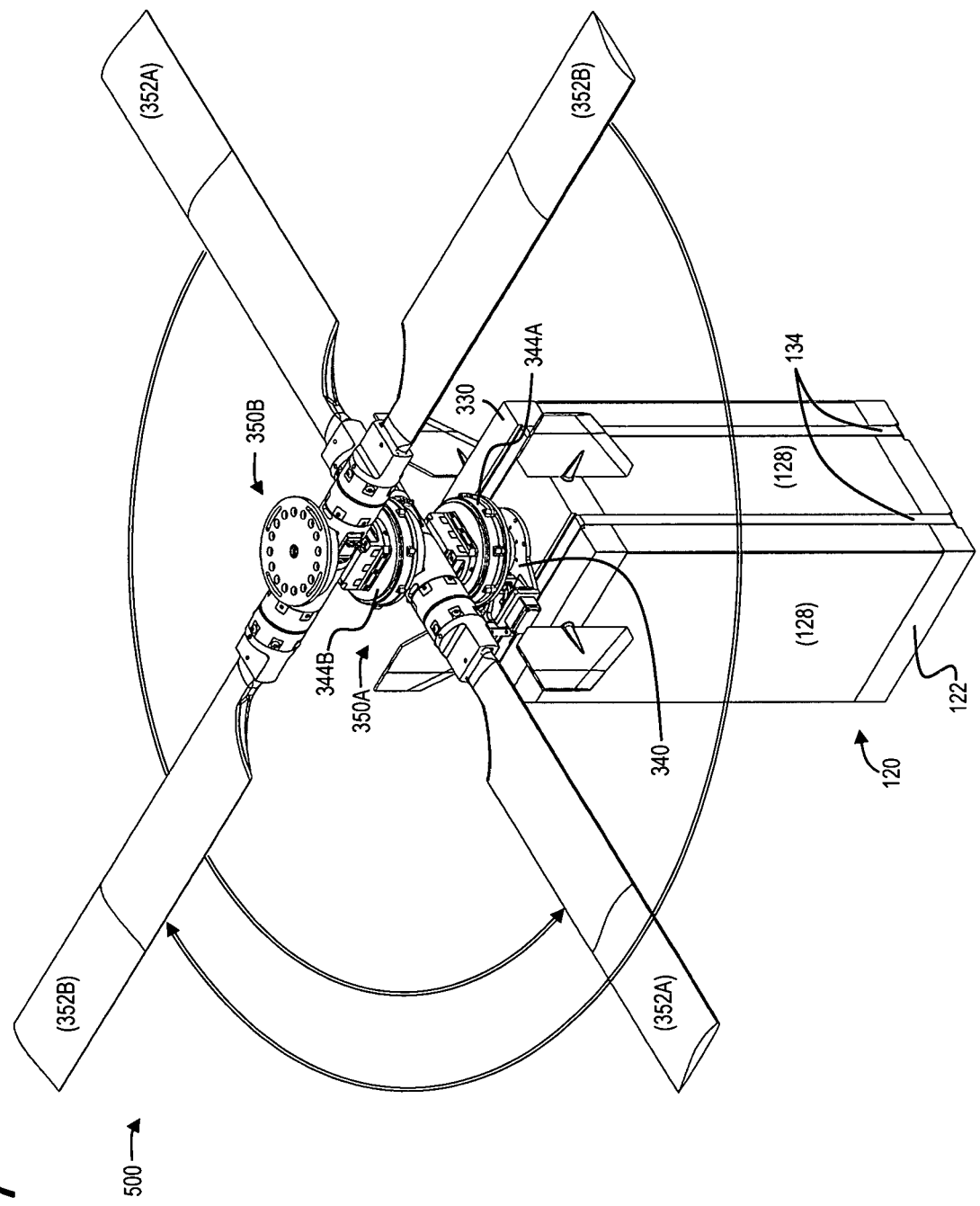
FIG. 17 illustrates a top perspective view of a third alternative embodiment having dual counter-rotating rotor assemblies mounted on a gimbal assembly being similar to the co-planar rotor control type air drop device of FIG. 12.

FIG. 17 illustrates a top perspective view of a third alternative embodiment of a co-planar rotor control air drop device 500, similar to the co-planar rotor control type air drop device 300 of FIG. 12, further including a second rotor assembly 350B connected via a second rotor base assembly 344B to a first rotor assembly 350A connected via a first rotor base assembly 344A further attached to a gimbal assembly 340. Each of the rotor assemblies 350A, 350B rotate in opposite counter-rotating directions.

FIGS. 18A-18B illustrate front and top perspective views, respectively, of the third alternative embodiment co-planar rotor control type air drop device 500 of FIG. 17 in an alternate configuration without the gimbal assembly 340 as illustrated in FIG. 17. This embodiment may include more powerful servomotors to control rotor blade pitch actuation to allow for increased maneuverability without a gimbal assembly.

FIGS. 19-22D illustrate a fourth alternative embodiment of a co-planar air drop device 600 having a four-blade rotor assembly 650 mounted on the gimbal assembly 340 similar to the co-planar rotor control type air drop device 303 of FIG. 12.

Figure 19:
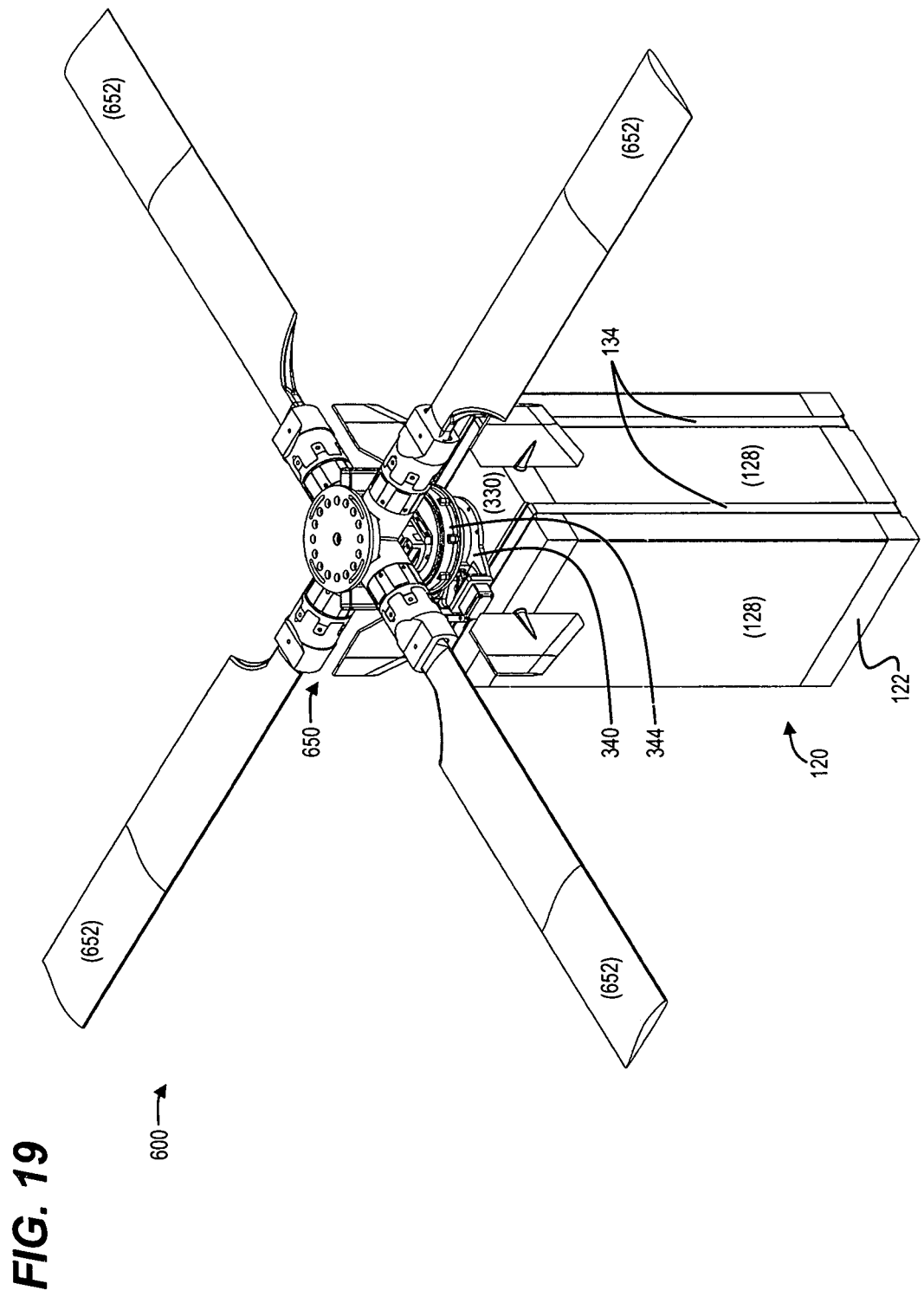
FIG. 19 illustrates a top perspective view of a fourth alternative embodiment having a four-blade rotor assembly mounted on a gimbal assembly being similar to the co-planar rotor control type air drop device of FIG. 12.

FIG. 19 illustrates a top perspective view of the fourth alternative embodiment of the co-planar air drop device 600 having a four-blade rotor assembly 650 with four rotor blades 652 each having rotor blade rotational axes, e.g., 653A, 653B, (see FIGS. 20A-20B), a gimbal assembly 340, a flight stabilizer assembly 330, and a containerized payload assembly 120.

Figure 20B:
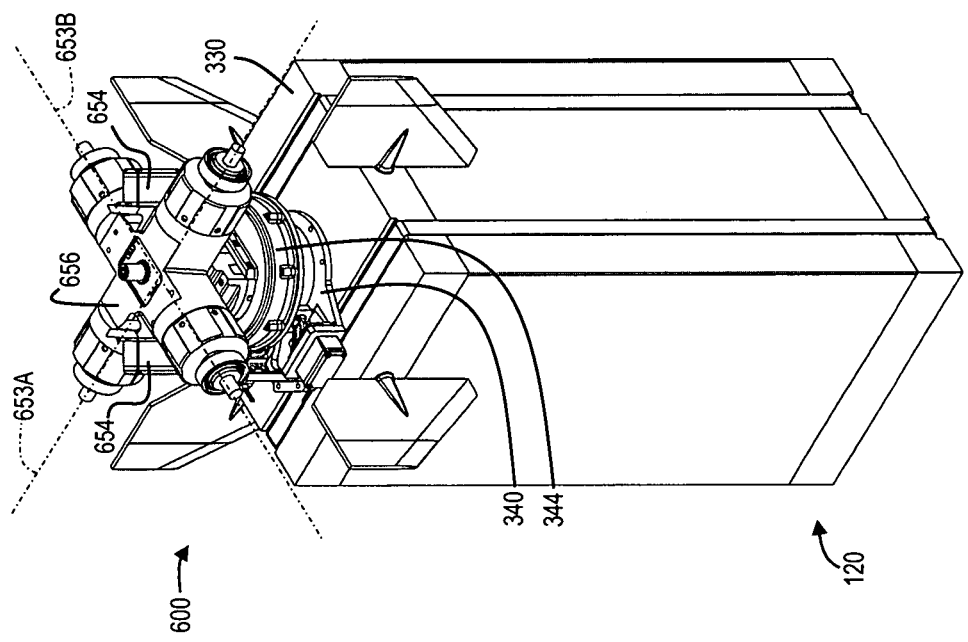
FIG. 20B illustrates a top perspective view of the fourth alternative embodiment having a rotor sub-assembly covering and supporting the dual rotor rotational control actuators of the co-planar rotor control type air drop device of FIG. 19.
Figure 20A:
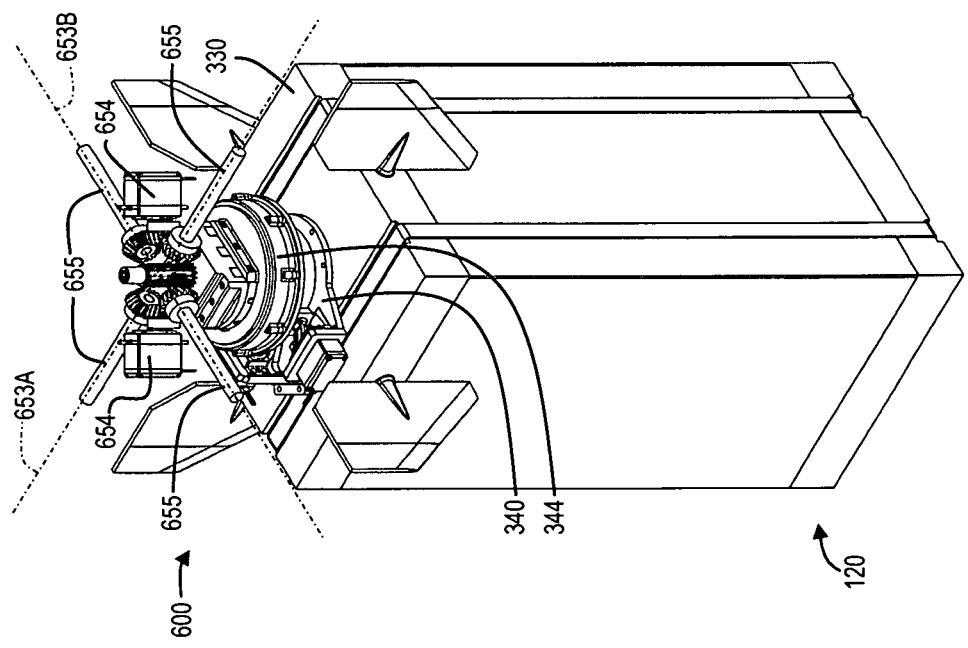
FIG. 20A illustrates a top perspective view of the fourth alternative embodiment having dual rotor rotational control actuators of the co-planar rotor control type air drop device of FIG. 19.

FIG. 20A illustrates a top perspective view of the fourth alternative embodiment of the co-planar air drop device 600 of FIG. 19 including two exemplary rotor blade angular actuators 654 each connected to two adjacent rotor blade rotational drive shafts 655 aligned on respective rotor blade rotational axes 653A, 653B.

FIG. 20B illustrates a top perspective view of the fourth alternative embodiment of the co-planar air drop device 600 of FIG. 19 further including a rotor blade actuator housing 656 covering the rotor blade angular actuators 654 and the rotor blade rotational drive shafts 655.

Figure 21:
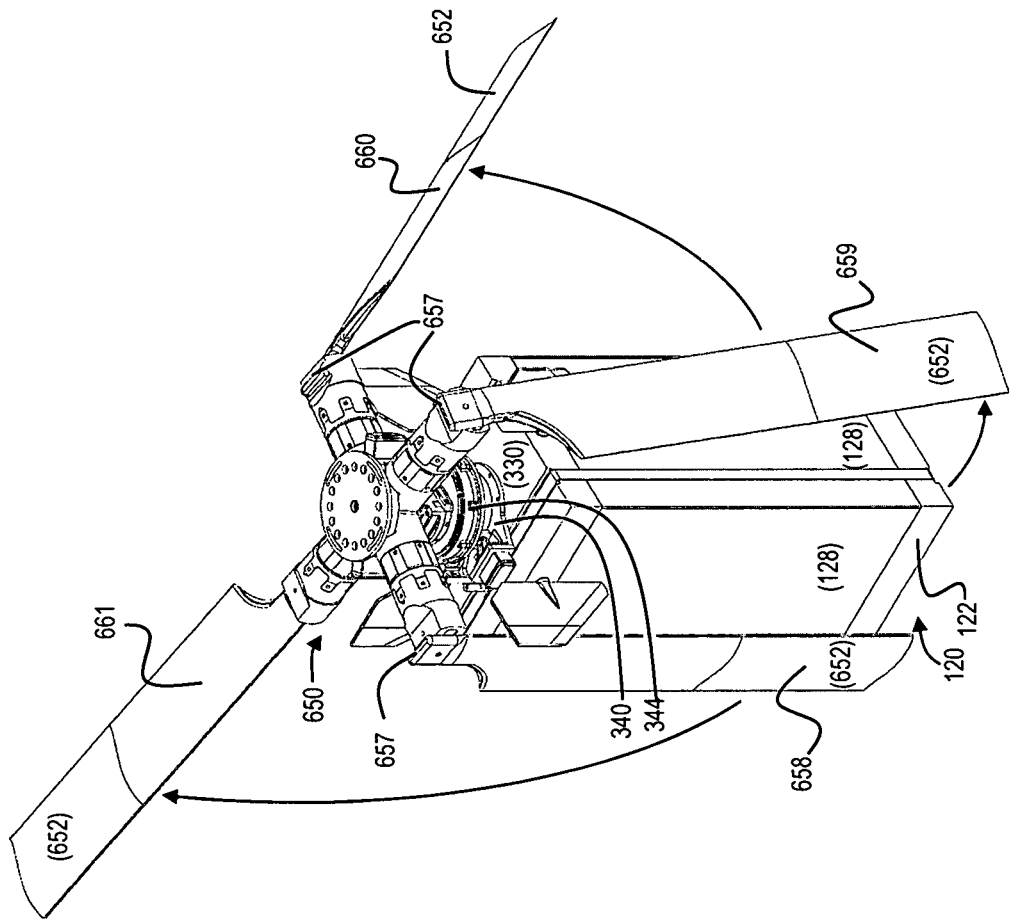
FIG. 21 illustrates a top perspective view of the fourth alternative embodiment having folding rotor blades illustrating a stowed, partially deployed and fully deployed states of the co-planar rotor control type air drop device of FIG. 19.

FIG. 21 illustrates a top perspective view of the fourth alternative embodiment of the co-planar air drop device 600 of FIG. 19, for representative purposes, rotor blades 652 in each stage of deployment: a stowed or folded rotor blade 658; an initial rotated rotor blade 659; an intermediate rotated rotor blade 660; and a fully deployed rotor blade 661 of the co-planar rotor control type air drop device 600 of FIG. 19.

Figure 22A:
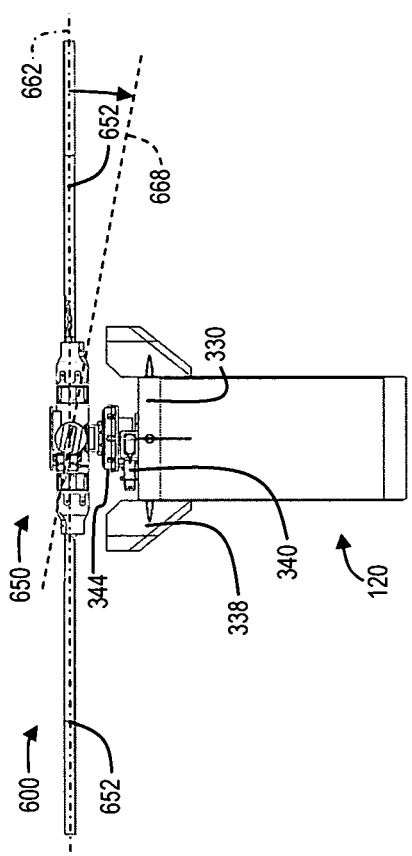
FIG. 22A illustrates a front view of a rotor having a neutral/null angle mounted on the rotor sub-assembly of FIG. 20B of the co-planar rotor control type air drop device of FIG. 19.

FIG. 22A illustrates a front view of a rotor blade 652 having a leading-edge neutral/null angle 664 coincident with respect to a rotor blade rotation plane 662 mounted on the rotor assembly 650 of the co-planar rotor control type air drop device 600 of FIG. 12.

Figure 22C:
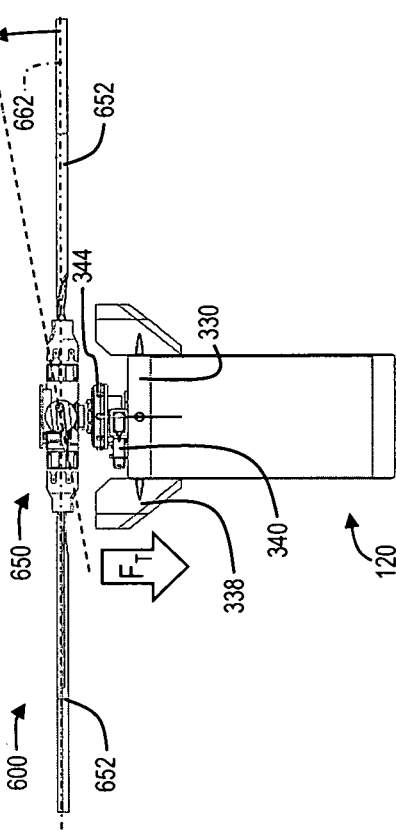
FIG. 22C illustrates a front view of the rotor of FIG. 15A having a slight negative angle mounted on the rotor sub-assembly of FIG. 20B of the co-planar rotor control type air drop device of FIG. 19.
Figure 22B:
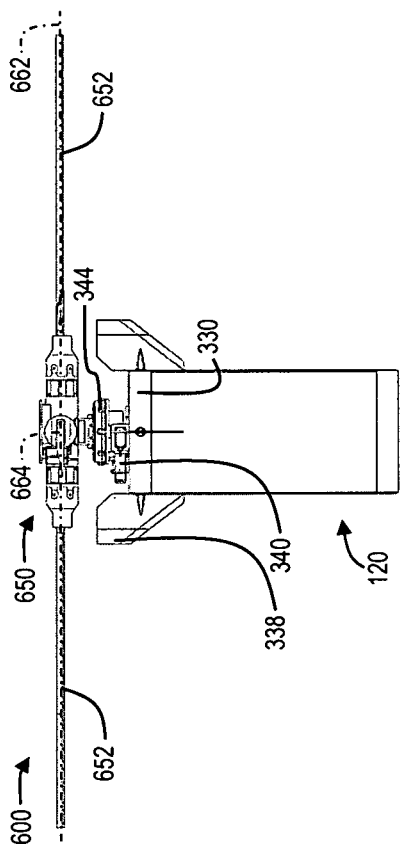
FIG. 22B illustrates a front view of the rotor of FIG. 15A having a 90-degree negative angle mounted on the rotor sub-assembly of FIG. 20B of the co-planar rotor control type air drop device of FIG. 19.

FIG. 22B illustrates a front view of a rotor blade 652 having a leading-edge 90-degree negative angle 666 with respect to a rotor blade rotation plane 662 mounted on the rotor assembly 650 of the co-planar rotor control type air drop device 600 of FIG. 12. In this leading-edge angular orientation, the air drop device is able to travel at a maximum vertical descent speed with minimal resistance from the rotor blades 652 and, at the same time, use angular rotation of the rotor blades 652 to navigate either alone or in conjunction with the control surfaces 338 of the stabilizer assembly 330.

FIG. 22C illustrates a front view of a rotor blade 652 having a leading-edge slight negative angle 668 with respect to a rotor blade rotation plane 662 mounted on the rotor assembly 650 of the co-planar rotor control type air drop device 600 of FIG. 12. In this leading-edge angular orientation, the rotor assembly is configured to achieve an autorotating motion and provide a downward thrust force due to the rotor blades 652 while providing collective and cyclic pitch control of the rotor blades to navigate toward the predetermined target destination.

Figure 22D:
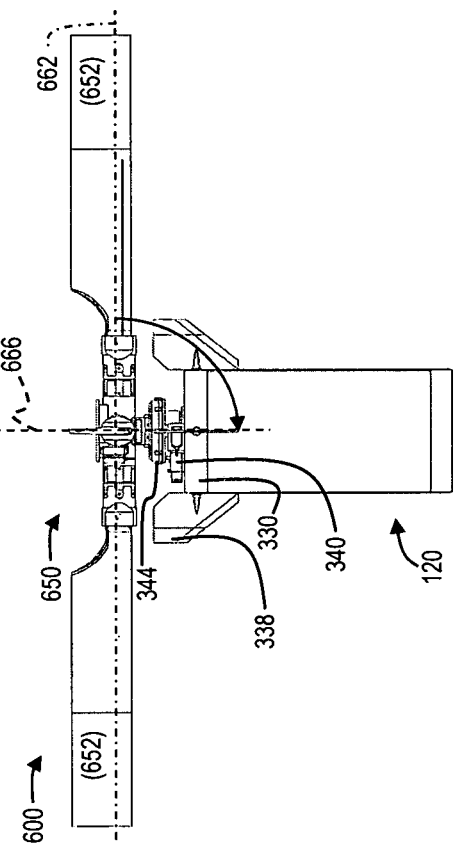
FIG. 22D illustrates a front view of the rotor of FIG. 15A having a slight positive angle mounted on the rotor sub-assembly of FIG. 20B of the co-planar rotor control type air drop device of FIG. 19.

FIG. 22D illustrates a front view of a rotor blade 652 having a leading-edge slight positive angle 670 with respect to a rotor blade rotation plane 662 mounted on the rotor assembly 650 of the co-planar rotor control type air drop device 600 of FIG. 12. In this leading-edge angular orientation, the rotor assembly is configured to achieve an increased downward thrust force, in comparison to the autorotation downward thrust force, due to the energy of rotational inertia of the rotor blades 352 in the previous autorotating state immediately before the air drop device lands at the predetermined target destination. This increased thrust force FT further slows down the airdrop device in anticipation of impacting the landing zone.

Figure 23:
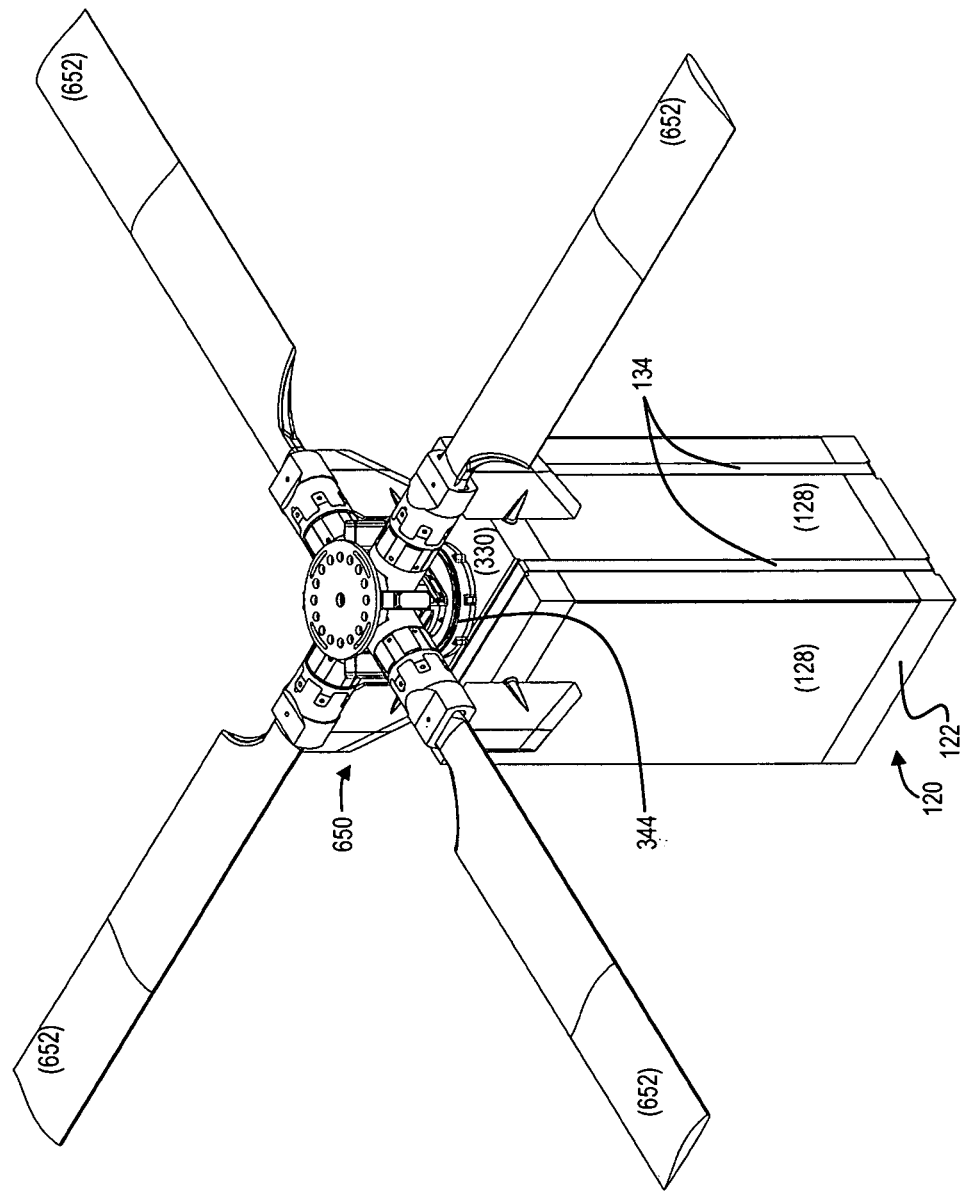
FIG. 23 illustrates a top perspective view of a fifth alternative embodiment having a four-blade rotor assembly mounted without a gimbal assembly being similar to the co-planar rotor control type air drop device of FIG. 19.

FIG. 23 illustrates a top perspective view of a fifth alternative embodiment co-planar rotor control type air drop device 700 having a four-blade rotor assembly 650, similar to the co-planar rotor control type air drop device of FIG. 19, mounted without a gimbal assembly. This embodiment may include more powerful servomotors to control rotor blade pitch actuation to allow for increased maneuverability without a gimbal assembly.

FIG. 24 illustrates two air drop methods of deploying a representative co-planar rotor control type air drop device illustrated in FIGS. 12-23.

FIG. 24 illustrates two types of air drop methods in a co-planar control-type deployment schematic diagram 750 of deploying a representative co-planar control-type air drop device, e.g., 700, of FIG. 23, or similarly any co-planar air drop devices 300, 400, 500 and 600 of FIGS. 12-22D, to its predetermined target destination.

The co-planar control-type deployment schematic diagram 750 illustrates an aircraft, e.g., aircraft 272A, travelling along an aircraft flight path 274 where upon a predetermined time and/or location of the aircraft, an air drop device payload flight path 276A is calculated by a master flight controller of the aircraft and a payload launch controller in the aircraft relative to predetermined target destination, e.g., 288A. When a launch trigger is executed by the master flight controller and the payload launch controller, the air drop device, e.g., 700, is deployed 278 from the aircraft 272A and enters a transient flight phase 280 where the rotor blades 652 begin to be deployed from their stowed position and the flight stabilizer assembly 330 begins to rotate about their respective axes to orient the air drop device 700 into a downwardly disposed orientation.

A steady-state flight phase 282A is entered when the rotor blades 652 are fully deployed and begin autorotating to provide a thrust force in a downward direction provided by autorotating rotor assembly 650. During the steady-state flight phase 282A, the flight stabilizer assembly 330 and/or the rotor assembly 650 provide directional control to the air drop device 700 to maintain the air drop device payload flight path 276A.

A terminal flight phase 284 is entered when the rotor blades 652 of the respective rotor assembly 650, rotate the leading-edge of the blades into a positive direction, i.e., flaring the rotor blades, to generate a maximum amount of thrust force FT in a downward direction based on the rotational inertia of the rotor blades in the autorotation at the end of the steady-state flight phase 282A. The force of thrust FT is greater than the thrust force generated in the steady-state flight phase 282A and is used immediately before the landing 286 at the predetermined target destination 288 or landing zone. Note that the flight stabilizer assembly 330 and/or the rotor assembly 650 continue to provide directional control to the air drop device 700 to maintain the air drop device payload flight path 276A during the terminal flight phase 284 immediately above and before the landing 286.

The co-planar control-type deployment schematic diagram 750 further illustrates an aircraft, e.g., aircraft 272B travelling along an aircraft flight path 274 where upon a predetermined time and/or location of the aircraft, an alternative air drop device payload flight path 276B is calculated by a master flight controller of the aircraft and a payload launch controller in the aircraft relative to predetermined target destination, e.g., 288B. A when a launch trigger is executed by the master flight controller and the payload launch controller, the air drop device, e.g., 700, is deployed 278 from the aircraft 272B and enters a transient flight phase 280 where the rotor blades 652 begins to be deployed from their stowed position and the flight stabilizer assembly 330 begins to rotate about their respective axes to orient the air drop device 700 into a downwardly disposed orientation.

A steady-state flight fast descent phase 282B is entered when the rotor blades 652 are fully deployed and the leading edges of the rotor blades are pointed straight down. No autorotation begins in the fast descent flight phase 282B, as in the previous example. During the steady-state fast descent flight phase 282B, the flight stabilizer assembly 330 and/or the rotor assembly 650 provide directional control to the air drop device 700 to maintain the air drop device payload flight path 276B.

A pre-terminal flight phase 283 is entered when the rotor blades 652 rotate to a negative rotor rotation angle 668, (see FIG. 22C), and the rotor assembly 650 begins to autorotate, thus providing a downward thrust from the autorotation of the rotor blades 652.

A terminal flight phase 284 is entered when the rotor blades 652 of the respective rotor assembly 650, rotate the leading-edge of the blades, i.e., flaring the rotor blades, into a positive direction to generate a maximum amount of thrust force FT in a downward direction based on the rotational inertia of the rotor blades in the autorotation at the end of the pre-terminal flight phase 283. The force of thrust FT is greater than the thrust force generated in the pre-terminal flight phase 283 and is used immediately before the landing 286 at the predetermined target destination 288B or landing zone. Note that the flight stabilizer assembly 330 and/or the rotor assembly 650 may continue to provide directional control to the air drop device 700 to maintain the air drop device payload flight path 276B during the terminal flight phase 284 immediately above and before the landing 286.

Figure 25B:
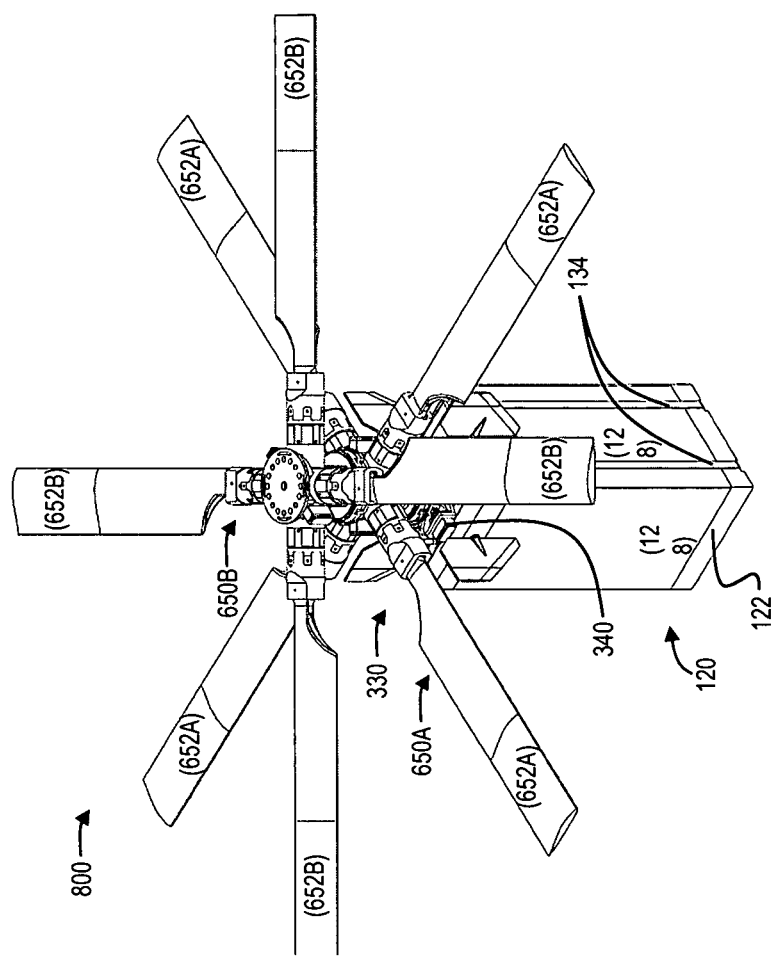
FIG. 25B illustrates a top perspective view of the dual counter-rotating four-blade rotor assemblies of FIG. 25A of the co-planar rotor control type air drop device of FIG. 19.
Figure 25A:
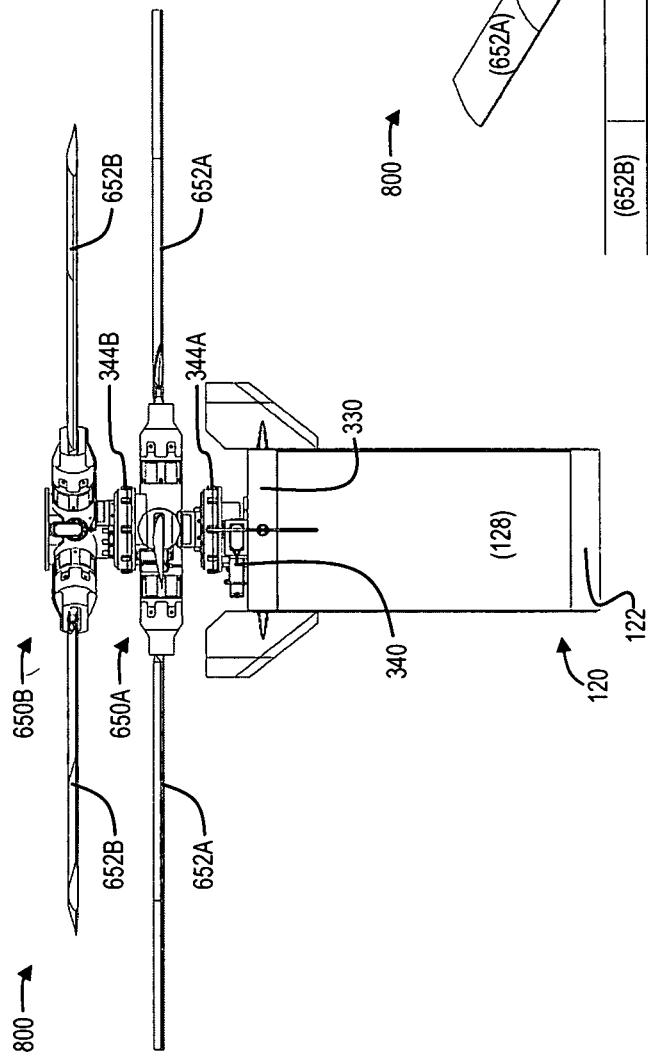
FIG. 25A illustrates a front view of a sixth alternative embodiment having dual counter-rotating four-blade rotor assemblies mounted on a gimbal assembly being similar to the co-planar rotor control type air drop device of FIG. 19.

FIGS. 25A-25B illustrate a front view a top perspective view, respectively, of a sixth alternative embodiment of a co-planar air drop device 800 having dual counter-rotating four-blade rotor assemblies 650A, 650B mounted on a gimbal assembly 340 being similar to the co-planar rotor control type air drop device 600 of FIG. 19. Each rotor assembly 650A and 650B and their respective rotor blades 652A and 652B rotate in opposite directions of each other when the rotor assemblies 650A and 650B are in autorotation or providing a flaring thrust force in the terminal flight phase 284 immediately before landing 286 in the predetermined target destination 288, 288A, 288B.

FIGS. 26A-26B illustrate a front view a top perspective view, respectively, of a seventh alternative embodiment of a co-planar air drop device 900 having dual counter-rotating four-blade rotor assemblies 650A and 650B, similar to the co-planar air drop device 800 of FIGS. 25A-25B, with no gimbal assembly.

Figure 27A:
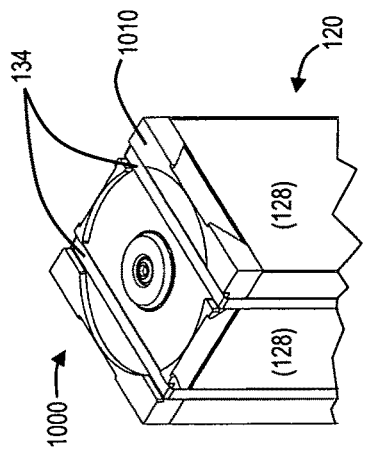
FIG. 27A illustrates a top perspective view of an eighth alternative embodiment having no stabilizer assembly attached to an enclosure with a payload of a co-planar rotor control type air drop device.

FIGS. 27A-28D illustrate an eighth alternative embodiment of a co-planar rotor control type air drop device 1000 having no independent stabilizer assembly attached to a payload containing enclosure. FIG. 27A illustrates a top perspective view of the co-planar rotor control type air drop device 1000 including a rotor assembly attachment base 1010 attached to a containerized payload assembly 120, similar to FIG. 1.

Figure 27C:
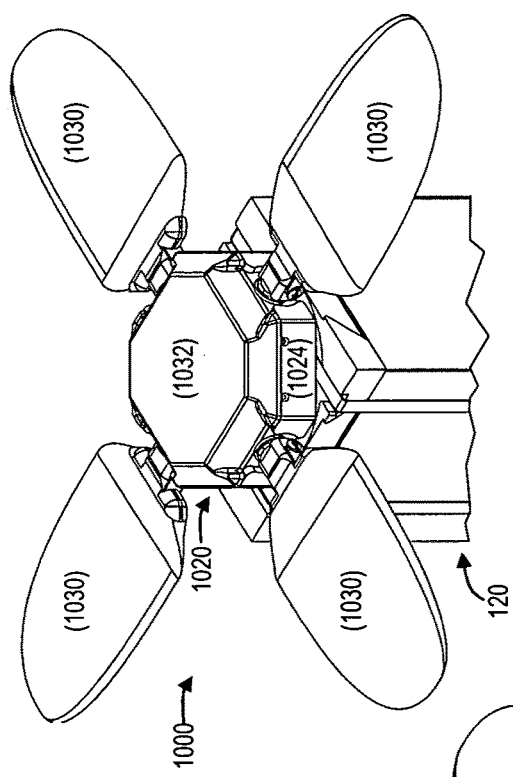
FIG. 27C illustrates a top perspective view of the eighth alternative embodiment having a cover over the flight control portion of the co-planar rotor control type air drop device of FIG. 27B.
Figure 27B:
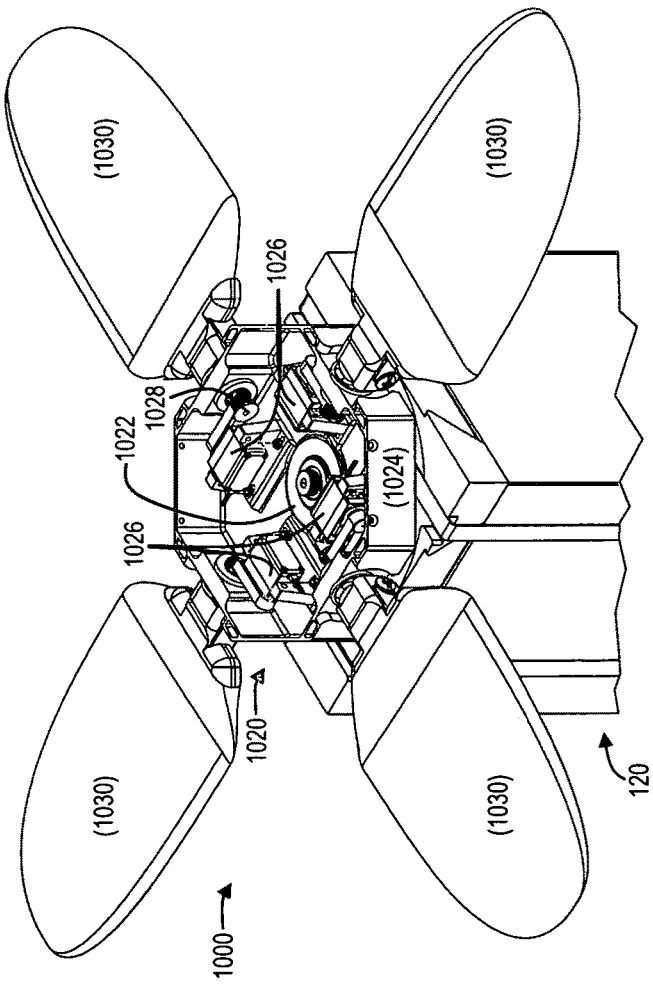
FIG. 27B illustrates a top perspective view of the eighth alternative embodiment of FIG. 27A having independently controlled rotors of a quad rotor assembly of a co-planar rotor control type air drop device.

FIG. 27B illustrates a top perspective view of the co-planar rotor control type air drop device 1000 of FIG. 27A having a rotor assembly 1020 containing independently controlled rotors blades 1030 including a rotor bearing 1022 located in a central portion of a rotor assembly housing 1024 supporting a flight control portion including a plurality of rotor actuators 1026 connected to rotor drive shafts 1028 of respective rotor blades 1030.

FIG. 27C illustrates a top perspective view of the co-planar rotor control type air drop device 1000 of FIG. 27B further including a rotor assembly cover 1032 over the flight control portion of the co-planar rotor control type air drop device of FIG. 27B.

Figure 28A:
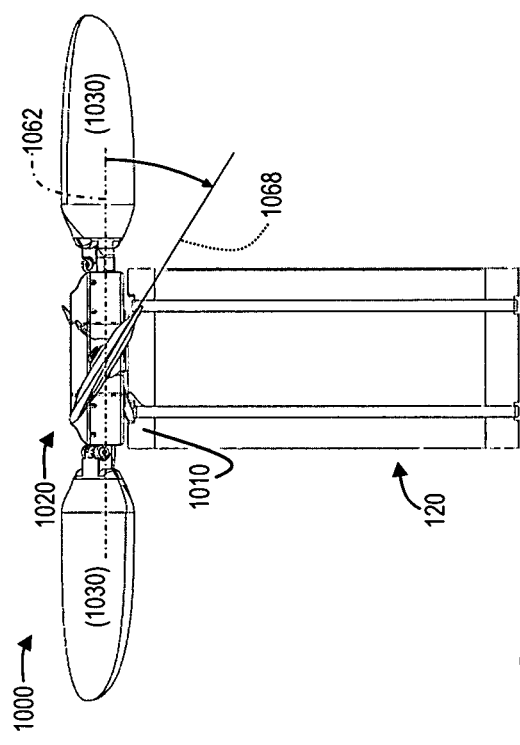
FIG. 28A illustrates a front view of a rotor having a neutral/null angle mounted on the rotor assembly of FIGS. 27B-27C of the co-planar rotor control type air drop device of FIG. 27B.

FIG. 28A illustrates a front view of a rotor blades 1030 of the co-planar rotor control type air drop device 1000 of FIGS. 27B-27C having a leading edge of the rotor blades 1030 rotated to a neutral/null angle 1064 mounted on the rotor assembly 1020 of the co-planar rotor control type air drop device 1000 of FIGS. 27B-27C.

Figure 28C:
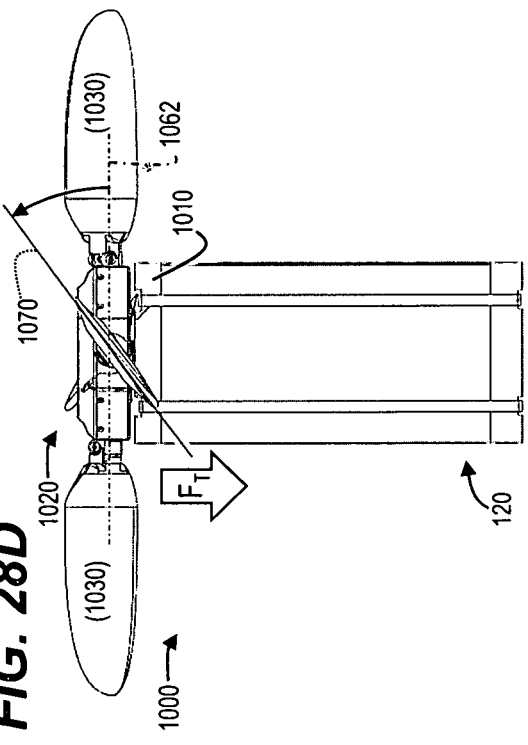
FIG. 28C illustrates a front view of the rotor of FIGS. 27B-27C having a slight negative angle mounted on the rotor assembly of FIGS. 27B-27C of the co-planar rotor control type air drop device of FIG. 27B.
Figure 28B:
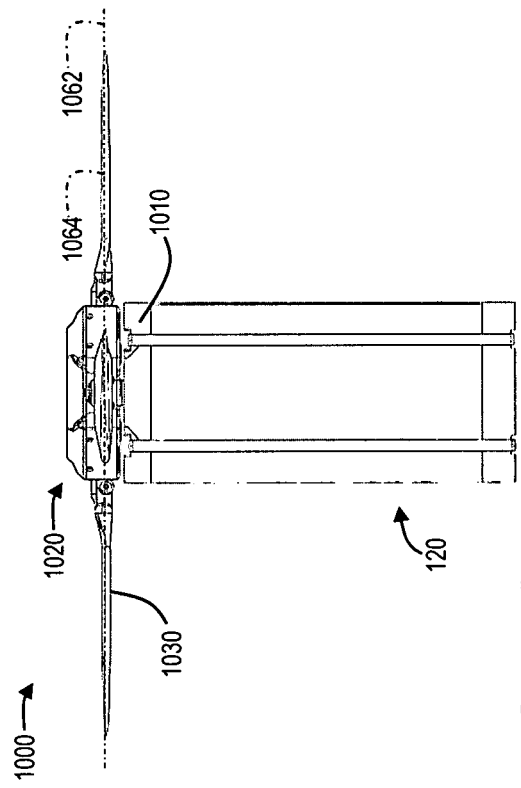
FIG. 28B illustrates a front view of the rotor of FIGS. 27B-27C having a 90-degree negative angle mounted on the rotor assembly of FIGS. 27B-27C of the co-planar rotor control type air drop device of FIG. 27B.

FIG. 28B illustrates a front view of a rotor blades 1030 of the co-planar rotor control type air drop device 1000 of FIGS. 27B-27C having a leading edge of the rotor blades 1030 rotated to a 90-degree negative angle 1066 mounted on the rotor assembly 1020 of the co-planar rotor control type air drop device 1000 of FIGS. 27B-27C. In this leading-edge angular orientation, the air drop device is able to travel at a maximum vertical descent speed with minimal resistance from the rotor blades 1030 and, at the same time, use angular rotation of the rotor blades 1030 to navigate to the predetermined target destination without any independent stabilizer assembly.

FIG. 28C illustrates a front view of a rotor blades 1030 of the co-planar rotor control type air drop device 1000 of FIGS. 27B-27C having a leading edge of the rotor blades 1030 rotated to a slight negative angle 1068 mounted on the rotor assembly 1020 of the co-planar rotor control type air drop device 1000 of FIGS. 27B-27C. In this leading-edge angular orientation, the rotor assembly 1020 is configured to achieve an autorotating motion and provide a downward thrust force due to the rotor blades 1030 while providing collective and cyclic pitch control of the rotor blades to navigate toward the predetermined target destination.

Figure 28D:
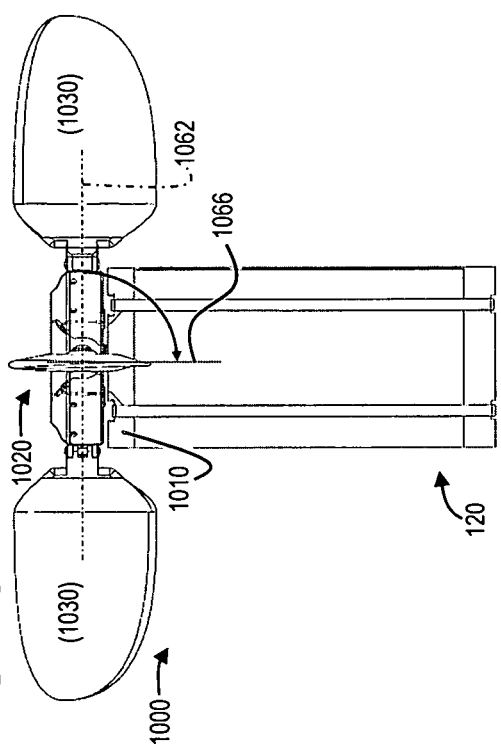
FIG. 28D illustrates a front view of the rotor of FIGS. 27B-27C having a slight positive angle mounted on the rotor assembly of FIGS. 27B-27C of the co-planar rotor control type air drop device of FIG. 27B.

FIG. 28D illustrates a front view of a rotor blades 1030 of the co-planar rotor control type air drop device 1000 of FIGS. 27B-27C having a leading edge of the rotor blades 1030 rotated to a slight positive angle 1070 mounted on the rotor assembly 1020 of the co-planar rotor control type air drop device 1000 of FIGS. 27B-27C. In this leading-edge angular orientation, the rotor assembly 1020 is configured to achieve an increased downward thrust force FT, in comparison to the autorotation downward thrust force, e.g., of FIG. 28C, due to the energy of rotational inertia of the rotor blades 1030 in the previous autorotating state immediately before the air drop device lands at the predetermined target destination. This increased thrust force FT further slows down the airdrop device in anticipation of impacting the landing zone.

Figure 29:
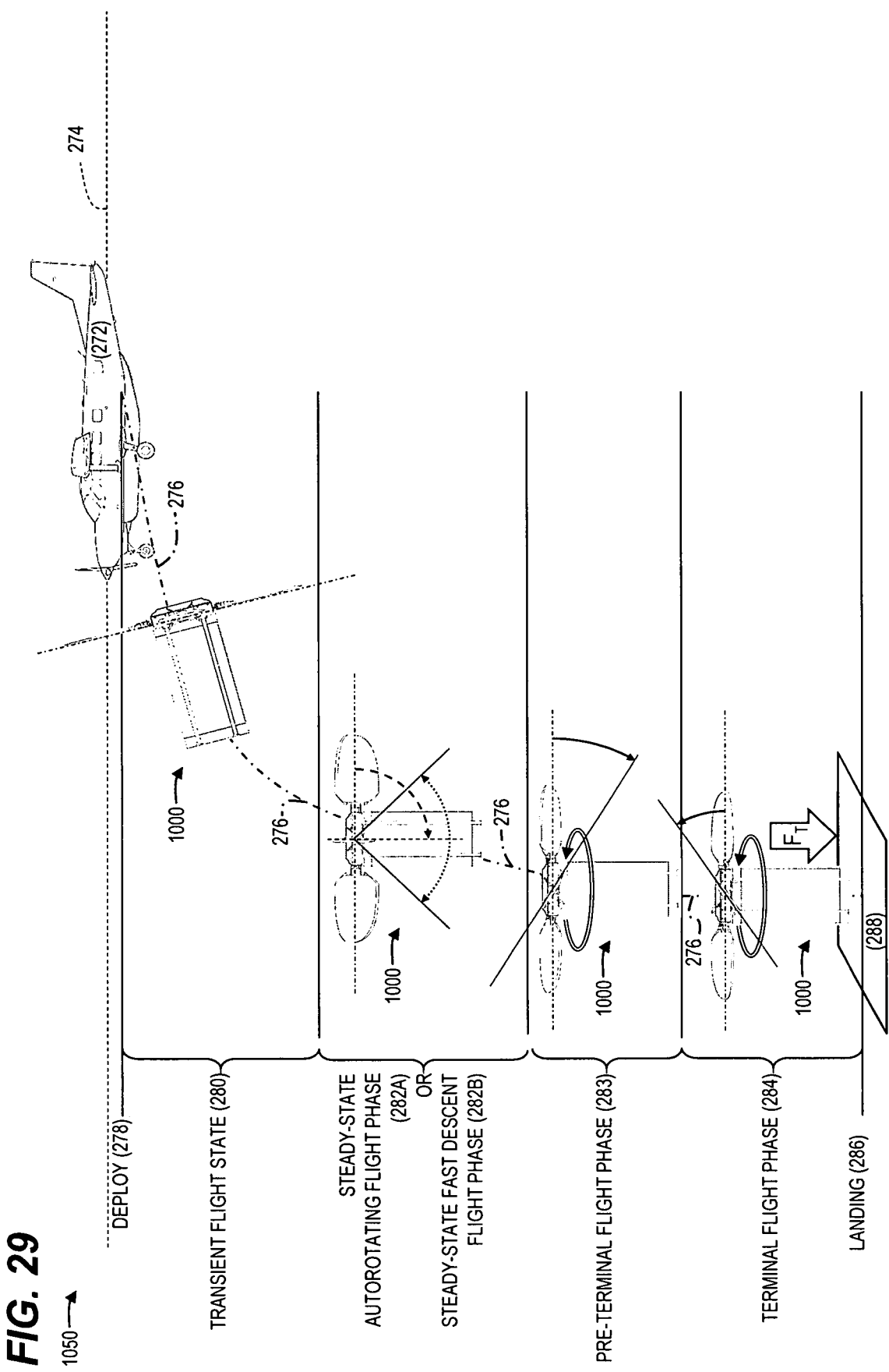
FIG. 29 illustrates an air drop methods of deploying the co-planar rotor control type air drop device of FIGS. 27B-28D.

FIG. 29 illustrates an air drop methods of deploying the co-planar rotor control type air drop device 1000 of FIGS. 27B-28D and FIGS. 30A-30B, discussed below. FIG. 29 illustrates an air drop method in a co-planar control-type deployment schematic diagram 1050 of deploying a representative co-planar control-type air drop device, e.g., 1000, of FIG. 27B-28D to its predetermined target destination 288.

The co-planar control-type deployment schematic diagram 1050 illustrates an aircraft 272 travelling along an aircraft flight path 274 where upon a predetermined time and/or location of the aircraft, an air drop device payload flight path 276 is calculated by a master flight controller of the aircraft and a payload launch controller in the aircraft relative to predetermined target destination, e.g., 288. A when a launch trigger is executed by the master flight controller and the payload launch controller, the air drop device 1000 is deployed 278 from the aircraft 272 and enters a transient flight phase 280 where the rotor blades 1030 may be flared in a neutral position indicated by FIG. 28A or a fast-descent position indicated by FIG. 28B to orient the containerized payload 120 into a downward orientation to enter the next steady-state flight phase.

A steady-state autorotating flight phase 282A or a steady-state fast descent flight phase 282B is entered when the rotor blades 652 either begin autorotating to provide a thrust force in a downward direction provided by rotor assembly 650, or are trimmed to accelerate the air drop device 1000 to a maximum downward velocity. In either steady-state flight phase, the rotor blades may provide directional control to the air drop device 1000 to maintain the air drop device payload flight path 276.

If the air drop device 1000 enters the steady-state fast descent flight phase 282B, a pre-terminal flight phase 283 is entered when the rotor blades 1030 rotate to a negative rotor rotation angle 1068, (see FIG. 28C), and the rotor assembly begin to autorotate, thus providing a downward thrust from the autorotation of the rotor blades 1052.

A terminal flight phase 284 is entered when the rotor blades 1052 of the rotor assembly 1020, rotate the leading-edge of the blades, i.e., flaring the rotor blades, into a positive direction to generate a maximum amount of thrust force FT in a downward direction based on the rotational inertia of the rotor blades in the autorotation at the end of the steady-state flight phase 282A or the pre-terminal flight phase 283. The force of thrust FT is greater than the autorotating thrust force generated in the steady-state flight phase 282A or the pre-terminal flight phase 283 and is used immediately before the landing 286 at the predetermined target destination 288 or landing zone. Note that the rotor assembly 1020 continues to provide directional control to the air drop device 1000 to maintain the air drop device payload flight path 276 during the terminal flight phase 284 immediately above and before the landing 286 at the landing zone 288.

FIGS. 30A-30B illustrate a ninth alternative embodiment of a co-planar rotor control type air drop device 1100 similar to the co-planar rotor control type air drop device 1000 of FIGS. 27B-28D including dual counter-rotating four-blade rotor assemblies 1020A and 1020B.

FIGS. 30A-30B illustrates a front view and a top perspective view, respectively, of the ninth alternative embodiment having dual counter-rotating four-blade rotor assemblies 1020A and 1020B similar to the co-planar rotor control type air drop device 1000 of FIGS. 27B-28D. Both rotor assemblies 1020A and 1020B rotate in opposite directions and may provide all the controls and feature of the above described embodiments in FIGS. 27A-29 but have more control surfaces for navigation and providing control during descent along the flight path for heavier payloads.

Figure 31:
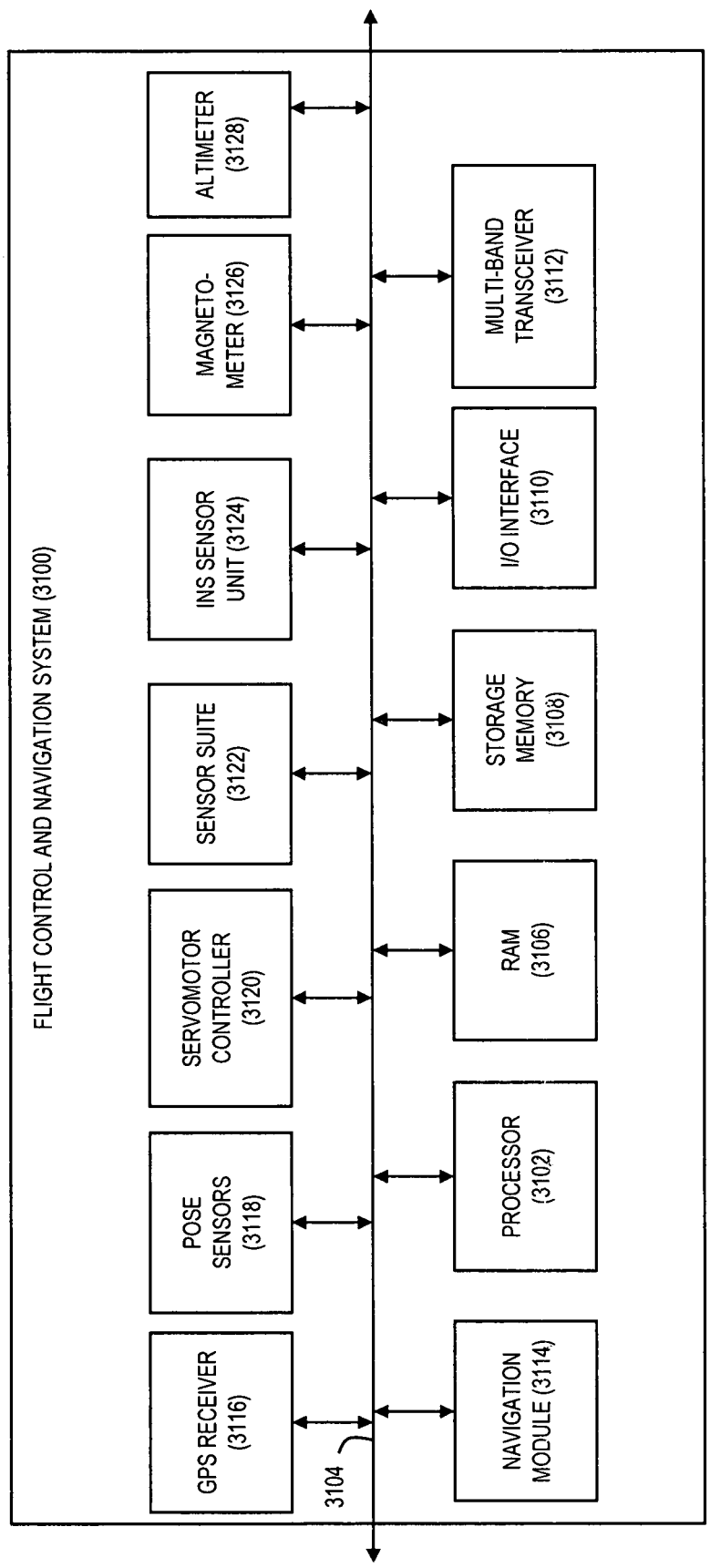
FIG. 31 illustrates a schematic diagram of a flight control and navigation system for the air drop devices of FIGS. 1-30B.

FIG. 31 illustrates a schematic diagram of a flight control and navigation system 3100 for the air drop devices of FIGS. 1-30B. The flight control and navigation system 3100 may include a processor 3102 connected to a common communication bus 3104 that provides bi-direction communication between the remaining components of the flight control and navigation system 3100. The processor 3102 via the communication bus is further in communication with random access memory (RAM) 3106, a storage memory 3108, an input/output (I/O) interface 3110, a multi-band transceiver 3112, a navigation module 3114, a GPS receiver 3116, position and orientation, or pose, sensors 3118, a plurality of servomotor controllers 3120, a sensor suite 3122, an inertial navigation system (INS) sensor unit 3124, a magnetometer 3126 and altimeter 3128 that may include at least a barometer, a radar and/or a LiDAR sensor.

Figure 32:
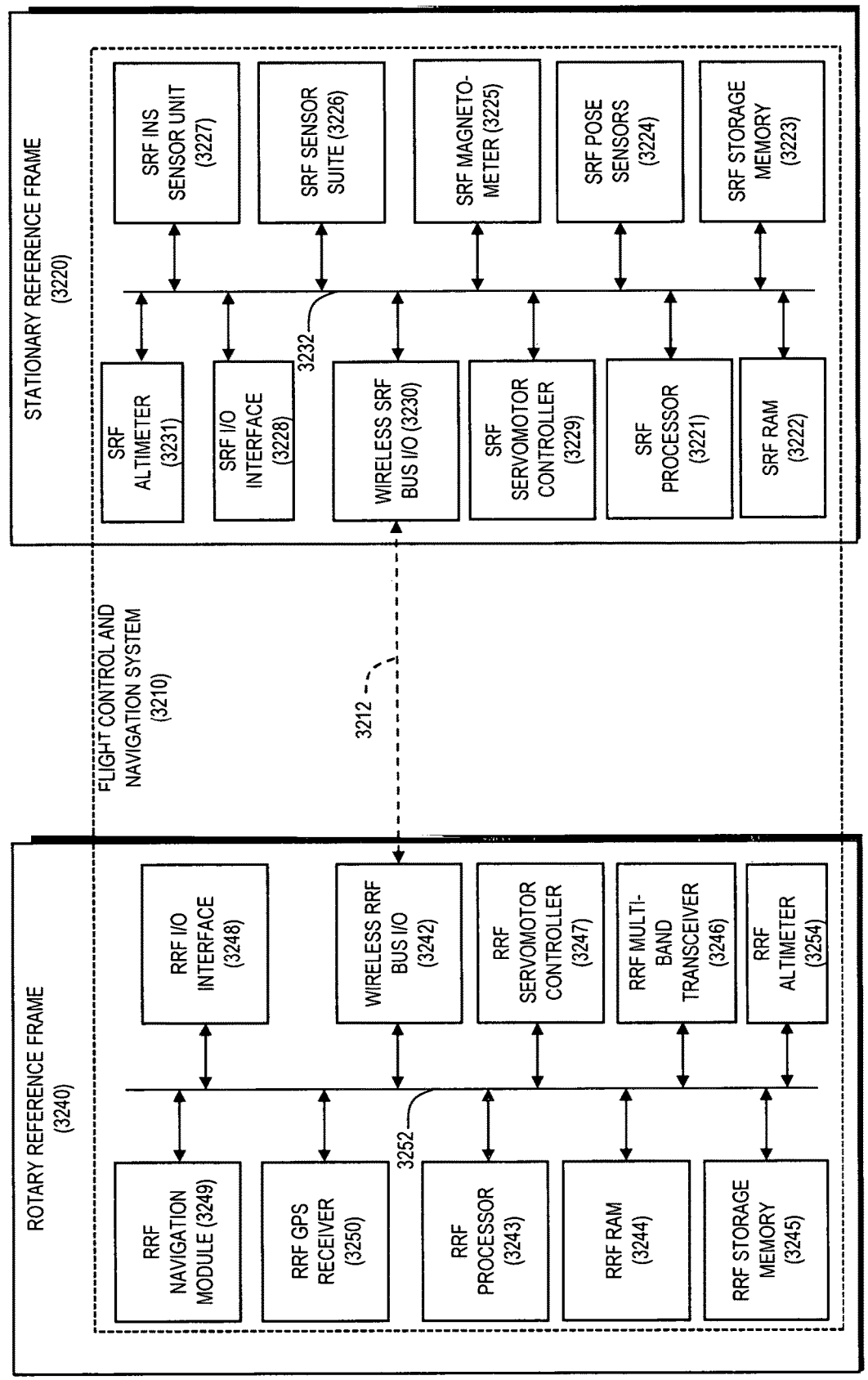
FIG. 32 illustrates a schematic diagram of a reference frame comparison between a rotary and a stationary reference frame for the air drop devices of FIGS. 1-30B.

FIG. 32 illustrates a schematic diagram 3200 of a flight control and navigation system 3210 for any of the air drop devices of FIGS. 1-30B relative to a stationary reference frame 3220 and a rotary reference frame 3240 of the air drop device.

A stationary reference frame 3220 of an air drop device may include all the components that are distinct from the rotor assembly, for example, the containerized payload assembly, the stabilizer assembly and/or the rotor linkages in a pitch-link type air drop device. A rotary reference frame of the air drop device may include all the components of the rotor assembly that rotate in consonance with the rotor blades during autorotation and/or navigation operation.

The stationary reference frame (SRF) 3220 may include a SRF processor 3221, communicating via a common communication bus 3232 with SRF random access memory (RAM) 3222, SRF storage memory 3223, SRF position and orientation, or pose, sensor 3224, SRF magnetometer 3225, SRF sensor suite 3226, SRF inertial navigation system (INS) sensor unit(s) 3227, SRF input/output (I/O) interface 3228, SRF servomotor controller(s) 3229, SRF altimeter 3231, and a wireless SRF bus input/output (I/O) communication device 3230 configured to communicate via a near-field wireless communication protocol 3212, for example, an RF signal or an optical link, with a corresponding rotary reference frame (RRF) wireless RRF bus input/output (I/O) communication device 3242.

In the rotary reference frame 3240, wireless RRF bus input/output (I/O) communication device 3242 may communicate with a RRF common communication bus 3252 to an RRF processor 3243 that communicates with an RRF RAM 3244, an RRF storage memory 3245, an RRF multi-band transceiver 3246, an RRF servomotor controller(s) 3247, an RRF I/O interface 3248, a payload course RRF navigation module 3249, an RRF GPS receiver 3250 and/or an RRF altimeter 3254.

The rotary reference frame 3240, typically including the rotor assembly, may have identical sensors as that of a traditional UAV helicopter or gyrocopter for example: GPS, accelerometers/IMU, barometer, magnetometer etc. If a sample rate of the sensors are configured to be capable of measuring attitude, (e.g., via magnetometer, or gyroscope), is not high enough for direct sensing of the rotational rate and position, the addition of a rotary encoder and/or RPM sensor may allow the controller to determine its location relative to the stationary reference frame, (either truly inertial, or relative to the non-rotating payload), such that location information and position can be translated to a non-rotational frame.

This auxiliary sensor could be as simple as a simple optical proximity sensor (LED and photodiode) that would sense a light change when a simple pattern on the non-rotating payload passed by it—given the change in rotation rate per rotation would be, by definition, small, even a simple pattern would provide for more than enough angular resolution for the coordinate transform.

The primary position sensing using GPS should not be compromised at all by the rotation of the system, (provided the GPS sensing antenna may be located at or near the center of rotation of the rotary reference frame).

To affect the required pitch changes, the system may command mechanical actuators, (servomotors, voice coil actuators, etc.), to vary the effective pitch of the blades through either rotation of the entire blade or varying the angle of trailing edge. The system may utilize directed airflow through holes in the blade to vary the effective lift coefficient and control such airflow with valving in the hub. The servos may directly or indirectly drive each blade or blade flap with the additional benefit of being able to take a profile that is not sinusoidal or possible with traditional swash plates which generally limit a given blade pitch to an approximately 90 degree quadrant and limit the speed and acceleration by which they change pitch angle.

In summary, a system for delivering a payload to the ground from an aerial vehicle may include a payload to be delivered, an outer delivery payload container configured to house the payload, and a flight controller located inside the aerial vehicle. The outer delivery payload container may contain a removable and/or detachable tail kit allowing separation from a cardboard, plastic or similar shipping box.

The tail kit assembly may contain a rotary blade system that is free to rotate and generate autorotation-based aerodynamic lift forces, aerodynamic fin control surfaces to provide attitude control and a flight controller to provide guidance navigation and control intelligence, where the aerodynamic fins may be used to further control vehicle attitude during flight.

The rotor blade system may be folded and stowed prior to launch to increase packing volume, protect the blade surfaces and ease stowage requirements both before and during loading into an aircraft.

The rotor blade root may include a self-locking feature allowing aerodynamic forces to translate the blade to a 90-degree locked orientation in the plane of rotation. An NACA 8H12 or similar rotor blade system is designed to maximize autorotative efficiency and thrust forces to add in mid-flight phase guidance and the terminal landing phase.

A collective pitch system may be used to change blade pitch during various phases of flight, and cyclic pitch mechanism is used to translational control authority to guide the vehicle mid-flight to a predetermined target landing position or coordinates.

A self-contained flight computer provides guidance navigation and control as well as two-way telemetry communication with ground or mothership/aircraft-based transmitters.

The rotating blade system may be modular or detachable from the payload to allow different blade configurations corresponding to payload, weather or altitude parameters. The modular system may be self-contained and/or isolated within a rotating reference frame allowing collective control via motors located within the rotor blade assembly and may thereby eliminate a need for a "swash plate mechanism."

A battery, RX transmitter, microcontroller and servos provide two-way data with the flight controller located in the non-rotating vehicle body.

A bearing assembly allows two rotational degrees of freedom: a first rotational degree of freedom perpendicular to the blade tip plane allowing rotation of the blade assembly; and a second gimballing degree of freedom to allow rotation of the blade plane and thus thrust vectoring/cyclic control.

A "flair" maneuver may be performed to arrest vertical descent speed and allow safe and slow touchdown of contents within the payload where the rotor blades of the rotor assembly rotate the leading edges of the rotors into a positive direction with respect to the plane of rotation to provide a downward directed thrust force based on the rotational inertia generated from the autorotation motion.

To eliminate the need to translate motion from the static body reference frame to the rotor hub rotational frame, the flight controller, batteries, sensors and all associated control hardware on the rotating rotor assembly are located in the rotor assembly such that they spin along with the rotor blades. To control the rotor blades themselves, servo motors or linear actuators may be placed at the root of each rotor blade and directly drive the blade pitch angle per rotational cycle. No power, data, or other electrical connections would need to be made to the stationary body allowing, in theory, a hub assembly to be quickly attached to a travel case via straps or other fastening methods to include even a clip-on swivel to an existing cable-attachment point and allow controlled descent or glide.

A "hybrid" approach may include certain components put into the rotating reference frame such as servos, batteries and an RX receiver transmitter while the flight computer and other components be located in the stationary reference frame. This may allow for use of a gimbal assembly to control the rotor blade plane similar to a gyrocopter and the collective pitch controls to be performed in the rotating frame, easing requirements on fast acting per-cycle servos.

In summary, one embodiment of the disclosed payload delivery device being configured to deliver an aircraft deployed payload along a flight path to a predetermined landing destination, includes a support member configured to be removably attached to the payload, a flight control and navigation system module connected to the support member, a control surface assembly module including a plurality of control surfaces, the control surface assembly module connected to the support member and in communication with the flight control and navigation module to receive commands to control orientation of the plurality of control surfaces while the payload is travelling along the flight path to the predetermined landing destination.

The above embodiment further includes a rotor assembly including a plurality of rotor blades having a central axis of rotation, and a collective control assembly module including at least one collective servomotor, the collective control assembly module connected between the support member and the rotor assembly and in communication with the flight control and navigation module configured to control a plurality of control linkages connected to the plurality of rotor blades.

The payload delivery device may further include the flight control and navigation system module having at least a GPS receiver, at least one servomotor controller, an inertial navigation system (INS) sensor, a magnetometer, a navigation module, and a multi-band transceiver configured to communicate with at least one of a master flight computer in the aircraft, a satellite communications network, a ground-based telemetry station and a weather station.

The payload delivery device may further include at least a first portion of components of the flight control and navigation system module being disposed in a rotating frame of the rotor assembly.

The payload delivery device may further include the flight control and navigation system module being fully disposed in a rotating frame of the rotor assembly.

The payload delivery device may further include the control surfaces, under control of the flight control and navigation system module, being configured to one of vertically stabilize and impart an axial moment of rotation about a longitudinal axis of the payload during a portion of the flight path.

The payload delivery device may further include the plurality of control surfaces, under control of the flight control and navigation system module, being configured to navigate the payload along a portion of the flight path to the predetermined landing destination.

The payload delivery device may further include the collective control assembly module, under control of the flight control and navigation system module, controlling a collective motion imparted the rotor assembly to rotate the leading-edge of each blade of the plurality of rotor blades of the rotor assembly to a negative leading-edge angle with respect to the rotational plane of the rotor assembly in a fully deployed rotor position, where the rotor assembly enters an autorotating motion to produce an upward vertical force on the payload during at least a portion of the flight path.

The payload delivery device may further include the collective control assembly module, under control of the flight control and navigation system module, controlling the collective motion imparted to the rotor assembly to rotate a leading-edge of each of the rotor blades of the rotor assembly to a positive leading-edge angle with respect to a rotational plane of the rotor assembly in the fully deployed rotor position, where the rotor assembly produces a positive vertical thrust force on the payload based on a moment of inertia of an autorotating motion during at least a portion of the flight path before the payload arrives at the predetermining landing destination.

The payload delivery device may further include the rotor assembly being further configured to rotate the plurality of rotor blades to a folded position proximate a side of the payload, an initial deployed position rotated away from the side of the payload, and a fully deployed and locked position further rotated away from the side of the payload and perpendicular to the central axis of rotation of the rotor assembly.

The payload delivery device may further include the rotor assembly being further configured to dampening the plurality of rotor blades during a blade deployment operation when each of the plurality of rotor blades nears the fully deployed and locked position.

Another embodiment of the payload delivery device being configured to deliver an aircraft deployed payload along a flight path to a predetermined landing destination, where the payload delivery device may include a support member configured to be removably attached to the payload, a flight control and navigation system module connected to the support member, and a control surface assembly module including a plurality of control surfaces, the control surface assembly module connected to the support member and in communication with the flight control and navigation module to receive commands to control orientation of the plurality of control surfaces while the payload is travelling along the flight path to the predetermined landing destination.

The above embodiment may further include a gimbal assembly module including a plurality of gimbal servomotors, the gimbal assembly module connected to and configured to move relative to the support member and in communication with the flight control and navigation module to receive commands to control axial rotation of the gimbal assembly module with respect to the support member, a rotor assembly including a plurality of rotor blades having a central axis of rotation, and a collective control assembly module including at least one collective servomotor, the collective control assembly module connected between the gimbal assembly module and the rotor assembly and in communication with the flight control and navigation module configured to control a plurality of control linkages connected to the plurality of rotor blades.

The payload delivery device may further provide the gimbal assembly module, under control of the flight control and navigation system module, pivoting the central axis of rotation the rotor assembly via at least one servomotor about a point located on a longitudinal axis of the payload to impart an axial thrust force away from the longitudinal axis of the payload.

The payload delivery device may further provide the collective control assembly module, under control of the flight control and navigation system module, controlling, via at least one servomotor mounted on the gimbal assembly module, a collective motion imparted to the rotor assembly configured to simultaneously rotate a leading-edge of each blade of the plurality of rotor blades of the rotor assembly.

Another embodiment of the payload delivery device configured to deliver an aircraft deployed payload along a flight path to a predetermined landing destination, may include a support member configured to be removably attached to the payload, a flight control and navigation module, a control surface assembly module including a plurality of control surfaces, the control surface assembly module connected to the support member and in communication with the flight control and navigation module to receive control surface commands to control orientation of the plurality of control surfaces, a rotation bearing assembly connected to the support member, and a rotor assembly including a plurality of rotor blades having a central axis of rotation and a plurality of rotor servomotors, the rotor assembly connected to the rotation bearing assembly and in communication with the flight control and navigation module to receive rotor rotation commands to control angular rotation of each of the plurality of rotor blades via co-planar aligned blade rotation shafts of each of the plurality of rotor blades, the co-planar aligned drive shafts coincident with a plane of rotation of the rotor assembly about the central axis of rotation.

The payload delivery device may further include the gimbal assembly module having a plurality of gimbal servomotors, the gimbal assembly module connected to and configured to move relative to the support member and in communication with the flight control and navigation module to receive gimbal rotation commands to control axial rotation of the gimbal assembly module with respect to the support member.

The payload delivery device may further include the gimbal assembly module, under control of the flight control and navigation system module, to pivot the central axis of rotation of the rotor assembly via at least one gimbal servomotor about a point located on a longitudinal axis of the payload to impart an axial thrust force produced by the rotor assembly away from the longitudinal axis of the payload.

The payload delivery device may further include a quick-release coupler connected between the rotation bearing assembly and the rotor assembly configured to allow detaching of the rotor assembly from the payload delivery assembly and attaching a second rotor assembly.

The payload delivery device may further include the flight control and navigation system module to have at least a GPS receiver, at least one servomotor controller, an inertial navigation system (INS) sensor, a magnetometer, a navigation module, and a multi-band transceiver configured to communicate with at least one of a master flight computer in an aircraft, a satellite communications network, a ground-based telemetry station and a weather station.

The payload delivery device may further include at least one component of the flight control and navigation system module is disposed in a rotating frame of the rotor assembly.

The payload delivery device may further include the flight control and navigation system module being disposed in a rotating frame of the rotor assembly.

The payload delivery device may further include the plurality of control surfaces, under control of the flight control and navigation system module, at least one of vertically stabilizing and imparting an axial moment of rotation about a longitudinal axis of the payload during a portion of the flight path to the predetermined landing destination.

The payload delivery device may further include the plurality of control surfaces, under control of the flight control and navigation system module, being configured to navigate the payload along a portion of the flight path to the predetermined landing destination.

The payload delivery device may further include the rotor assembly, under control of the flight control and navigation system module, being configured to simultaneously rotate leading edges of each of the plurality of rotor blades of the rotor assembly.

The payload delivery device may further include the rotor assembly, under control of the flight control and navigation system module, being configured to independently rotate leading edges of each of the plurality of rotor blades of the rotor assembly.

The payload delivery device may further include the rotor assembly, under control of the flight control and navigation system module, being configured impart a cyclic thrust force to the rotor assembly by cyclically rotating a leading-edge of at least one of the plurality of rotor blades of the rotor assembly.

The payload delivery device may further include the rotor assembly, under control of the flight control and navigation system module, rotating leading-edges of the plurality of rotor blades of the rotor assembly to a negative leading-edge angle with respect to a rotational plane of the rotor assembly in a fully deployed rotor position, where the rotor assembly is configured to produce an autorotation motion to produce a vertical thrust force on the payload during a portion of the flight path to the predetermined landing destination.

The payload delivery device may further include the rotor assembly, under control of the flight control and navigation system module, rotating leading-edges of the plurality of rotor blades of the rotor assembly to a positive leading-edge angle with respect to a plane of rotation of the rotor assembly in a fully deployed rotor position, where the rotor assembly produces a vertical thrust force on the payload based on a moment of inertia produced from the autorotation motion during a second portion of the flight path before the payload arrives at the predetermining landing destination.

The payload delivery device may further include the rotor assembly, under control of the flight control and navigation system module, rotating leading-edges of the plurality of rotor blades of the rotor assembly perpendicular to a plane of rotation of the rotor assembly in a fully deployed rotor position, where the rotor assembly minimizes an aerodynamic profile of the rotor assembly along a portion of the flight path to the predetermined landing destination.

The payload delivery device may further include the rotor assembly, under control of the flight control and navigation system module, rotating a leading-edge of at least one of the plurality of rotor blades of the rotor assembly away from being perpendicular to the plane of rotation of the rotor assembly in the fully deployed rotor position to navigate the payload delivery device along a portion of the flight path to the predetermined landing destination.

The payload delivery device may further include the rotor assembly being further configured to rotate the plurality rotor blades to a folded position proximate at least one side of the payload, to an initial deployed position rotated away from the at least one side of the payload, and to a fully deployed and locked position further rotated away from the at least one side of the payload and perpendicular to the central axis of rotation of the rotor assembly.

In another embodiment a method of assembling a delivery payload assembly configured to be deployed from an aircraft and travel along a flight path to a predetermined landing destination includes providing a payload configured to be delivered from the aircraft to the predetermined landing destination, attaching a tail-kit assembly to a first end of the payload thereby defining the delivery payload assembly, the tail-kit assembly including a rotor blade assembly including a plurality of rotor blades having a central axis of rotation proximate the first end of the payload, and a flight control and navigation system configured to control a collective pitch angle of each of the plurality of rotor blades of the rotor blade assembly, control an axial thrust force of the rotor blade assembly, the axial thrust force being at an angle with respect to the central axis of rotation of the rotor blade assembly, and navigate the delivery payload assembly along the flight path to the predetermined landing destination.

The above method further includes removing the tail-kit assembly from the payload after the payload is delivered to the predetermined landing destination, where the flight control and navigation system is further configured to induce and control an autorotation motion of rotor blade assembly during a portion of the flight path of the delivery payload assembly from the aircraft to the predetermined landing destination, and produce and control a vertical thrust force by the rotor blade assembly during an end portion of the flight path of the delivery payload assembly from the aircraft to the predetermined landing destination.

The method may further include controlling, the flight control and navigation system, an axial thrust force of the rotor blade assembly by further controlling a cyclic pitch angle of each of the plurality of rotor blades of the rotor blade assembly.

The method may further include controlling, via the flight control and navigation system, an axial thrust force orientation of the rotor blade assembly with respect to a longitudinal axis of the delivery payload assembly.

The method may further include attaching the tail-kit assembly removed from the payload to a first end of a second payload configured to be delivered to a second landing destination.

The method may further include providing a plurality of vertical control surfaces on the tail-kit assembly, the plurality of vertical control surfaces configured to orient the delivery payload assembly during a second portion the flight path of the delivery payload assembly from the aircraft to the predetermined landing destination, controlling, via the flight control and navigation system, the plurality of vertical control surfaces to stabilize and orient the delivery payload assembly into a downwardly disposed attitude during a transient phase of the flight path immediately after the delivery payload assembly is deployed from the aircraft, and navigate the delivery payload assembly along the flight path to the predetermined landing destination.

The method may further include providing a reinforcing structure to at least one exterior surface of the payload, and wherein the attaching the tail-kit assembly to the payload further includes attaching the tail-kit assembly to the reinforcing structure.

Another embodiment of a method of delivering a payload to be deployed from an aircraft along a flight path to a predetermined landing destination may include attaching a tail-kit assembly to a first end of the payload thereby defining a delivery payload assembly, programming geographic coordinates of the predetermined landing destination into a flight control and navigation system in the tail-kit assembly, ejecting the delivery payload assembly from the aircraft, navigating, via the flight control and navigation system, the delivery payload assembly along a flight path configured to terminate at the predetermined landing destination, controlling, via the flight control and navigation system, an autorotation motion of a rotor blade assembly of the tail-kit assembly to enter a steady-state flight phase having a substantially constant first downward velocity, controlling, via the flight control and navigation system, the rotor blade assembly of the tail-kit assembly to enter a terminal flight phase before the predetermined landing destination, wherein the terminal flight phase has a second downward velocity less than the first downward velocity, wherein flight control and navigation system controls rotation of a leading-edge of each of the plurality of rotor blades of the rotor blade assembly in a positive direction to generate a vertical thrust force based on a moment of inertia of the rotor blade assembly in the autorotation motion, and removing the tail-kit assembly from the payload after the delivery payload assembly arrives at the predetermined landing destination, wherein the removed tail-kit assembly is configured to be attached to a second payload for delivery by an air vehicle to another predetermined landing destination.

The method may further include controlling, via the flight control and navigation system while navigating the delivery payload assembly along the flight path, a plurality of control surfaces on the tail-kit assembly.

The method may further include providing at least one servomotor connected to a rotational control structure configured to control rotation of the leading-edge of at least one rotor blade of the rotor blade assembly.

The method may further include providing a plurality of servo-motors each configured to control rotation of a plurality of rotational rotor blade shafts aligned with a longitudinal axis of at least a pair of rotor blades of the rotor blade assembly, and controlling, by the plurality of servo-motors, rotation of the leading-edge of at least the pair of rotor blades.

The method may further include providing a plurality of servo-motors each configured to control rotation of a plurality of rotational rotor blade shafts aligned with a rotational plane of the rotor blade assembly, and controlling, by the plurality of servo-motors, rotation of the leading-edge of a plurality of rotor blades of the rotor blade assembly.

The method may further include controlling, via the flight control and navigation system while navigating the delivery payload assembly along the flight path, an axial thrust force direction of the rotor blade assembly by rotating the rotor blade assembly about a point on a longitudinal axis of the delivery payload assembly.

The method may further include where the navigating, via the flight control and navigation system, the delivery payload assembly along the flight path further includes controlling, via the flight control and navigation system while navigating the delivery payload assembly along the flight path, to impart a cyclic thrust force with the rotor blade assembly by cyclically rotating respective rotor blades in the rotor blade assembly to create the cyclic thrust force.

Another embodiment of a method of delivering a payload to be deployed from an aircraft along a flight path to a predetermined landing destination including attaching a tail-kit assembly to a first end of the payload thereby defining a delivery payload assembly, programming geographic coordinates of the predetermined landing destination into a flight control and navigation system in the tail-kit assembly, ejecting the delivery payload assembly from the aircraft, controlling, via the flight control and navigation system, a leading-edge of each rotor blade of a rotor blade assembly attached to the tail-kit assembly into a substantially downward disposed orientation, navigating, via the flight control and navigation system, the delivery payload assembly along a flight path terminating at the predetermined landing destination, inducing, via the flight control and navigation system, an autorotation motion of the rotor blade assembly by rotating the leading-edge of each rotor blade of the rotor blade assembly toward a plane of rotation of the rotor blade assembly, generating, via the flight control and navigation system, a vertical thrust force on the delivery payload assembly by rotating the leading-edge of each rotor blade of the rotor blade assembly above the plane of rotation of the rotor blade assembly, wherein the vertical thrust force is supplied by a moment of inertia of the rotor blade assembly in the autorotation motion before the predetermined landing destination, and removing the tail-kit assembly from the delivery payload assembly after the delivery payload assembly arrives at the predetermined landing destination, wherein the removed tail-kit assembly is configured to be attached to a second payload for delivery by an air vehicle to a second predetermined landing destination.

The method may further include controlling, the flight control and navigation system while navigating the delivery payload assembly along the flight path, a plurality of control surfaces on the tail-kit assembly.

The method may further include controlling, by at least one servomotor connected to respective rotational rotor shafts of the each of rotor blade of the rotor blade assembly, the leading-edge of the rotor blades of the rotor blade assembly.

The method may further include providing two counter-rotating rotor blade sub-assemblies aligned on a common central rotational axis of each of the rotor blade sub-assemblies.

The method may further include providing a plurality of servo-motors each controlling a rotation of each of a plurality of rotational rotor blade shafts aligned with at least one of a longitudinal axis of at least a pair of rotor blades of the rotor blade assembly, wherein the plurality of servo-motors control rotation of the leading-edge of at least the pair of rotor blades, and a rotational plane of the rotor blade assembly, wherein the plurality of servo-motors control rotation of the leading-edge of the rotor blades of the rotor blade assembly.

The method may further include controlling, via the flight control and navigation system while navigating the delivery payload assembly along the flight path, an axial thrust force orientation of the rotor blade assembly by rotating the rotor blade assembly about a point on a longitudinal axis of the delivery payload assembly.

The method may further include controlling, via the flight control and navigation system while navigating the delivery payload assembly along the flight path, to impart a cyclic thrust force with the rotor blade assembly by cyclically rotating respective rotor blades in the rotor blade assembly to create the cyclic thrust force.

The foregoing description, for purpose of explanation, has been described with reference to specific arrangements and configurations. However, the illustrative examples provided herein are not intended to be exhaustive or to limit embodiments of the disclosed subject matter to the precise forms disclosed. Many modifications and variations are possible in view of the disclosure provided herein. The embodiments and arrangements were chosen and described in order to explain the principles of embodiments of the disclosed subject matter and their practical applications. Various modifications may be used without departing from the scope or content of the disclosure and claims presented herein.

What is claimed is:

1. A method of assembling an air drop device configured to be deployed from an aircraft and travel along a flight path to a predetermined landing destination, the method comprising:

providing a payload configured to be delivered from the aircraft to the predetermined landing destination;

attaching a tail-kit assembly to a first end of the payload thereby defining the air drop device, the tail-kit assembly comprising
- a rotor blade assembly comprising
  - a plurality of rotor blades having a vertical central axis of rotation proximate the first end of the payload, and
  - a plurality of pitch link control servomotors that are configured to input a collective pitch control and a cyclic pitch control to each of the plurality of rotor blades via a swashplate,
  - wherein the plurality of rotor blades are configured to passively rotate about the vertical central axis of rotation under power only generated by an airstream parallel to the vertical central axis of rotation impinging upon the plurality of rotor blades, and
- a flight control portion controlling the plurality of pitch link control servomotors to input the collective pitch control and the cyclic pitch control to the plurality of rotor blades of the rotor blade assembly; and controlling, by the flight control portion, the air drop device along the flight path to the predetermined landing destination by
- navigating the air drop device via the cyclic pitch control, under control of the flight control portion, by controlling a rotor assembly to rotate a leading-edge of each blade of the plurality of rotor blades of the rotor assembly to a 90-degree negative leading-edge angle relative to a plane of rotation of the rotor assembly and parallel to the vertical central axis of rotation and the airstream, thereby enabling the air drop device to travel at a maximum vertical descent speed along a portion of the flight path, and
- producing a vertical thrust force via the collective pitch control of the rotor blade assembly during an end portion of the flight path, wherein the vertical thrust force is produced by rotational energy from the passively rotating plurality of rotor blades; and removing the tail-kit assembly from the first end of the payload after the payload is delivered to the predetermined landing destination.

2. The method according to claim 1, further comprises:
controlling, the flight control portion, an axial thrust force of the rotor blade assembly by further controlling a cyclic pitch angle of each of the plurality of rotor blades of the rotor blade assembly.

3. The method according to claim 1, further comprises:
controlling, via the flight control portion, an axial thrust force orientation of the rotor blade assembly with respect to a longitudinal axis of the air drop device.

4. The method according to claim 1, further comprises:
attaching the tail-kit assembly removed from the payload to a first end of a second payload configured to be delivered to a second landing destination.

5. The method according to claim 1, further comprises:
providing a plurality of vertical control surfaces on the tail-kit assembly, the plurality of vertical control surfaces configured to orient the air drop device during a second portion of the flight path of the air drop device from the aircraft to the predetermined landing destination;
controlling, via the flight control portion, the plurality of vertical control surfaces to stabilize and orient the air drop device into a downwardly disposed attitude during a transient phase of the flight path immediately after the delivery payload assembly is deployed from the aircraft; and
navigating the air drop device along the flight path to the predetermined landing destination.

6. The method according to claim 1, further comprises:
providing a reinforcing structure to at least one exterior surface of the payload; and
wherein the attaching of the tail-kit assembly to the payload further includes attaching the tail-kit assembly to the reinforcing structure.

\* \* \* \* \*